United States Patent
Kachare et al.

(10) Patent No.: US 11,100,017 B2
(45) Date of Patent: *Aug. 24, 2021

(54) SSD ARCHITECTURE FOR FPGA BASED ACCELERATION

(71) Applicant: Samsung Electronics Co., Ltd., Suwon-si (KR)

(72) Inventors: Ramdas P. Kachare, Pleasanton, CA (US); Fred Worley, San Jose, CA (US); Harry Rogers, San Jose, CA (US); Wentao Wu, Milpitas, CA (US); Nagarajan Subramaniyan, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 16/752,612

(22) Filed: Jan. 24, 2020

(65) Prior Publication Data
US 2020/0159679 A1    May 21, 2020

Related U.S. Application Data

(63) Continuation of application No. 16/122,865, filed on Sep. 5, 2018, now Pat. No. 10,585,819.

(Continued)

(51) Int. Cl.
*G06F 13/16* (2006.01)
*G06F 13/40* (2006.01)
*G06F 13/42* (2006.01)

(52) U.S. Cl.
CPC ...... *G06F 13/1668* (2013.01); *G06F 13/4027* (2013.01); *G06F 13/4282* (2013.01); *G06F 2213/0026* (2013.01)

(58) Field of Classification Search
CPC ............. G06F 13/1668; G06F 13/4282; G06F 13/4027; G06F 2213/0026
See application file for complete search history.

(56) References Cited

U.S. PATENT DOCUMENTS 9,619,167 B2    4/2017    Khan et al.
9,898,312 B2    2/2018    Chamberlain et al.
(Continued)

FOREIGN PATENT DOCUMENTS

CN    105659222 A    6/2016
CN    106126447 A    11/2016

OTHER PUBLICATIONS

Jun, Sang-Woo, "Scalable Multi-Access Flash Store for Big Data Analytics", Proceedings of the 2014 ACM/SIGDA International Symposium on Field-Programmable Gate Arrays, ACM 2014, found via Google Scholar (url:https://dspace.mit.edu/bitstream/handle/1721.1/87947/880415120-MIT.pdf;sequence=2), Feb. 2014, 49 pages.

(Continued)

*Primary Examiner* — Idriss N Alrobaye
*Assistant Examiner* — Richard B Franklin
(74) *Attorney, Agent, or Firm* — Renaissance IP Law Group LLP

(57) ABSTRACT

A system is disclosed. The system may include a processor running an application program and a memory storing data being used by the application program. An upstream interface enables communication with the processor; a downstream interface enables communication with a storage device. The system may also include an acceleration module implemented using hardware and including an Acceleration Platform Manager (APM-F) to execute an acceleration instruction. The storage device may include an endpoint of the storage device for communicating with the acceleration module, a controller to manage operations of the storage device, storage for application data for the application (Continued)

program, and a storage device Acceleration Platform Manager (APM-S) to assist the APM-F in executing the acceleration instruction. The processor, the acceleration module, and the storage device may communicate via a Peripheral Component Interconnect Exchange (PCIe) bus. The acceleration module may support performing the acceleration instruction on the application data on the storage device for the application program without loading the application data into the memory.

20 Claims, 35 Drawing Sheets

Related U.S. Application Data

(60) Provisional application No. 62/642,568, filed on Mar. 13, 2018, provisional application No. 62/641,267, filed on Mar. 9, 2018, provisional application No. 62/638,904, filed on Mar. 5, 2018.

(56) References Cited

U.S. PATENT DOCUMENTS

| | | |
|---|---|---|
| 9,946,659 B2 | 4/2018 | Dittmann |
| 10,025,747 B2 | 7/2018 | Swarbrick et al. |
| 10,120,608 B2 | 11/2018 | Khan et al. |
| 10,282,308 B2 | 5/2019 | Jayasena et al. |
| 10,599,568 B2 | 3/2020 | Shifer |
| 2013/0343181 A1 | 12/2013 | Stroud et al. |
| 2015/0254003 A1 | 9/2015 | Lee et al. |
| 2016/0094619 A1 | 3/2016 | Khan et al. |
| 2017/0177270 A1 | 6/2017 | Nakagawa et al. |
| 2018/0052766 A1 | 2/2018 | Mehra et al. |
| 2018/0081569 A1 | 3/2018 | Kan et al. |
| 2019/0212918 A1 | 7/2019 | Wang et al. |

OTHER PUBLICATIONS

Notice of Allowance for U.S. Appl. No. 16/122,865, dated Oct. 17, 2019.
Notice of Allowance for U.S. Appl. No. 16/124,179, dated Oct. 21, 2019.
Notice of Allowance for U.S. Appl. No. 16/124,182, dated Nov. 1, 2019.
Notice of Allowance for U.S. Appl. No. 16/124,183, dated Oct. 30, 2019.
Office Action for U.S. Appl. No. 16/122,865, dated Jun. 25, 2019.
Office Action for U.S. Appl. No. 16/124,179, dated Jun. 25, 2019.
Office Action for U.S. Appl. No. 16/124,182, dated Jun. 25, 2019.
Office Action for U.S. Appl. No. 16/124,183, dated Jun. 25, 2019.

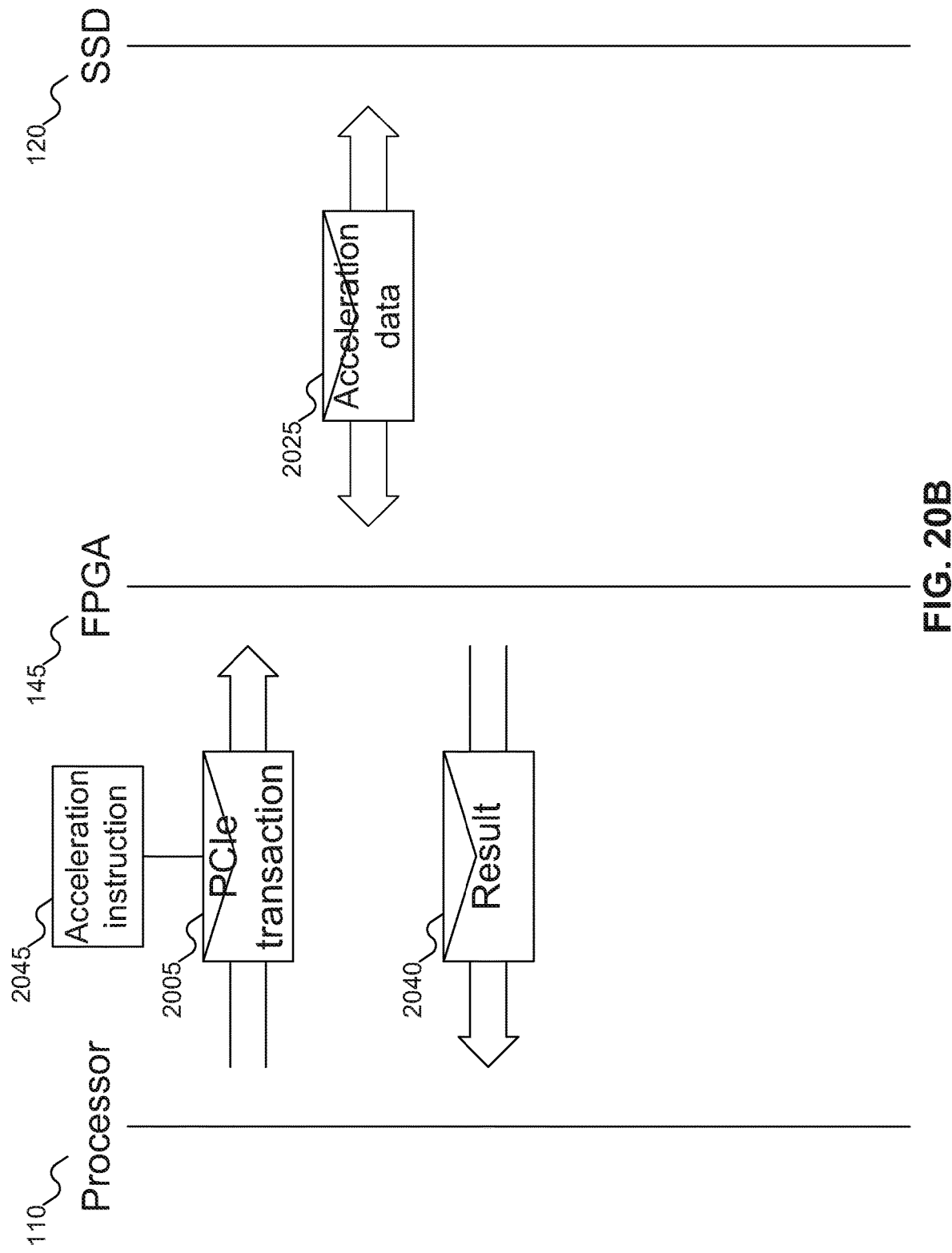

SSD ARCHITECTURE FOR FPGA BASED ACCELERATION

RELATED APPLICATION DATA

This application is a continuation of U.S. patent application Ser. No. 16/122,865, filed Sep. 5, 2018, now allowed, which claims the benefit of U.S. Provisional Patent Application Ser. No. 62/638,904, filed Mar. 5, 2018, U.S. Provisional Patent Application Ser. No. 62/641,267, filed Mar. 9, 2018, and U.S. Provisional Patent Application Ser. No. 62/642,568, filed Mar. 13, 2018, all of which are incorporated by reference herein for all purposes.

This application is related to U.S. patent application Ser. No. 16/124,179, filed Sep. 6, 2018, now allowed, which is incorporated by reference herein for all purposes.

This application is related to U.S. patent application Ser. No. 16/124,182, filed Sep. 6, 2018, now allowed, which is incorporated by reference herein for all purposes.

This application is related to U.S. patent application Ser. No. 16/124,183, filed Sep. 6, 2018, now allowed, which is incorporated by reference herein for all purposes.

FIELD

The inventive concepts relate generally to storage devices, and more particularly to accelerating Solid State Drive (SSD) performance using additional hardware.

BACKGROUND

There are situations where using storage devices in conventional ways is inefficient. For example, consider a situation where a query needs to be run on a database. The conventional solution is to load the database into the memory of the computer, perform the query on the in-memory copy of the database, and then process the results. While such an approach might be reasonable where the database is relatively small, loading a database that contains thousands, millions, or more records, where the result of the query is to identify a single record in the database, is very inefficient. Huge amount of data need to be moved into memory to perform the query, likely displacing other data already stored in the memory. And then the majority of that data is discarded once the query has been performed, since most of the data is not needed after the query completes. This problem may be magnified when queries need to be performed against the database repeatedly: each query might require the database be loaded anew into memory.

A need remains for a way to accelerate operations involving storage devices.

BRIEF DESCRIPTION OF THE DRAWINGS

FIGS. 20A-20B show communications between the processor of FIG. 1, the acceleration module of FIG. 1, and the storage device of FIG. 1, according to embodiments of the inventive concept.

DETAILED DESCRIPTION

Figure 1:
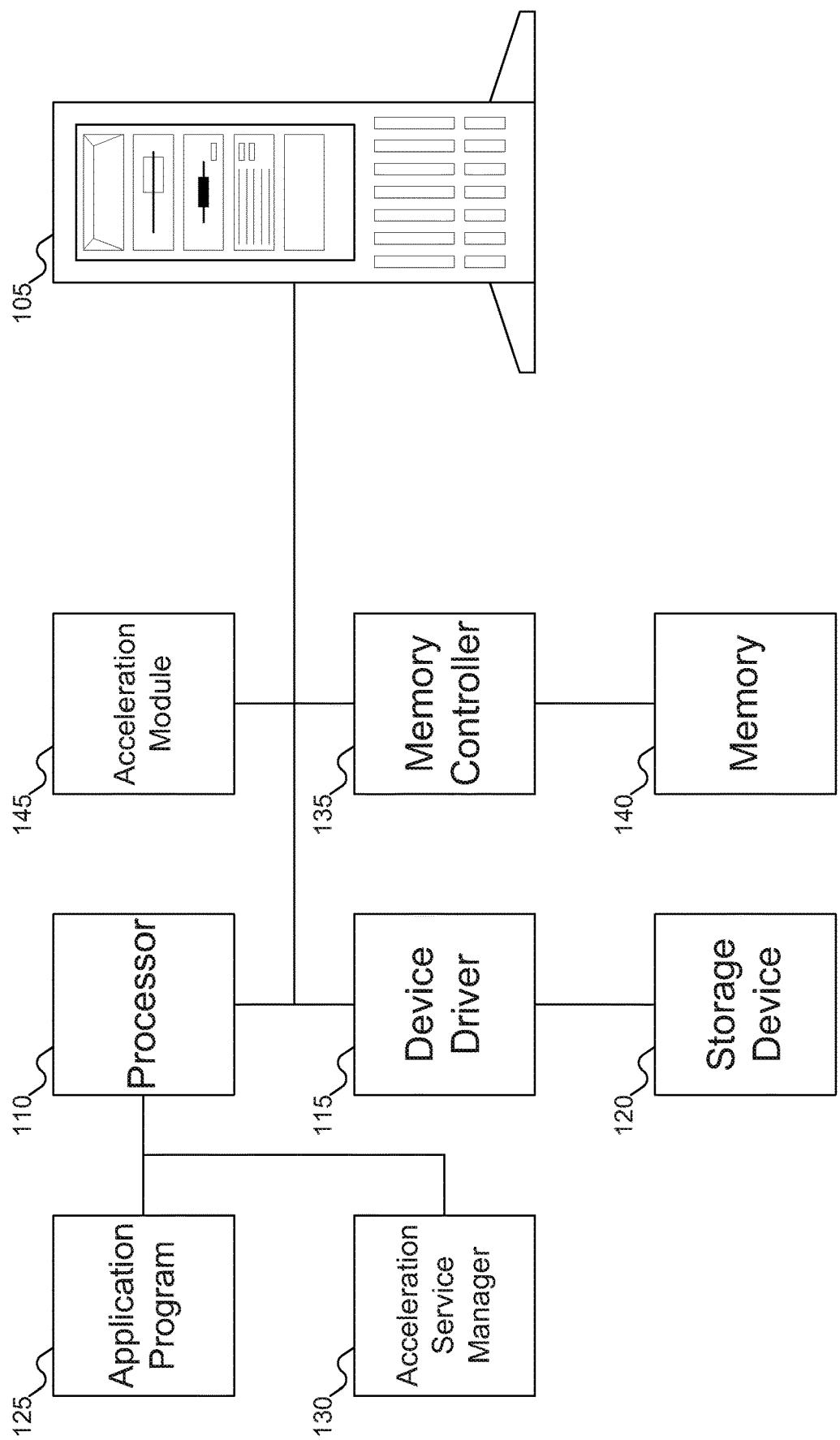
FIG. 1 shows a machine supporting accelerated operations on a storage device, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept propose a Solid State Drive (SSD) or other storage device architecture in which a Field Programmable Gate Array (FPGA) is used for acceleration certain data processing functions. An FPGA device is placed in front of or along side an SSD that provides a Peripheral Component Interconnect Express (PCIe) host interface. As the host transactions are received on the FPGA PCIe interface, those PCIe transactions are forwarded to the backend SSD Controller. The terms "SSD" and "SSD Controller" are used interchangeably and generally mean the same except where noted. The backend SSD implements a PCIe end point and a Non-Volatile Memory Express (NVMe) Controller. Hence, the host directly talks NVMe protocol to the backend SSD. That is to say, the PCIe interface from host to the backend SSD via the FPGA is of pass-through nature. The SSD performs the data transfers via direct memory accesses (DMAs) to/from host system memory. An FPGA Down-Stream Port (DSP) is programmed with a memory Filter Address Range (FAR) that is used as PCIe transaction filter. The DSP filters all the PCIe transactions falling in the FAR window and forwards them to the logic and memory on the FPGA. All the PCIe transactions not falling in the programmed FAR window belong to host system memory and are passed directly to the host. The SSD Controller programs the appropriate FAR window in the FPGA using a PCIe Vendor Defined Message (VDM) mechanism or other side band bus such as I²C/SMBus. The SSD Controller requests a block of address range through a PCIe Base Address Register (BAR) to the host. After the host BIOS has allocated the SSD Controller the requested address block, the SSD controller programs a subset of that address range in the FPGA DSP as the FAR window. The address range programmed in the DSP is used by the SSD Controller and the FPGA to communicate with each other. That is to say, with the host allocated address block, the SSD and the FPGA may share the PCIe bus with host transactions without interfering with each other or other PCIe devices in the PCIe hierarchy. Using this FAR window over the shared PCIe bus, the SSD controller may provide acceleration instructions and data to the FPGA. It is also possible for the FPGA or the host to use the shared PCIe bus and the above-mentioned address range to request data for acceleration from the SSD Controller. The FPGA may also use the same mechanism to provide acceleration results back to the SSD Controller. The proposed architecture and mechanism enables a low cost, and low power solution for SSD based application acceleration using FPGA devices.

Details of Proposed Solutions

The basic idea is that the FPGA and the SSD (and/or other storage device) work collectively (either as separate devices or merged into a single device) communicating with a host. There are three traffic streams:

1) From the host to the storage device. Communications from the host to the storage device are managed by the FPGA by simply forwarding all traffic through the FPGA, from the upstream port (USP) or endpoint (EP) to the downstream port (DSP) or root port or root complex port (RP), depending on the FPGA implementation, to be delivered to the EP of the storage device. The FPGA may include a physical function that is exposed to the host by the storage device to support NVMe communications between the host and the storage device.

2) Communication of acceleration instructions to the FPGA. In some embodiments of the inventive concept, acceleration instructions are handled in the following manner: an Acceleration Service Manager (ASM) may run on the host. The ASM may communicate with the Acceleration Platform Manager (APM), which may include components as part of both the storage device (identified as APM-S) and the FPGA (identified as APM-F). The ASM on the host may use the NVMe protocol to tunnel acceleration instructions and related information to the SSD. The SSD then acts as the acceleration orchestrator relative to the FPGA: all acceleration instructions accepted by the APM-S are used to provide appropriate instructions to the APM-F using a proprietary interface. The proprietary interface is facilitated using an address space window. This address space window may be allocated within the host memory address map, at the request of the storage device (partly to facilitate communication using the NVMe protocol between the storage device and the host). Any instructions that use an address in the appropriate address space may be filtered by the FPGA for processing by the APM-F, rather than being communicated directly from either the host or the storage device to the other. Filtering may also be performed using a tag associated with the instruction, or using PCIe message-based filtering. This filtering may be performed by a filter connected to the DSP/RP that connects the FPGA to the storage device.

3) Communication between FPGA and SSD to fetch data for acceleration and processing of that data. In some embodiments of the inventive concept, acceleration is performed in the following manner: when the FPGA wants to fetch data for acceleration processing, the FPGA may send a request using the address space allocated within the host memory address map used for storage device-FPGA communication, as discussed above.

DSP Filter Architecture

This architecture proposes a method by which a PCIe bus between host and an SSD may be shared with an FPGA for accelerated data processing.

Logically speaking, an FPGA is operably placed in between a host and an SSD Controller. The host connects to an Up-Stream Port (USP) of FPGA and the SSD is connected to the Down-Stream Port (DSP) of the FPGA. The PCIe buses used to connect to the host and/or to the SSD may be ×4 or ×8 lanes, or any other desired width. The FPGA USP and DSP ports forward PCIe transactions—i.e., Transaction Layer Packets (TLPs)—in both the directions. The examples of PCIe TLP are Config Read, Config Write, Memory Read, and Memory Write. Hence, the host directly communicates with the SSD. The DSP port on the FPGA has a logic that filters all the PCIe transactions coming from the SSD Controller based on the programmed filter address range (FAR). The intercepted SSD Controller PCIe transactions are then directed to the Acceleration Platform Manager-FPGA (APM-F) block. The APM-F module communicates with the SSD Controller. The APM-F module receives data and acceleration instructions from the Acceleration Platform Manager-SSD (APM-S) firmware from the SSD Controller. The APM-F module then provides the received acceleration instructions and data to a runtime (RT) Scheduler. The RT Scheduler in turn programs the appropriate Acceleration Engines to perform data processing.

The use of the FPGA represents one possible implementation, but implementations other than the FPGA may be used. The FPGA may be implemented within the storage device. The FPGA supports accelerated data processing, which may be done close to the storage device rather than by fetching the data to the host memory and then processing the data on the host. Instead of fetching the data, the storage device/FPGA may receive queries and perform the processing locally.

The SSD Controller implements an NVMe protocol processing logic using a PCIe transport. As part of PCIe Configuration, the SSD Controller requests a block of host system address map for its own usage. The SSD Controller requests a block that is bigger than what it needs normally to support the NVMe protocol: some or all of the additional space may be used for managing communication between the storage device and the FPGA. For example, the NVMe protocol may need, say, a 64 KB address space; then in the proposed architecture the SSD Controller may request, say, a 10 MB address block. The SSD Controller uses part of the allocated address map to communicate with the FPGA in a host transparent manner. The subset of system address map reserved for SSD-FPGA communication is called as Filter Address Range (FAR). The SSD Controller then programs the FAR window in the FPGA DSP. The SSD Controller may use a side band bus such as I$^2$C/SMBus to program the FAR window in the FPGA. The SSD Controller may also use a PCIe Vendor Defined Messages (VDM) to program the FAR window in the FPGA.

A Host Interface Logic (HIL) module implements the NVMe protocol and communicates with the NVMe driver running on the host. The HIL module interacts with a Flash Translation Layer (FTL) to execute normal host NVMe commands. Additionally, the HIL module intercepts special acceleration commands received from the host side and forwards them to the APM-S module. The APM-S may be implemented as firmware or firmware+hardware. The APM-S module may process the special acceleration commands and then prepare acceleration instructions and data to be sent to the APM-F module on the FPGA. The APM-S module then uses the Filter Address Range (FAR) addresses to send the acceleration information to the FPGA. The communication between APM-S and APM-F may be message-based. It is possible to use many different methods for such communication between APM-S and APM-F.

The proposed architecture and mechanism allows the SSD Controller to share the host PCIe bus to enable FPGA-based acceleration. Embodiments of the inventive concept provide a low cost and low power solution for application acceleration using an FPGA in an SSD.

DSP+USP Filter Architecture

In this architecture, the FPGA is made visible to the host in an indirect manner. The communication between FPGA and SSD remains the same as Proposed Solution 1. The SSD Controller may request a large system address space from the host. The SSD Controller may divide the allotted address block into three windows. One window is used for the NVMe Controller register address space. The second window is used for communication between the FPGA and the SSD, as described above. The third window is for communication between the host and the FPGA. The host may discover the location of FPGA device from a special NVMe register. The SSD Controller may advertise the third window in a special register that may be read by a host application to know the location of the FPGA device. The SSD Controller may also program the USP with the same address window so that USP may filter those transactions. The USP may filter all the transactions from the host falling in the third window's address space and may forward them to the FPGA acceleration logic. This mechanism may be used by the Acceleration Service Manager (ASM) on the host to communication acceleration instructions and data to the FPGA.

Thus, in some embodiments of the inventive concept, filtering may also be done based on traffic received by the FPGA from the host. That is, the host may also send acceleration instructions/data to the FPGA. A filter, similar to that connected to the DSP/RP of the FPGA, may be connected to the USP/EP of the FPGA as well. The host may use addresses in the address space requested by the storage device. The address(es) used by the host for host-FPGA communication may be part of the address space requested by the storage device for NVMe communication with the host (again, where the requested address space may be larger than the space needed for NVMe communication), or part of a separate address space within the host memory address map (for either a virtual function or for a second physical function, either of which is also exposed by the storage device to the host). Note that filtering at the USP/EP and at the DSP/RP may be done using different address ranges within the host memory address map, enabling the host to send instructions to either the storage device or the FPGA as needed (while still permitting the storage device to communicate with the FPGA as needed as well).

In embodiments of the inventive concept where a portion of the address space supports communication between the host and the FPGA, the FPGA may not be directly visible to the host. In that case, the ASM on the host may "discover" the FPGA by accessing an address written in a special register in the NVMe address space that identifies the address range used for host-FPGA communication. The ASM may discover the storage device via PCIe device tables and from there knows which register in the NVMe address space stores the pointer to the host-FPGA communication address space.

VF+DSP Filter Architecture

In this FPGA+SSD architecture, the SSD exposes one physical function (PF) and one virtual function (VF) to the host. The SSD Controller is exposed through the PF. The VF is used to expose the FPGA. The PF class code may indicate a mass storage device whereas the VF class code may be set to identify the FPGA. The SSD Controller PF may request a large system memory address block so that a subset of the memory address block may be used for communication between FPGA and the SSD through the FPGA DSP, and the SSD Controller VF may request its own memory address block for communications between the FPGA and the host through the FPGA USP.

The FPGA USP may be programmed with a different memory Filter Address Range and/or VF tag (FAR-USP) that may be used as PCIe transaction filter. The USP may filter all the PCIe transactions falling in the FAR window and/or all the PCIe transactions belonging to the VF and may forward them to the acceleration logic and memory on the FPGA. All the PCIe transactions that do not fall in the programmed FAR-USP window, or transactions that do not belong the VF, belong to SSD and may be passed directly to the SSD. The SSD Controller may program the appropriate FAR-USP window using a PCIe VDM mechanism or other side band bus such as $I^2C$/SMBus to communicate this information.

This FAR address window may allow the ASM software running on the host to communicate with the APM-F. That is to say, the FPGA is directly visible to the host. The ASM software may use this PCIe address range to send acceleration orchestration instructions and data to the FPGA. The APM-F may then provide the received acceleration instructions and data to a runtime (RT) Scheduler. The RT Scheduler in turn programs the appropriate Acceleration Engines to perform data processing. The APM-F may also fetch data from the host memory or SSD storage.

PF+DSP Filter Architecture

This FPGA+SSD architecture is similar to Proposed Solution 3, except that the instead of using a VF, a second PF may be used to expose the FPGA to the host. The SSD Controller exposes two physical functions to the host. The first PF may be used for the SSD Controller, and the second PF may be used for the FPGA. The base address of the second PF may be programmed in the FAR-USP in the FPGA. Thus, the USP may filter all the transactions coming from the host that fall in the programmed address range (FAR-USP) for the second PF and may forward them to the FPGA. This mechanism may be used by the ASM running on the host to communicate with the FPGA.

By exposing either a virtual function or a (second) physical function to the host, an address space for host-FPGA communication may be requested from the host (either by the storage device or by the FPGA). Where a virtual function or a second physical function are exposed, the filter on the USP/EP may filter either based on the address range allocated for host-FPGA communication, or based on the exposed virtual function or exposed second physical function (for example, by filter number or some other tag). (A virtual function requires operating system support; exposing a second physical function provides an alternative solution to using a virtual function, if a second physical function is implemented/supported.)

PF+RP Filter Architecture

In this FPGA SSD architecture, the FPGA PCIe ports are endpoint (EP) and root port (RP), rather than USP and DSP. A difference between USP/DSP and EP/RP ports is that both EP/RP have their own PCIe Configuration spaces whereas USP/DSP ports do not. In an architecture according to these embodiments of the inventive concept, the FPGA may expose two PFs to the host (note that the FPGA exposes its own PF to the host, rather than the SSD offering a PF/VF that exposes the FPGA). The SSD EP may be connected to the RP on the FPGA. The first FPGA EP PF may be used to connect the host to the SSD directly, whereas the second FPGA EP PF may be used to connect the host to the FPGA. This mechanism may be used by the ASM running on the host to communicate with FPGA. SSD-FPGA communication may use part of the address space map between the FPGA RP and SSD EP. In some embodiments of the inventive concept, the first FPGA PF may request a large address space, and the BIOS-allocated address windows may be mapped/translated to the SSD Controller EP. Part of that address space may be used for local FPGA-SSD communication. In another embodiment of the inventive concept part of the address space allocated for the second FPGA EP PF may be used for communication between the FPGA and the SSD Controller.

PF+Dual Port SSD Architecture

In this FPGA-SSD architecture, a dual port SSD is used along with the FPGA. In this architecture, the FPGA (again, the FPGA exposes its own PFs, rather than the SSD offering a PF/VF that exposes the FPGA) may expose two PFs to the host. The SSD EP may be connected to an RP on the FPGA. The first FPGA EP PF may be used to connect the host to the SSD directly. All the host transactions coming for the second FPGA EP PF may be forwarded to the FPGA acceleration logic. The ASM software running on the host may use the second FPGA EP PF to communicate with the FPGA.

For FPGA-SSD communication (for acceleration processing), a second PCIe EP on the SSD may be used. Thus, the FPGA has two RPs connected to the SSD. The first EP port of the SSD may be used for communication with host for normal host storage accesses. The second EP on the SSD may be used to transfer any data needed in the FPGA for processing.

As noted, in embodiments of the inventive concept where the storage device may support two (or potentially more) ports, the FPGA may support two RPs to communicate with two EPs on the storage device. In such embodiments of the inventive concept, one RP on the FPGA (and its corresponding EP on the storage device) may be used to manage communication between the storage device and the host, and the other RP on the FPGA (and its corresponding EP on the storage device) may be used to manage communication between the storage device and the FPGA (for acceleration instructions/data). In such embodiments of the inventive concept, the RPs on the FPGA may support two address maps (one for each RP). Thus, the address map for the RP that supports communication between the host and the storage device may include space allocated for NVMe commands, and the other address map (for the RP that manages communication of acceleration instructions/data) may be entirely dedicated for such communication. Note that in such embodiments of the inventive concept, the host memory address map may omit any address space intended for the host to communicate acceleration instructions to the storage device, since all such instructions may be sent from the host to the FPGA (via the address space the FPGA requests be allocated within the host's memory address map for such communications). The FPGA may then process the instructions and forward instructions/data as needed to the storage device using the memory address map on the second RP dedicated for communication between the FPGA and the storage device.

Where EP/RPs are used instead of USP/DSP in the FPGA, the EP/RP may also support a PCIe configuration space, and the FPGA may expose its physical functions directly to the host (rather than leaving such function to the storage device). One physical function exposed by the FPGA may be used for directing communications from the host to the storage device; the other physical function may be used for communications between the host and the FPGA. In such embodiments of the inventive concept, the FPGA may request address space(s) be allocated from the host, rather than the storage device issuing such requests.

The EP/RP may also support their own memory maps. Thus, the FPGA may communicate with the host using the host's memory address map, and the FPGA may support its own memory address map which is used in communicating with the storage device. In such embodiments of the inventive concept, the FPGA may request space be allocated in the host's memory address map to support communication from the host to the storage device (with such communications occurring via the FPGA), and additional space be allocated in the host's memory address map to support communication from the host to the FPGA. The FPGA's memory address map may then include its own space allocation for communicating commands from the host to the storage device and for communicating acceleration instructions/data between the FPGA and the storage device. The FPGA may translate the address space used for communications between the host and the storage device to the address space used for communications between the FPGA and the storage device (which should be the same size).

Where the FPGA includes EPs/RPs, then the host sees the FPGA directly. This raises the question of what PCIe capabilities are exposed by the FPGA. The FPGA should expose the same PCIe capabilities as the storage device. So the FPGA may include a PCIe configuration monitor that sets up the EP PCIe configuration of the FPGA to match the SSD Controller EP PCIe configuration in the storage device. In addition, when the host changes the PCIe configuration of the EP of the FPGA, the PCIe configuration of the EP of the storage device may be similarly modified.

Embodiments of the inventive concept may support dividing components/functionality as described within the FPGA into multiple separate elements, provided the whole functionality is retained. FPGA components may be implemented using hardware, software/firmware, or a combination of the two.

In FIG. 1, machine 105 is shown. Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination. Processor 110 may run device driver 115, which may support access to storage device 120, different device drivers may support access to other components of machine 105. Throughout this document, storage device 120 will be described as Solid State Drive (SSD) 120, but storage device 120 may be any other type of storage device that supports accelerated instructions as described in the embodiments of the inventive concept below. Processor 110 may also run application program 125, which may be any application program that includes acceleration instructions, and Application Service Manager (ASM) 130, which may be used to send acceleration instructions to be performed on data stored on storage device 120.

Machine 105 may also include memory controller 135, which may be used to manage access to main memory 140. Memory 140 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 140 may also be any desired combination of different memory types.

Machine 105 may also include acceleration module 145. Acceleration module 145 may assist processor 110 by performing acceleration instructions as requested by processor 110 on data stored on storage device 120. Acceleration module 145 may be implemented using firmware alone, or a combination of hardware and firmware. Throughout this document, acceleration module 145 will be described as Field Programmable Gate Array (FPGA) 145, but acceleration module 145 may be any other type of acceleration module that supports accelerated instructions as described in the embodiments of the inventive concept below. For example, acceleration module 145 may be implemented as or using an Application-Specific Integrated Circuit (ASIC), a Graphics Processing Unit (GPU), an In-Storage Computing (ISC) capability of an SSD, or other implementations.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines. In addition, while FIG. 1 shows machine 105 as including storage device 120, application program 125, and ASM 130, embodiments of the inventive concept could have these components in separate machines: for example, storage device 120 might be installed on a server that is connected to machine 105 (and application program 125 and ASM 130) via a network connection traversing one or more networks of any types (wired, wireless, global, etc.).

Regardless of the specific arrangements of the components shown in FIG. 1, the terms "host", "host machine", or "host processor" may also be used to describe machine 105. This may distinguish processor 110 from other components of the inventive concept.

Among the components of FIG. 1, there are three traffic streams of particular interest to embodiments of the inventive concept (there may be other traffic streams as well, that are not pertinent to embodiments of the inventive concept):

1) Host to storage device 120. The host (processor 110) may send communications to storage device 120. In embodiments of the inventive concept all such traffic passes through acceleration module 145, and should not be prevented from reaching storage device 120 by acceleration module 145. Examples of such traffic may include commands to read data from and/or write data to storage device 120: other commands offered by storage device 120 may also be included such traffic.

2) ASM 130 to acceleration module 145. ASM 130 may request certain acceleration instructions be performed. Somehow, regardless of the particular embodiment of the inventive concept, acceleration module 145 should receive the acceleration instructions from ASM 130.

3) Acceleration module 145 to storage device 130. In order to perform acceleration instructions, acceleration module 145 may need to fetch or receive data from storage device 130.

Figure 2:
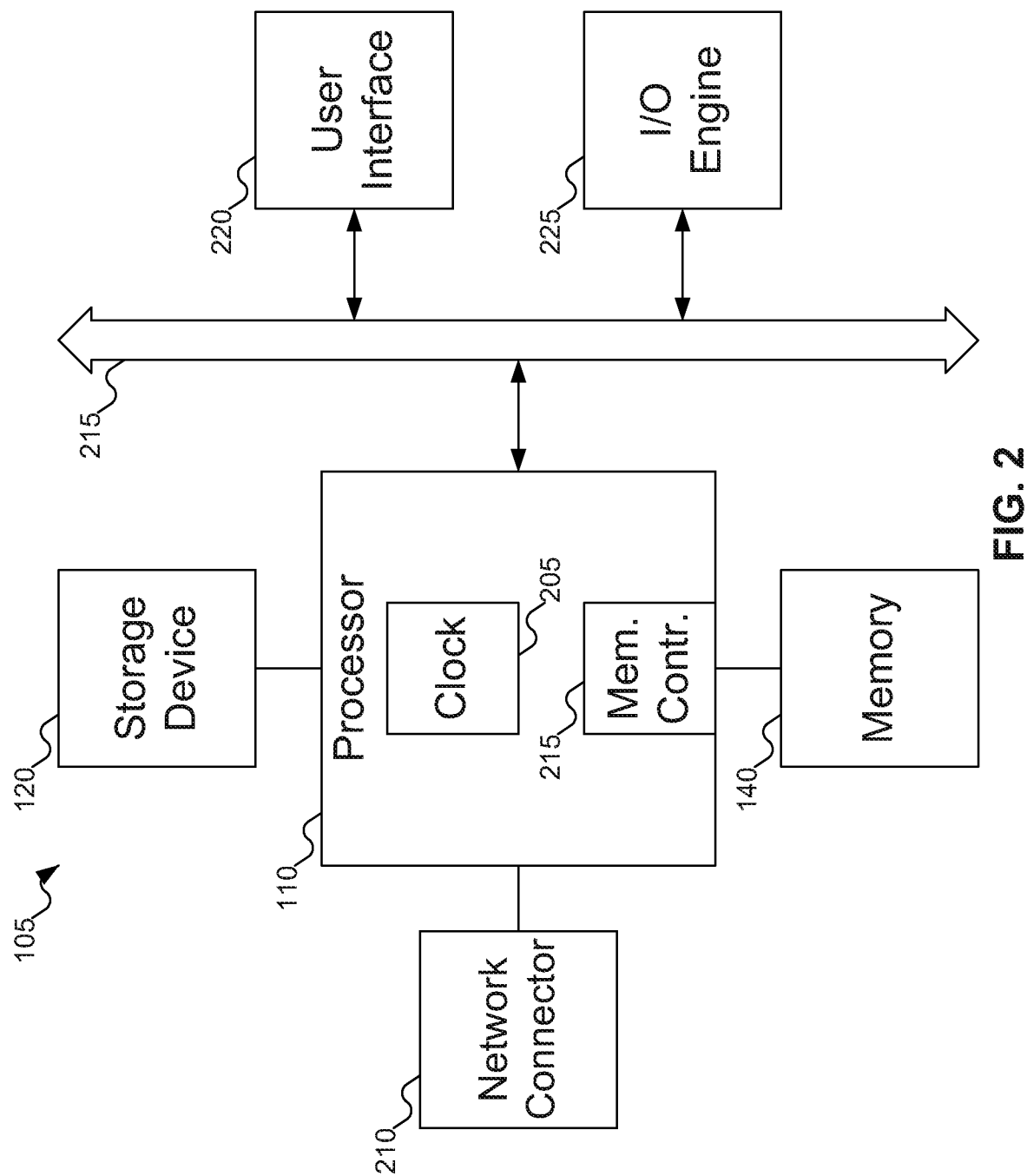
FIG. 2 shows additional details of the machine of FIG. 1.

FIG. 2 shows additional details of the machine of FIG. 1. In FIG. 2, typically, machine 105 includes one or more processors 110, which may include memory controllers 135 and clocks 205, which may be used to coordinate the operations of the components of device 105.

Processors 110 may also be coupled to memories 140, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

First Example Embodiment

Figure 3:
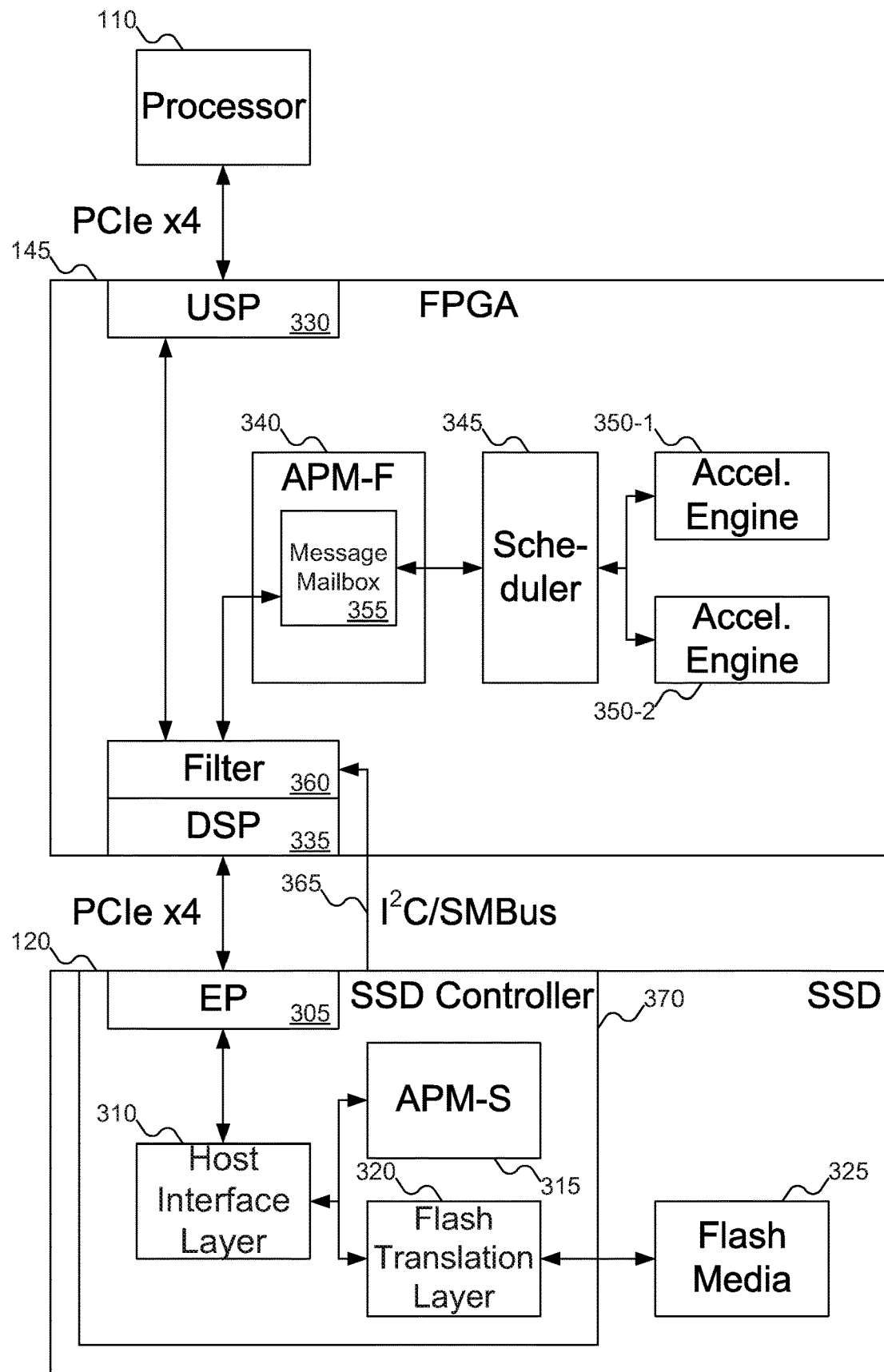
FIG. 3 shows components of the acceleration module of FIG. 1 and the storage device of FIG. 1, according to a first embodiment of the inventive concept.

FIG. 3 shows components of FPGA 145 of FIG. 1 and SSD 120 of FIG. 1, according to a first embodiment of the inventive concept. In FIG. 3, processor 110, FPGA, 145, and SSD 120 are shown communicating. In FIG. 3, processor 120, FPGA 145, and SSD 120 may communicate over a Peripheral Component Interconnect Express (PCIe) bus. The PCIe bus may use any number of lanes: typical examples are ×4 and ×8, but embodiments of the inventive concept may use any other desired number of lanes. These communications may include PCIe transactions, which may be a transaction layer packet (TLP) encoding a command using a Non-Volatile Memory Express (NVMe) protocol, but embodiments of the inventive concept may extend to include communications using a different encoding, or commands in a different protocol.

SSD 120 may include endpoint 305, host interface layer (HIL) 310, SSD Acceleration Platform Manager (APM-S) 315, flash translation layer (FTL) 320, and flash media 325. Endpoint 305 may be the logical or physical connection point at which SSD 120 may receive and send PCIe communications. When SSD 120 receives a PCIe transaction at endpoint 305 from processor 110 (via FPGA 145), SSD 120 may deliver the PCIe transaction to HIL 310. HIL 310 may then determine whether the PCIe transaction includes an acceleration instruction or not. If the PCIe transaction includes an acceleration instruction, HIL 310 may forward the PCIe transaction (or the acceleration instruction itself, unpacked from the PCIe transaction) to APM-S 315 for processing: APM-S 315 may be implemented using firmware alone or a combination of hardware and firmware. Otherwise, HIL 310 may deliver the PCIe transaction (or the unpacked NVMe command) to FTL 320, where FTL 320 may translate a Logical Block Address (LBA) used by the application program 125 of FIG. 1 to a Physical Block Address (PBA), and access the data stored on flash media 325.

There are basically two different types of acceleration instructions that APM-S 315 might process. The first type of acceleration instruction is a special command from processor 110. In the first embodiment of the inventive concept, FPGA 145 is not visible to processor 110: processor 110 sends all its communications to SSD 120. When processor 110 wants an acceleration instruction to be performed on application data, processor 110 may send a special command to SSD 120. Processor 110 may use an NVMe command to tunnel the special command/acceleration instructions to SSD 120. HIL 310 may intercept this special command, which may be delivered to APM-S 315. APM-S 315 may then generate an acceleration instruction in response to the special command, which may be sent back to FPGA 145 to perform the acceleration instruction. This special command might, for example, encode the specific type of acceleration instruction to be executed, and the data on which the acceleration command instruction is to be performed.

The second type of acceleration instruction that APM-S 315 might process would involve data. For example, FPGA 145 may not have direct access to flash media 325, and therefore might not be able perform an acceleration instruction without receiving the data on which the acceleration instruction is to be performed. Thus, APM-S 315 might receive from FPGA 145 an acceleration instruction requesting the data in question. APM-S 315 may then access the requested data and return it to FPGA 145, to permit FPGA 145 to perform the acceleration instruction.

In FIG. 3 SSD 120 is shown including FTL 320 and flash media 325, which are appropriate for use in SSDs. If SSD 120 is replaced with an alternative storage device, these components may be replaced with alternative components appropriate to the form of the storage device. For example, if SSD 120 is replaced with a hard disk drive, flash media 325 may be replaced with hard disk platters. Additional components may also be included to support data access: continuing the example of a hard disk drive storage device, the storage device may also include read/write heads as appropriate.

Before FPGA 145 may intercept communications between processor 110 and SSD 120, SSD 120 may request a block of host memory addresses from processor 110. This request for a block of host memory system addresses is conventional when using PCIe transactions, and may be performed at start up or at a later time. In response, processor 110 (or the Basic Input/Output System (BIOS) of machine 105 of FIG. 1) may allocate a block of host memory system addresses for use by SSD 120. The host machine then knows that this block of host memory system addresses is not available for use by other devices in machine 105 of FIG. 1.

Figure 4:
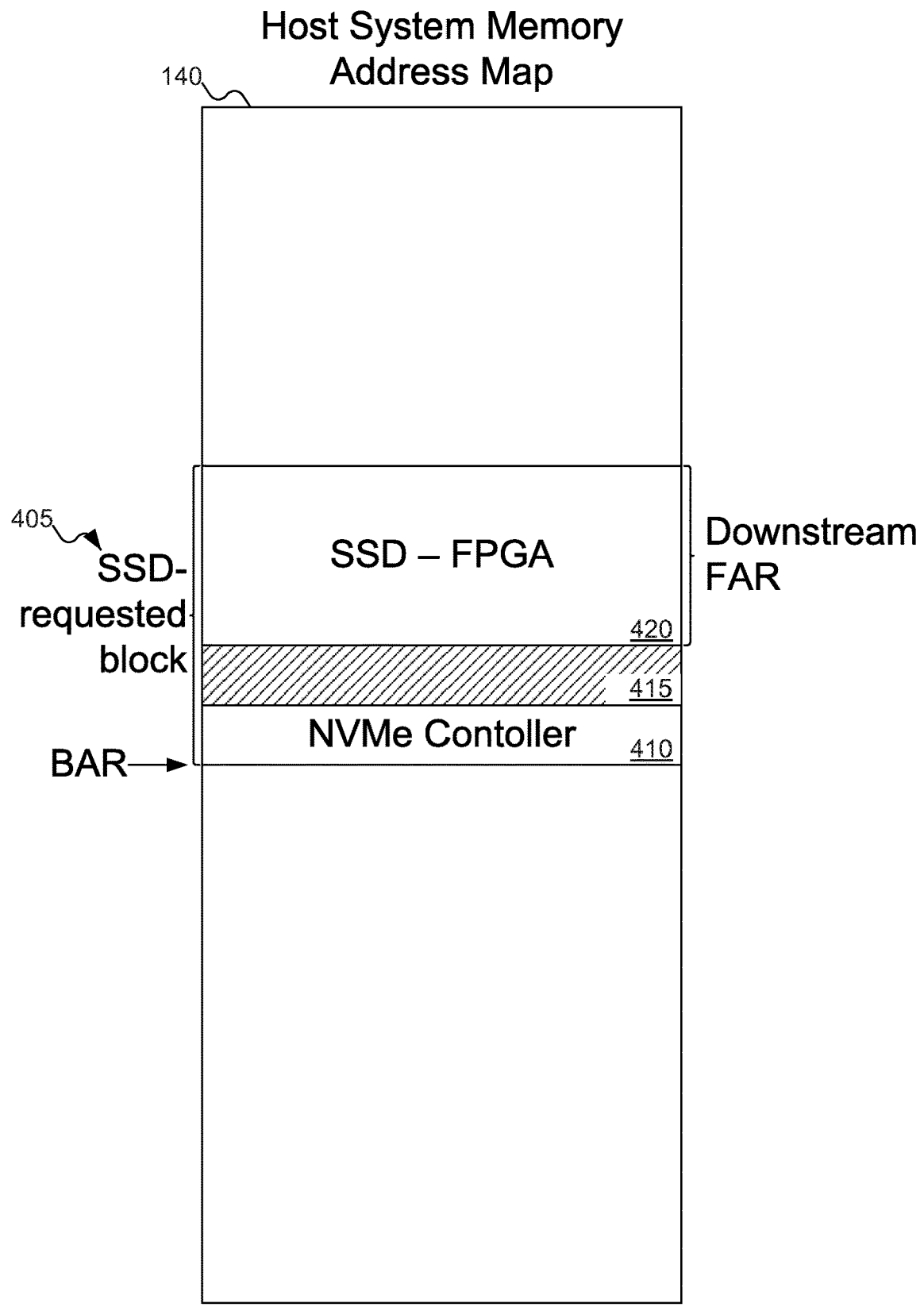
FIG. 4 shows memory usage for accelerating instructions in the system of FIG. 1, according to the first embodiment of the inventive concept.

FIG. 4 shows memory usage for accelerating instructions in the system of FIG. 1, according to the first embodiment of the inventive concept. In FIG. 4, SSD 120 may request a block of host memory system addresses. Note that while the amount of memory needed to support NVMe communications between processor 110 and SSD 120 may be relatively small—for example, 64 KB—SSD 120 may request a much larger block—for example, 10 MB or more. In response, processor 110 may return block of host memory system addresses 405. One end of block 405 may be stored in a Base Address Register (BAR), enabling SSD 120 to determine block 405 based on the BAR (and with the knowledge of SSD 120 of the size of the block requested).

Once SSD 120 knows what addresses are in block 405, SSD 120 may divide block 405 into different regions for its use. One subset 410 of block 405 may be used for NVMe communications. Another subset 415 may be left unused. And a third subset—termed downstream Filter Address Range (FAR) 420 ("downstream" because any filtering is done downstream from processor 110)—may be dedicated for communications between SSD 120 and FPGA 145. Note that downstream FAR 420 may be used by both SSD 120 and FPGA 145: either may use an address in downstream FAR 420 to indicate that the PCIe transaction in question includes an acceleration instruction.

Returning to FIG. 3, if SSD 120 sends a communication using an address in downstream FAR 420, FPGA 145 may receive the communication at downstream port 330, intercept the communication and process it locally rather than forwarding that communication to processor 110. Any communications received by FPGA 145 at downstream port 335 from SSD 120 not involving downstream FAR 420 may be delivered to processor 110 by FPGA 145 via upstream port 330. (Any communications FPGA 145 receives from processor 110 at upstream port 330 may be delivered to SSD 120 via downstream port 335 automatically.)

FPGA 145 may be positioned between processor 110 and SSD 120, so that FPGA 145 may intercept communications between processor 110 and SSD 120. By intercepting such communications, FPGA 145 may perform acceleration instructions requested by SSD 120.

To perform acceleration instructions, FPGA 145 may include upstream port 330, downstream port 335, FPGA Acceleration Platform Manager (APM-F) 340, scheduler 345, and acceleration engines 350-1 and 350-2. Upstream port 330 may be used to communicate with processor 110; downstream port 335 may be used to communicate with SSD 120. APM-F 340 is responsible for receiving any acceleration instructions that FPGA 145 has intercepted. These acceleration instructions may be received as messages from downstream port 335 using message mailbox 355, but embodiments of the inventive concept may extend to other mechanisms for APM-F to receive acceleration instructions. Once an acceleration instruction is received, APM-F 340 may process the acceleration instruction. For example, if FPGA 145 has enough information to be able to perform the acceleration instruction, APM-F 340 may pass the acceleration instruction to scheduler 345 (which may also be termed a "runtime scheduler"), which may then schedule the acceleration instruction with any available acceleration engine, such as acceleration engines 350-1 and 350-2. While FIG. 3 shows two acceleration engines 350-1 and 350-2, embodiments of the inventive concept may include any desired number of acceleration engines: two are shown in FIG. 3 merely for exemplary purposes. Alternatively, if FPGA 145 needs additional information to perform the acceleration instruction—for example, FPGA 145 needs the data on which the acceleration instruction is to be performed—APM-F 340 may take another action, such as sending a PCIe transaction to SSD 120, requesting the necessary data.

To determine whether a particular PCIe transaction includes an acceleration instruction, FPGA 145 may include downstream filter 360, associated with downstream port 335. Downstream filter 335 may identify PCIe transactions issued from SSD 120 that may include acceleration instructions. This may be done in any desired manner. In some embodiments of the inventive concept, SSD 120 may program downstream filter 360 with downstream FAR 420 of FIG. 4. Then, when downstream filter 360 identifies a PCIe transaction that uses an address in downstream FAR 420 of FIG. 4, FPGA 145 may identify the PCIe transaction as including an acceleration instruction and intercept the PCIe transaction. SSD 120 may program downstream filter 360 in any desired manner. For example, SSD 120 may use sideband bus 365, such as an Inter-Integrated Circuit ($I^2C$) bus or a System Management Bus (SMBus), to program downstream filter 360. Or SSD 120 may use a PCIe Vendor Defined Message (VDM) to program downstream filter 360. SSD 120 may also use other mechanisms to program downstream filter 360.

In FIG. 3, FPGA 145 is shown including the parts that enable communication with processor 110 and SSD 120: specifically, upstream port 330, downstream port 335, and downstream filter 360. While FPGA 145 does need some mechanism by which it communicates with processor 110 and SSD 120, embodiments of the inventive concept may separate the communicative elements from FPGA 145. For example, downstream port 335 and downstream filter 360—the latter of which is responsible for identifying which PCIe transactions received from SSD 120 involve acceleration instructions (and should be redirected to APM-F 340) instead of being delivered to processor 120—might be placed in a bridging component (not shown in FIG. 3) between FPGA 145 and SSD 120. Since such a bridging component would need to communicate with FPGA 145 and SSD 120, FPGA 145 would still include downstream port 335 (or an alternative structure enabling communication with the bridging component): but downstream filter 360 might then be removed from FPGA 145.

The first embodiment of the inventive concept, as described above, represents one possible combination of processor/FPGA/SSD implementations. Other implementations are also possible, described below as other embodiments of the inventive concept. Where there are no differences between the operations of particular components (for example, the operations of APM-F 340, scheduler 345, and acceleration engines 350-1 and 350-2), repeat description of their operations is omitted in subsequent embodiments of the inventive concept.

Second Example Embodiment

Figure 5:
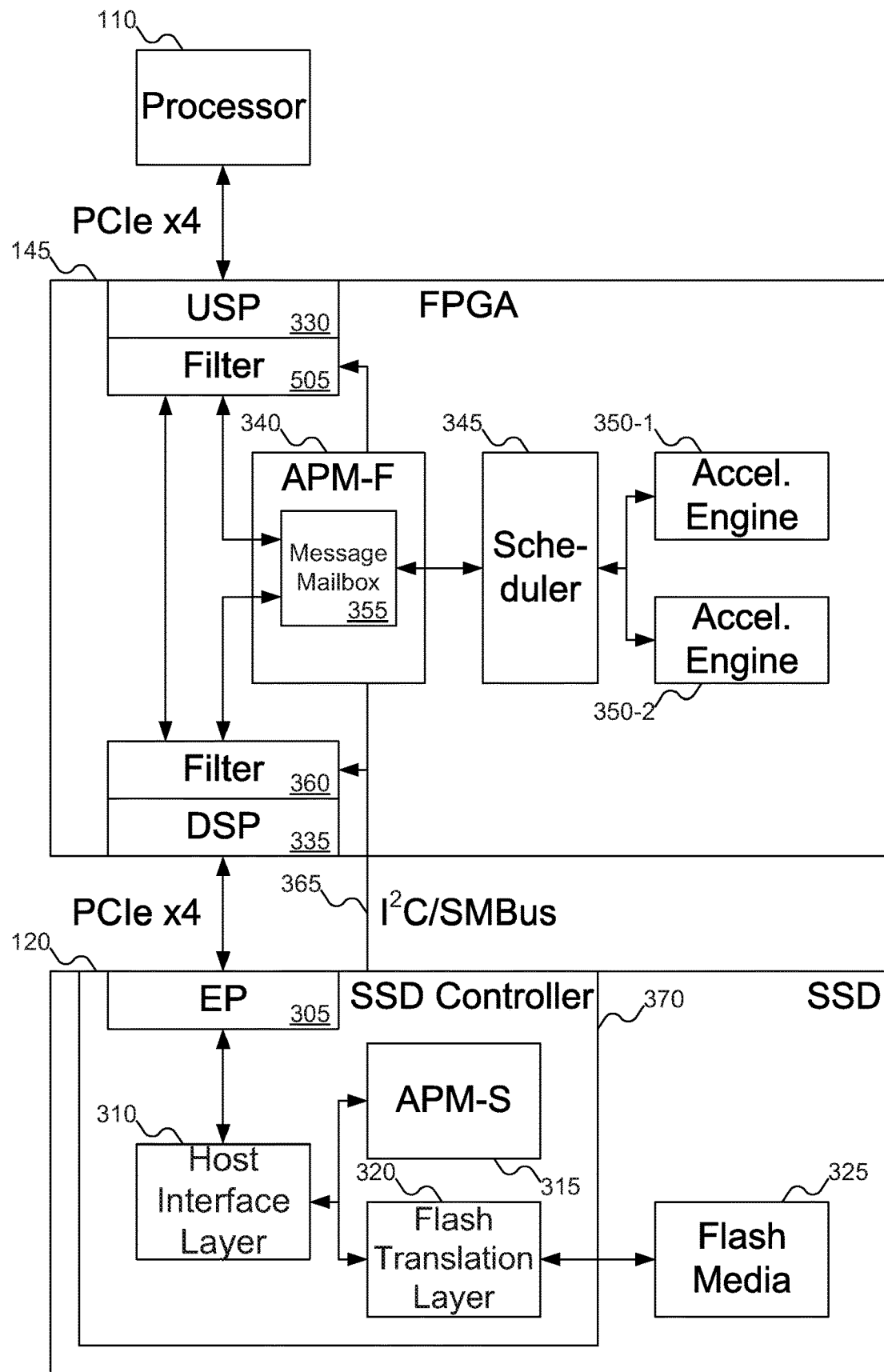
FIG. 5 shows components of the acceleration module of FIG. 1 and the storage device of FIG. 1, according to a second embodiment of the inventive concept.

FIG. 5 shows components of FPGA 145 of FIG. 1 and SSD 120 of FIG. 1, according to a second embodiment of the inventive concept. The second embodiment of the inventive concept is similar to the first embodiment of the inventive concept, except that upstream port 330 also includes a filter: upstream filter 505. Upstream filter 505 may filter PCIe transactions coming from processor 110 (received via upstream port 330) in a manner similar to downstream filter 360. For example, SSD 120 may define an upstream FAR similar to downstream FAR 420 of FIG. 4 and program upstream filter 505 with the upstream FAR using sideband bus 365, a PCIe VDM, or any other mechanism. Then, when FPGA 145 receives a PCIe transaction from processor 110 at upstream port 330, upstream filter 505 may check the PCIe transaction to see if it includes an address in the upstream FAR. If so, then the PCIe transaction is an acceleration instruction, and FPGA 145 may route the PCIe transaction to APM-F 340 for processor rather than delivering the PCIe transaction to SSD 120.

Figure 6:
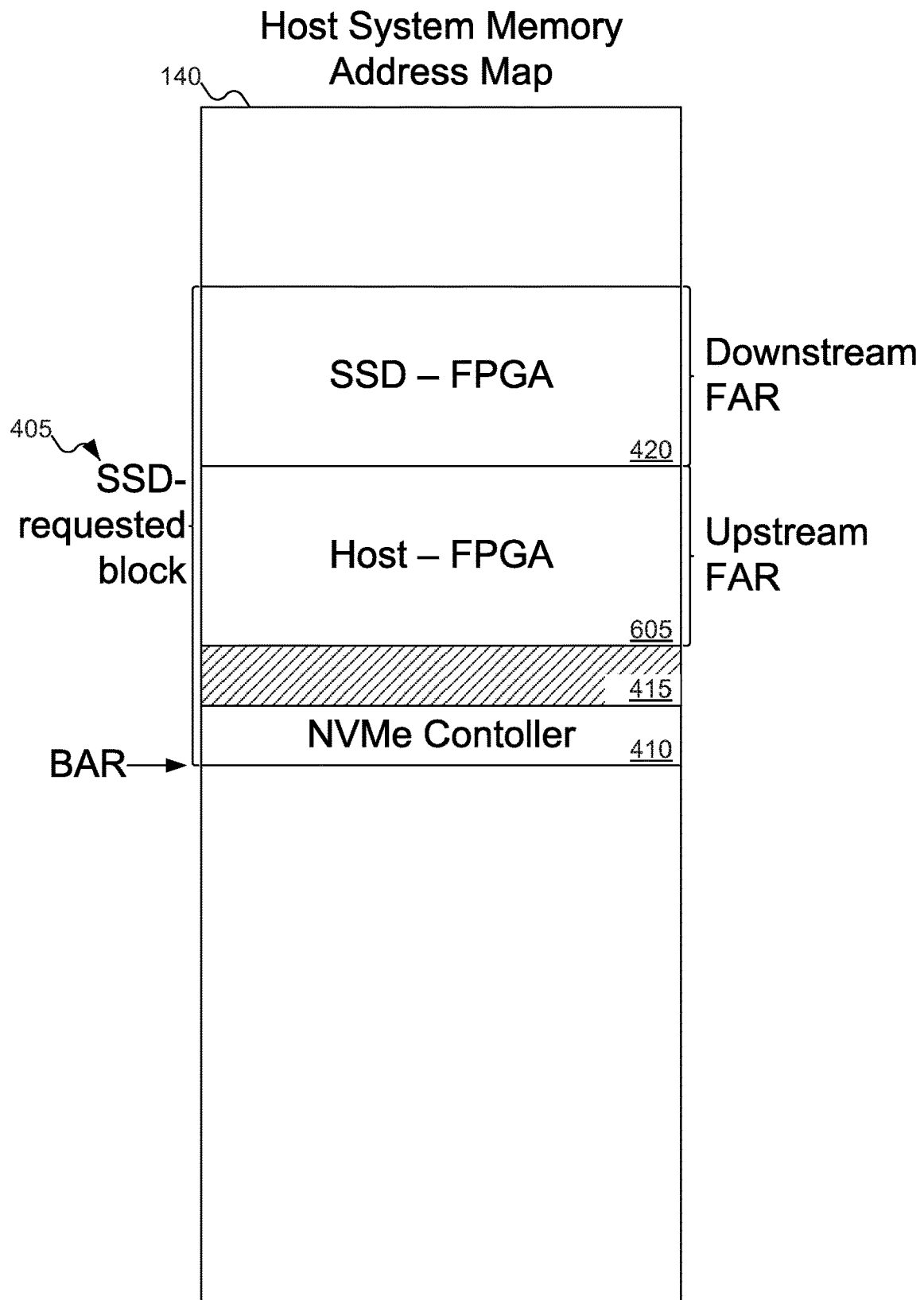
FIG. 6 shows memory usage for accelerating instructions in the system of FIG. 1, according to the second embodiment of the inventive concept.

FIG. 6 shows memory usage for accelerating instructions in the system of FIG. 1, according to the second embodiment of the inventive concept. Like in the first embodiment of the inventive concept, SSD 120 may request a block of host system memory addresses that is larger than the range of addresses SSD 120 needs to support NVMe commands, and may receive block 405 in response with its BAR. SSD 120 may then set aside one subset 410 of block 405 for NVMe communications, another subset 415 may be unused, a third subset may be set aside as downstream FAR 420, and a fourth subset may be set aside as upstream FAR 605.

Returning to FIG. 5, in the second embodiment of the inventive concept, processor 110 still does not directly "see" FPGA 145, as FPGA 145 is not a discoverable device. But SSD 120 may inform processor 110 of upstream FAR 605 of FIG. 6 by programming the base address of upstream FAR 605 of FIG. 6 in a special register in subset 410 of FIG. 6 for NVMe communications. Upon reading this special register from subset 410 of FIG. 6 for NVMe communications, processor 110 may become aware of upstream FAR 605 of FIG. 6. Then processor 110 may send acceleration instructions to FPGA 145 (via upstream port 330), rather than sending a special command to APM-S 315 of SSD 120, which then becomes responsible for issuing the acceleration instruction to FPGA 145.

In FIG. 5, like in FIG. 3, FPGA 145 is shown including the parts that enable communication with processor 110 and SSD 120: specifically, upstream port 330, upstream filter 505, downstream port 335, and downstream filter 360. As with the embodiments of the inventive concept shown in FIG. 3, the components relating to filtering of PCIe transactions may be removed from FPGA 145. Thus, in the second embodiment of the inventive concept, upstream port 330 and upstream filter 335 may be placed in a first bridging component and downstream port 335 and downstream filter 360 may be placed in a second bridging component, each handling filtering of PCIe transactions different components of FIG. 5. Alternatively, only one of these bridging components might be used (with FPGA 145 handling its own filtering for communications from the other source), or a single bridging component may be used to handle all filtering for FPGA 145, regardless of the source of the PCIe transaction.

Third Example Embodiment

Figure 7:
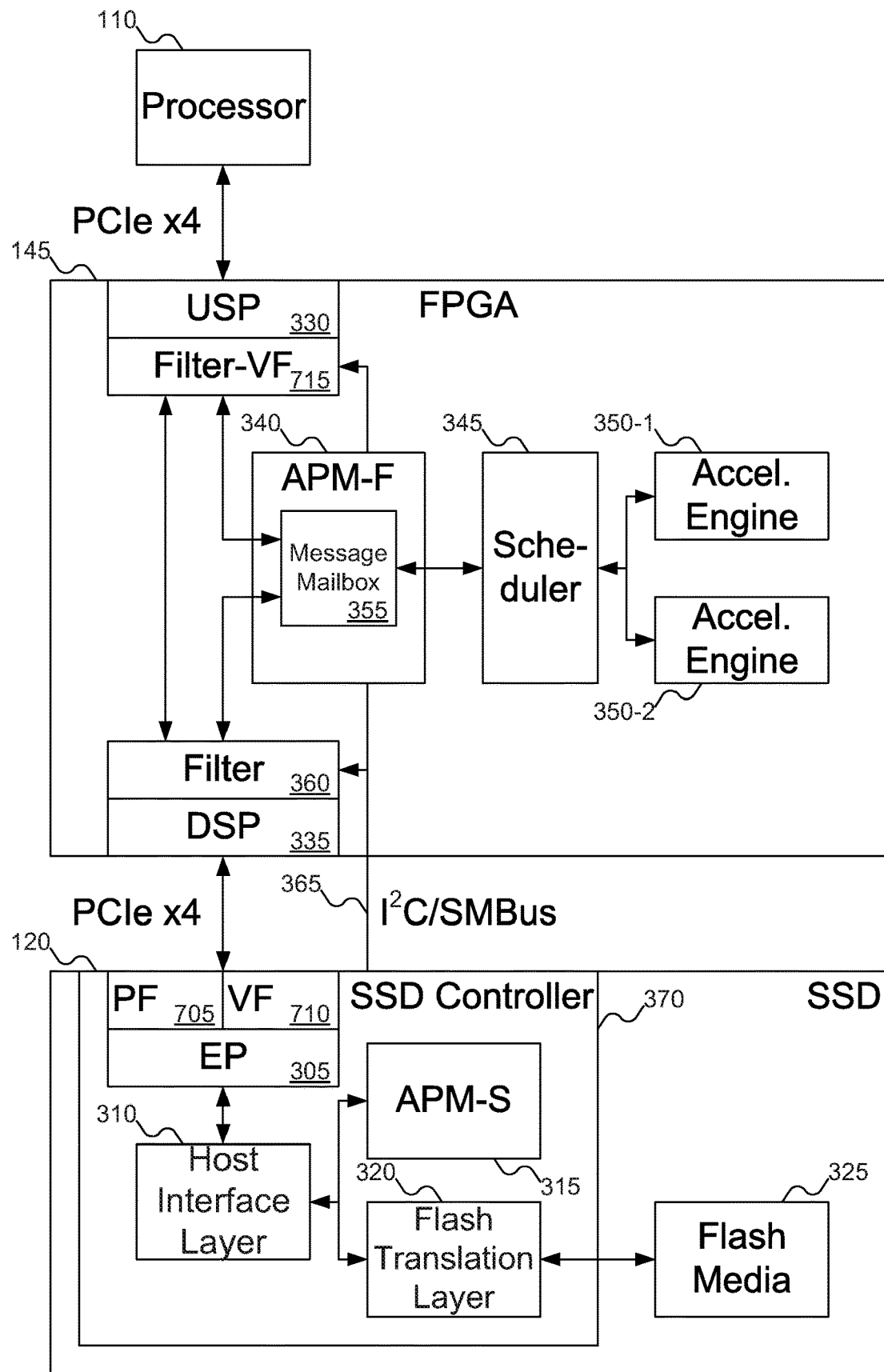
FIG. 7 shows components of the acceleration module of FIG. 1 and the storage device of FIG. 1, according to a third embodiment of the inventive concept.

FIG. 7 shows components of FPGA 145 of FIG. 1 and SSD 120 of FIG. 1, according to a third embodiment of the inventive concept. In the third embodiment of the inventive concept, SSD 120 includes physical function (PF) 705 and virtual function (VF) 710. (Note that the third embodiment of the inventive concept is not meant to imply that other embodiments of the inventive concept do not include PFs and/or VFs, just that they are not used in the same manner as in the third embodiment of the inventive concept.) PF 705 represents a single resource, such as a function offered by SSD 120. VF 710 represents a function that is associated with a PF, but is "virtualized": that is, for a given PF there may be more than one VF. But instead of representing a virtual function of SSD 120, VF 710 may "expose" FPGA 145: that is, VF 710 may represent the functionality of FPGA 145. (VF 710 is still part of SSD 120 and not part of FPGA 145; but with VF 710 dedicated to expose FPGA 145, any memory addresses associated with VF 710 would not conflict with other devices.) Since PFs and VFs may be discovered by processor 110 when the PCIe devices are enumerated, processor 110 may indirectly discover FPGA 145 through VF 710 even though it is not directly discoverable itself.

Figure 8:
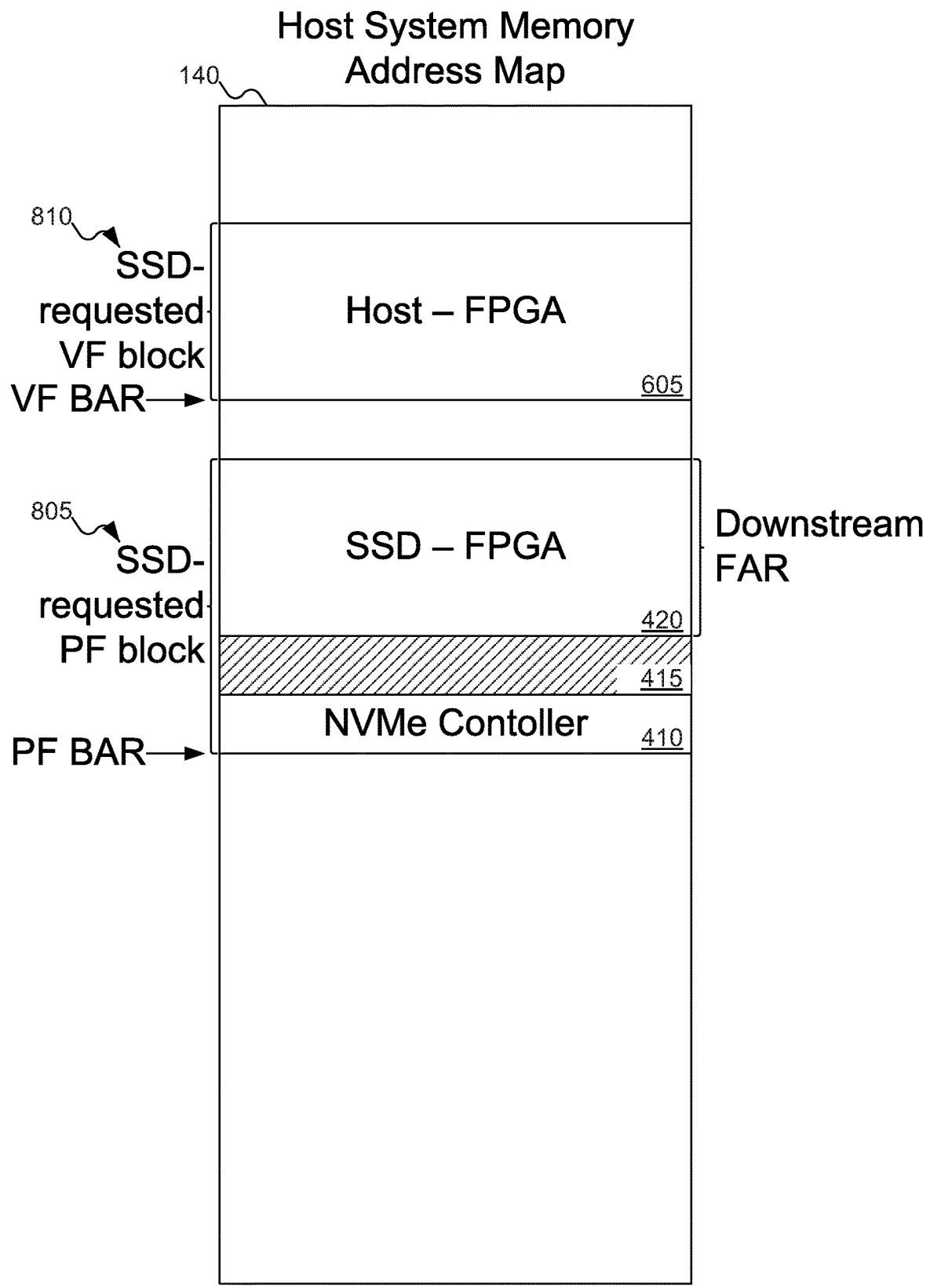
FIG. 8 shows memory usage for accelerating instructions in the system of FIG. 1, according to the third embodiment of the inventive concept.

FIG. 8 shows memory usage for accelerating instructions in the system of FIG. 1, according to the third embodiment of the inventive concept. Like in the first embodiment of the inventive concept, SSD 120 may request a block of host system memory addresses that is larger than the range of addresses SSD 120 needs to support NVMe commands. But SSD 120 may actually request two different blocks of host system memory addresses: block 805 for PF 705, and block 810 for VF 710. Downstream FAR 420 may be selected as a subset of block 805 for PF 705; upstream FAR 605 may be the entirety of block 810 for VF 710. (Upstream FAR 605 could be selected as just a subset of block 810; but since block 810 is dedicated for use by VF 710 and VF 710 may have no other purpose than to effectively expose FPGA 145, any memory addresses in block 810 that are not used as part of upstream FAR 605 may be wasted.) Each of blocks 805 and 810 has a separate BAR, enabling SSD 120 to know the range of addresses allocated for each block.

Returning to FIG. 7, similar to the second embodiment of the inventive concept, upstream port 330 also includes a filter: VF filter 715. VF filter 715 may filter PCIe transactions coming from processor 110 (received via upstream port 330) in a manner similar to downstream filter 360. For example, SSD 120 may program VF filter 715 with upstream FAR 605 using sideband bus 365, a PCIe VDM, or any other mechanism. Then, when FPGA 145 receives a PCIe transaction from processor 110 at upstream port 330, VF filter 715 may check the PCIe transaction to see if it includes an address in upstream FAR 605. If so, then the PCIe transaction is an acceleration instruction, and FPGA 145 may route the PCIe transaction to APM-F 340 for processor rather than delivering the PCIe transaction to SSD 120.

As an alternative, SSD 120 may program VF filter 715 with an identifier of VF 710. VF filter 715 may then examine a PCIe transaction received from processor 110 at upstream port 330 to see if it includes the identifier of VF 710. If the PCIe transaction includes the identifier of VF 710, then FPGA 145 may route the PCIe transaction to APM-F 340 for processor rather than delivering the PCIe transaction to SSD 120.

In FIG. 7, as in the earlier embodiments of the inventive concept, FPGA 145 is shown including the parts that enable communication with processor 110 and SSD 120: specifically, upstream port 330, VF filter 715, downstream port 335, and downstream filter 360. As with the embodiments of the inventive concept shown earlier, the components relating to filtering of PCIe transactions may be removed from FPGA 145. Thus, in the third embodiment of the inventive concept, upstream port 330 and VF filter 715 may be placed in a first bridging component and downstream port 335 and downstream filter 360 may be placed in a second bridging component, each handling filtering of PCIe transactions different components of FIG. 7. Alternatively, only one of these bridging components might be used (with FPGA 145 handling its own filtering for communications from the other source), or a single bridging component may be used to handle all filtering for FPGA 145, regardless of the source of the PCIe transaction.

Fourth Example Embodiment

One problem with using VF 710 to expose FPGA 145 is that using VFs may require support from the host operating system of processor 110. While some operating systems support VFs, not all operating systems support VFs, and supporting VFs entails its own complexity for the operating system. A fourth embodiment of the inventive concept addresses the difficulties of using VFs.

Figure 9:
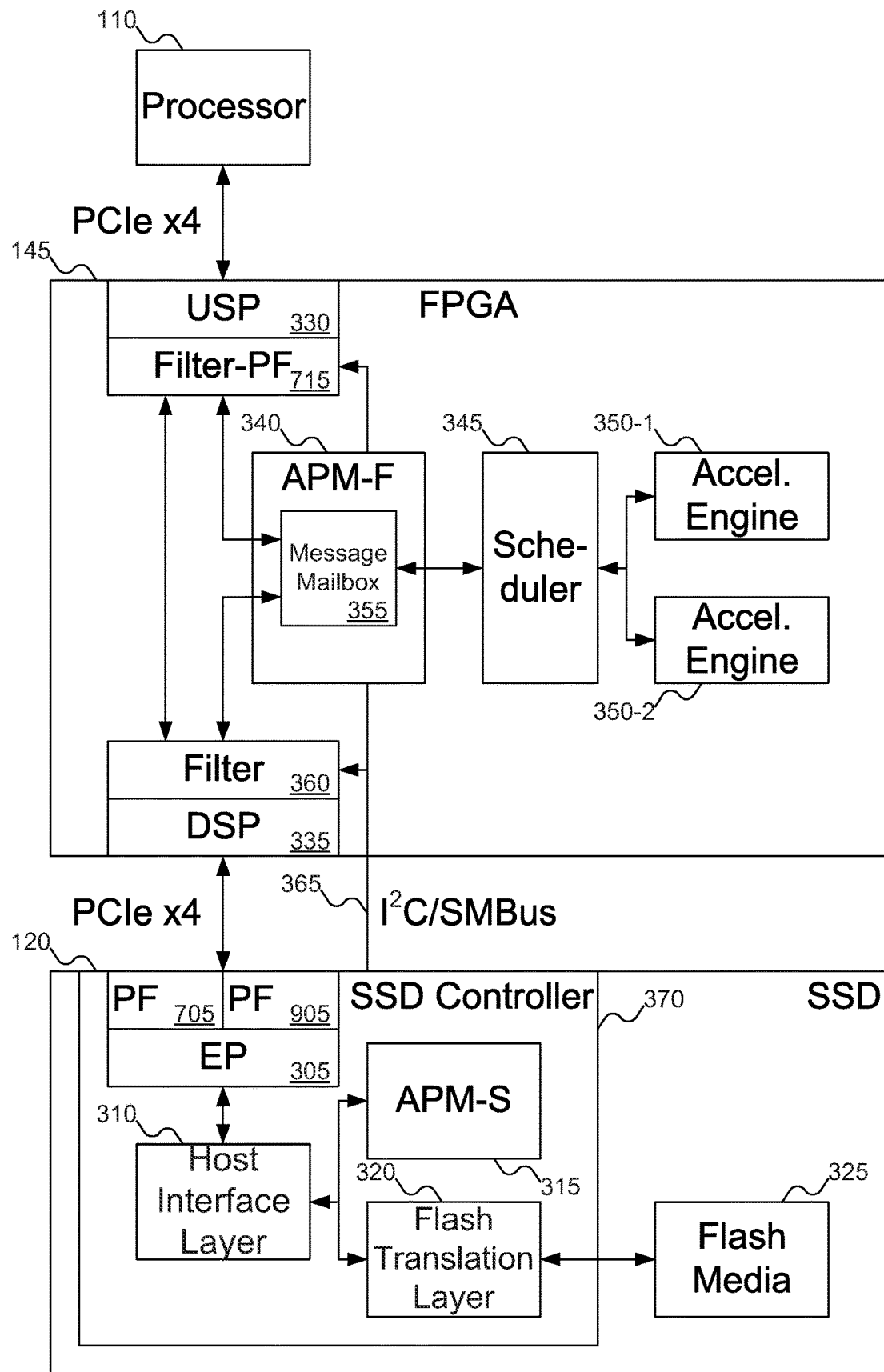
FIG. 9 shows components of the acceleration module of FIG. 1 and the storage device of FIG. 1, according to a fourth embodiment of the inventive concept.

FIG. 9 shows components of FPGA 145 of FIG. 1 and SSD 120 of FIG. 1, according to a fourth embodiment of the inventive concept. In contrast with the third embodiment of the inventive concept, in the fourth embodiment of the inventive concept, SSD 120 includes two PF 705 and 905. (Like the third embodiment of the inventive concept, the fourth embodiment of the inventive concept is not meant to imply that other embodiments of the inventive concept do not include PFs and/or VFs.) PF 705 continues to represent a single resource, such as a function offered by SSD 120. PF 905, on the other hand, exposes FPGA 145. Again, since PFs may be discovered by processor 110 when the PCIe devices are enumerated, processor 110 may indirectly discover FPGA 145 through PF 905 even though it is not directly discoverable itself.

Figure 10:
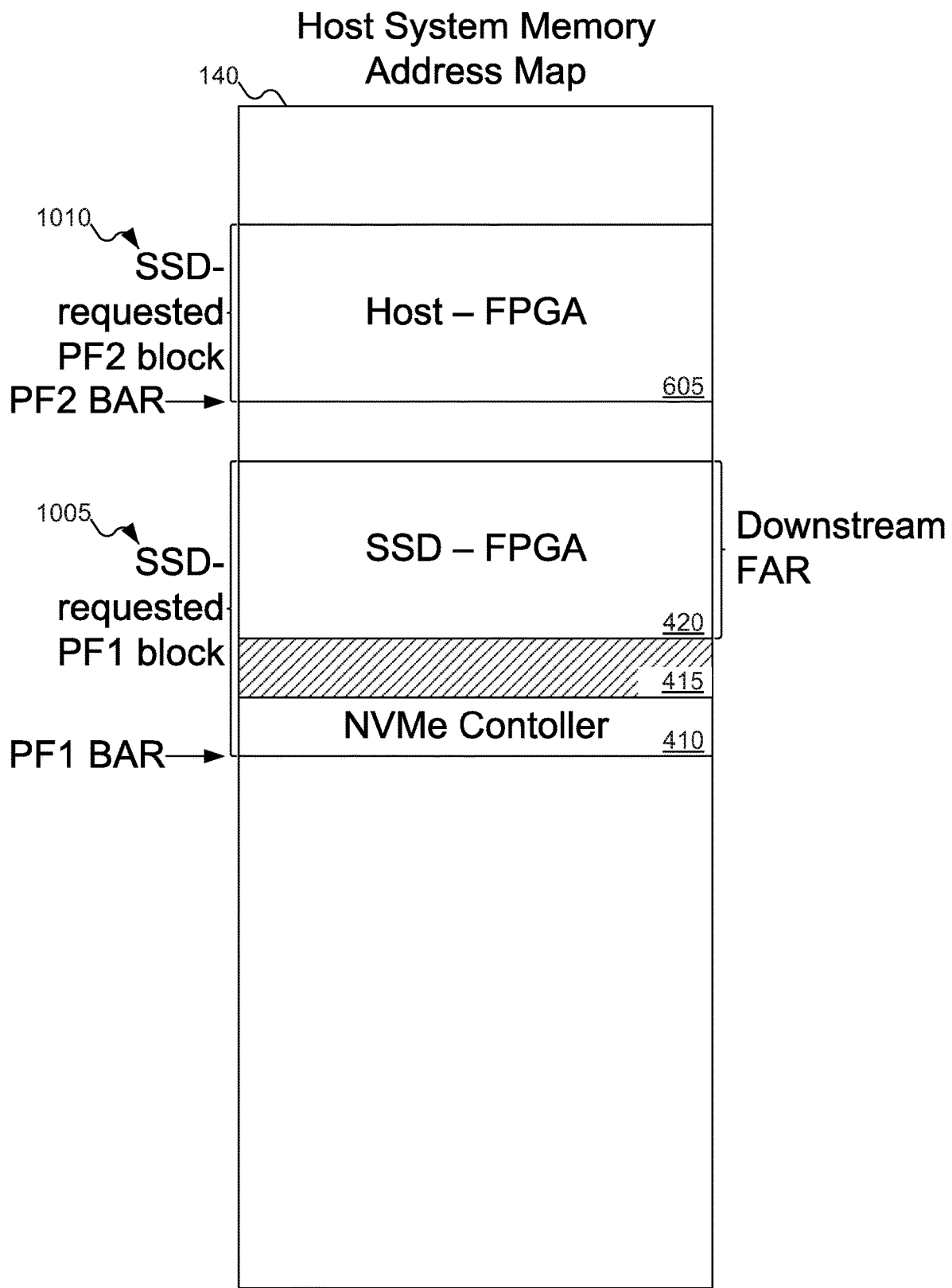
FIG. 10 shows memory usage for accelerating instructions in the system of FIG. 1, according to the fourth embodiment of the inventive concept.

FIG. 10 shows memory usage for accelerating instructions in the system of FIG. 1, according to the fourth embodiment of the inventive concept. Like in the third embodiment of the inventive concept, SSD 120 may request two different blocks of host system memory addresses: block 1005 for PF 705, and block 1010 for PF 905. Downstream FAR 420 may be selected as a subset of block 1005 for PF 705; upstream FAR 605 may be the entirety of block 1010 for PF 905. (Again, upstream FAR 605 could be selected as just a subset of block 1010; but since block 1010 is dedicated for use by PF 905 and PF 905 may have no other purpose than to effectively expose FPGA 145, any memory addresses in block 1010 that are not used as part of upstream FAR 605 may be wasted.) Each of blocks 1005 and 1010 has a separate BAR, enabling SSD 120 to know the range of addresses allocated for each block.

Returning to FIG. 9, similar to the third embodiment of the inventive concept, upstream port 330 also includes a filter: PF filter 715 (PF filter 715 is virtually identical to VF filter 715 of FIG. 7 in operation, and the name change is more to correlate with the type of function used to expose FPGA 145 than because PF filter 715 operates differently from VF filter 715). PF filter 715 may filter PCIe transactions coming from processor 110 (received via upstream port 330) in a manner similar to downstream filter 360. For example, SSD 120 may program PF filter 715 with upstream FAR 605 using sideband bus 365, a PCIe VDM, or any other mechanism. Then, when FPGA 145 receives a PCIe transaction from processor 110 at upstream port 330, PF filter 715 may check the PCIe transaction to see if it includes an address in upstream FAR 605. If so, then the PCIe transaction is an acceleration instruction, and FPGA 145 may route the PCIe transaction to APM-F 340 for processor rather than delivering the PCIe transaction to SSD 120.

As an alternative, SSD 120 may program PF filter 715 with an identifier of PF 905. PF filter 715 may then examine a PCIe transaction received from processor 110 at upstream port 330 to see if it includes the identifier of PF 905. If the PCIe transaction includes the identifier of PF 905, then FPGA 145 may route the PCIe transaction to APM-F 340 for processor rather than delivering the PCIe transaction to SSD 120.

In FIG. 9, as in the earlier embodiments of the inventive concept, FPGA 145 is shown including the parts that enable communication with processor 110 and SSD 120: specifically, upstream port 330, PF filter 715, downstream port 335, and downstream filter 360. As with the embodiments of the inventive concept shown earlier, the components relating to filtering of PCIe transactions may be removed from FPGA 145. Thus, in the fourth embodiment of the inventive concept, upstream port 330 and PF filter 715 may be placed in a first bridging component and downstream port 335 and downstream filter 360 may be placed in a second bridging component, each handling filtering of PCIe transactions different components of FIG. 9. Alternatively, only one of these bridging components might be used (with FPGA 145 handling its own filtering for communications from the other source), or a single bridging component may be used to handle all filtering for FPGA 145, regardless of the source of the PCIe transaction.

Fifth Example Embodiment

The fourth embodiment of the inventive concept addresses the difficulties of using a VF, as in the third embodiment of the inventive concept. But to use the fourth embodiment of the inventive concept, SSD 120 needs to offer PF 905 dedicated for the use of FPGA 145. Not every SSD (or more generally, storage device) has an available PF that may be dedicated for the use of FPGA 145. A fifth embodiment of the inventive concept provides a solution whereby SSD 120 does not need to offer multiple PFs.

Figure 11:
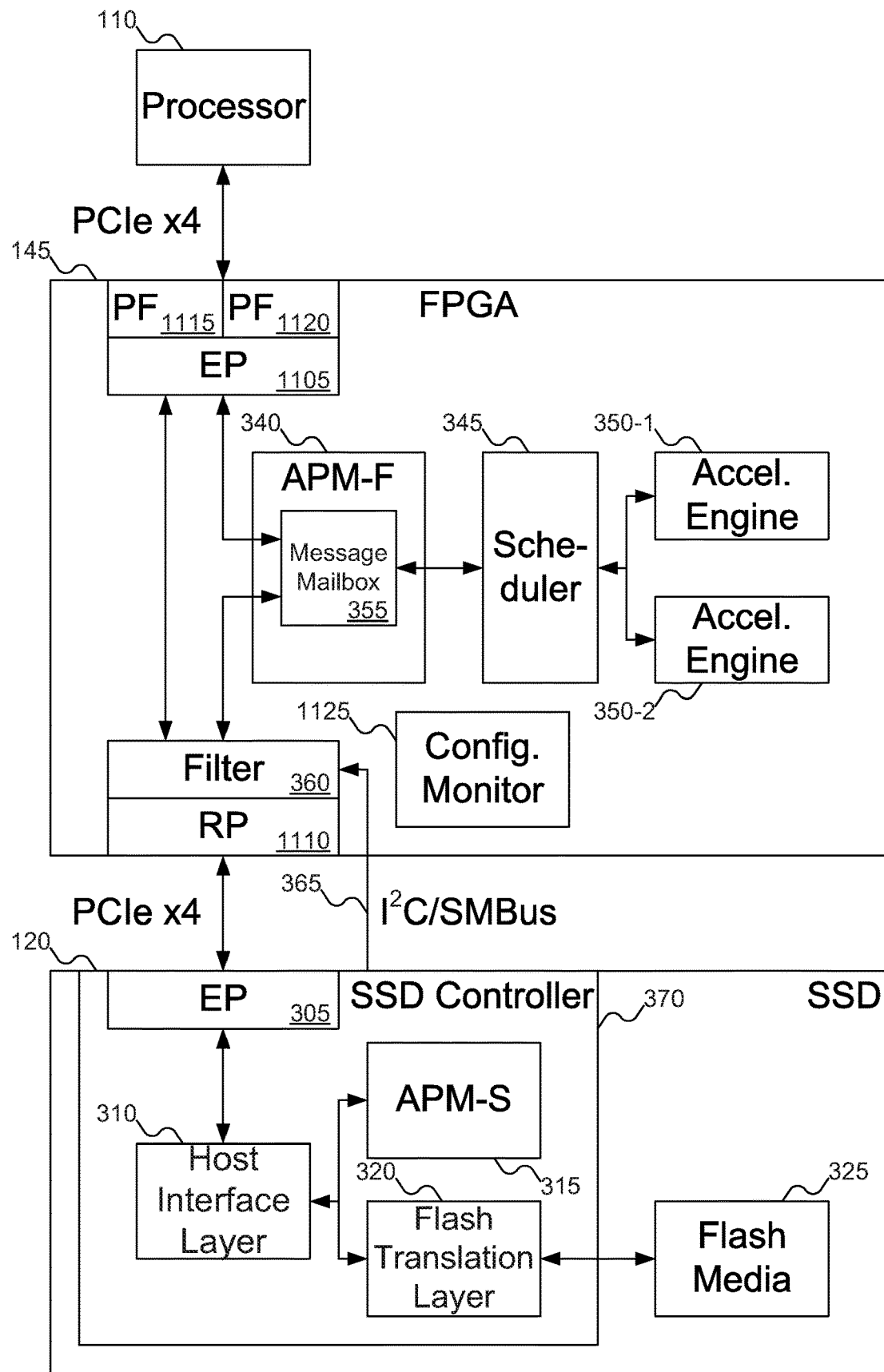
FIG. 11 shows components of the acceleration module of FIG. 1 and the storage device of FIG. 1, according to a fifth embodiment of the inventive concept.

FIG. 11 shows components of FPGA 145 of FIG. 1 and SSD 120 of FIG. 1, according to a fifth embodiment of the inventive concept. In FIG. 11, SSD 120 returns to the structure shown in FIGS. 3 and 5, not needing to offer PFs and/or VFs. (Again, this is not to say that SSD 120 may not offer PFs and/or VFs, just that SSD 120 is not required to offer additional PFs and/or VFs.)

In comparison with the first through fourth embodiments of the inventive concept, in the fifth embodiment of the inventive concept FPGA 145 is somewhat different. Instead of including upstream port 330 and downstream port 335 as in FIGS. 3, 5, 7, and 9, FPGA 145 may include endpoint 1105 and root port 1110 (the term "port" may be used interchangeably with "root port"). Whereas upstream port 330 and downstream port 335 of FIGS. 3, 5, 7, and 9 may be thought of as switches—they are effectively pass-through devices—endpoint 1105 and root port 1110 are termination points for communications, discoverable through PCIe enumeration. This fact means that endpoint 1105 and root port 1110 include their own PCIe configuration spaces, discussed below with reference to FIG. 12. But since endpoint 1105 and root port 1110 are termination points for communications, processor 110 and SSD 120 direct their communications to endpoint 1105 and root port 1110, respectively, rather than directing communications to each other.

Endpoint 1105 may include two PFs 1115 and 1120 (or alternatively, one PF and one VF: all that matters is that endpoint 1105 includes two functions that may be distinguished from each other). When processor 110 sends a PCIe transaction to endpoint 1105, processor 110 may specify which PFs is being addressed. Similar to the third and fourth embodiments of the inventive concept described above, endpoint 1105 may identify which PF is being addressed by a tag included in the PCIe transaction that identifies the PF, or by an address associated with the PCIe transaction (again, discussed below with reference to FIG. 12). PCIe transactions that identify PF 1115 may be considered destined for SSD 120 and may be sent by FPGA 145 to SSD 120 via root port 1110. PCIe transaction that identify PF 1120 may be considered to include acceleration instructions, and may be routed to APM-F 340.

Root port 1110 may include downstream filter 360. Downstream filter 360 operates similarly to downstream filter 360 of FIGS. 3, 5, 7, 9, and 11: the only significant difference is that downstream filter does not filter based on host system memory addresses, but rather based on FPGA memory addresses, as discussed below with reference to FIG. 12. Downstream filter 360 may be programmed with downstream FAR 410 by SSD 120 using sideband bus 365, a PCIe VDM, or any other desired mechanism.

FPGA 145 may also include configuration monitor 1125. Because FPGA 145 is not replacing SSD 120 but merely offering an additional functionality, and because FPGA 145 is interposed between processor 110 and SSD 120, it is important for processor 110 to be able to see the functionality offered by SSD 120. More particularly, FPGA 145 should advertise the capabilities that match the PCIe configuration space of SSD 120. To that end, configuration monitor 1125 may replicate the PCIe configuration space of SSD 120, thereby offering processor 110 the same PCIe configuration as SSD 120 would present.

Figure 12:
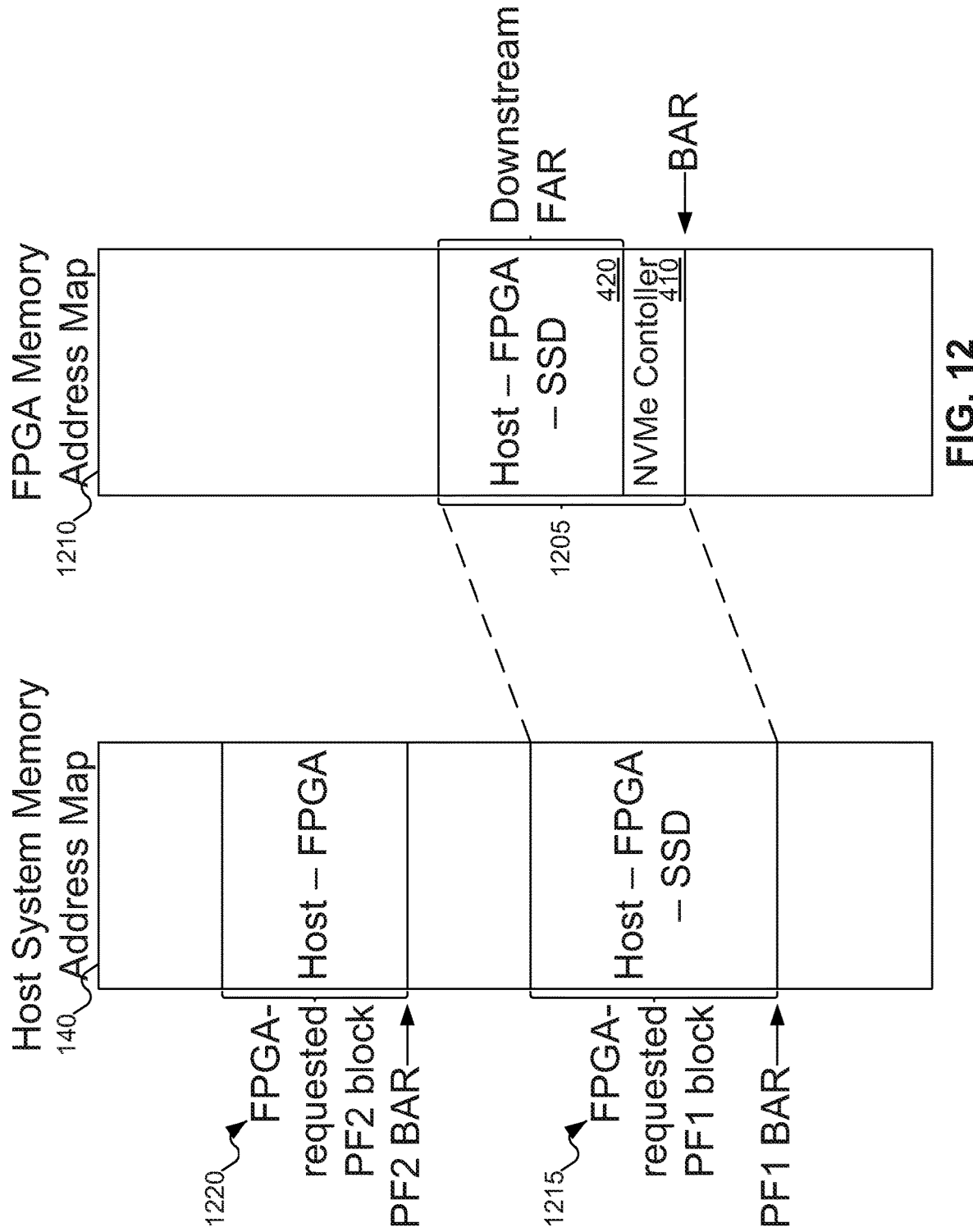
FIG. 12 shows memory usage for accelerating instructions in the system of FIG. 1, according to the fifth embodiment of the inventive concept.

FIG. 12 shows memory usage for accelerating instructions in the system of FIG. 1, according to the fifth embodiment of the inventive concept. In FIG. 12, SSD 120 does not request a block of host system memory addresses, since SSD 120 is not communicating directly with processor 110 anymore. Instead, SSD 120 requests block 1205 of FPGA memory addresses from address map 1210, which includes the configuration space for root port 1110. Block 1205 may include subset 410 for NVMe communications with processor 110, and downstream FAR 420. Block 1205 may be identified by a BAR.

To provide a mechanism by which processor 110 may communicate with SSD 120 as would be expected without FPGA 145, FPGA 145 may request host system memory addresses from processor 110. To parallel block 1205 as requested by SSD 120 of FPGA 145, FPGA 145 may request block 1215 for PF 1115, which should be at least as large as block 1205 (thereby appearing as though SSD 120 had requested block 1215 from processor 110). Block 1215 is labeled "Host-FPGA-SSD" in FIG. 12 to reflect that PCIe transactions using addresses in block 1215 are for communication between the host and SSD 120, but pass through FPGA 145. FPGA 145 may also request block 1220 for PF 1120, providing a mechanism for processor 110 to communicate with APM-F 340 about acceleration instructions. Blocks 1215 and 1220 may each be identified by two separate BARs. In yet another embodiment of the inventive concept it is possible to use part of block 1220 as downstream FAR 420 to facilitate communication between FPGA 145 and SSD 120.

In FIG. 11, as in the earlier embodiments of the inventive concept, FPGA 145 is shown including the parts that enable communication with processor 110 and SSD 120: specifically, endpoint 1105, PFs 1115 and 1120, root port 1110, and downstream filter 360. As with the embodiments of the inventive concept shown earlier, the components relating to filtering of PCIe transactions may be removed from FPGA 145. Thus, in the fifth embodiment of the inventive concept, endpoint 1105 and PFs 1115 and 1120 may be placed in a first bridging component and root port 1110 and downstream filter 360 may be placed in a second bridging component, each handling filtering of PCIe transactions different components of FIG. 11. Alternatively, only one of these bridging components might be used (with FPGA 145 handling its own filtering for communications from the other source), or a single bridging component may be used to handle all filtering for FPGA 145, regardless of the source of the PCIe transaction.

Sixth Example Embodiment

The fifth embodiment of the inventive concept still relies on downstream filter 360 to separate acceleration instructions (between SSD 120 and FPGA 145) from conventional PCIe transactions (between processor 110 and SSD 120). Downstream filter 360 may be eliminated where SSD 120 includes a second endpoint, as in a sixth embodiment of the inventive concept.

Figure 13:
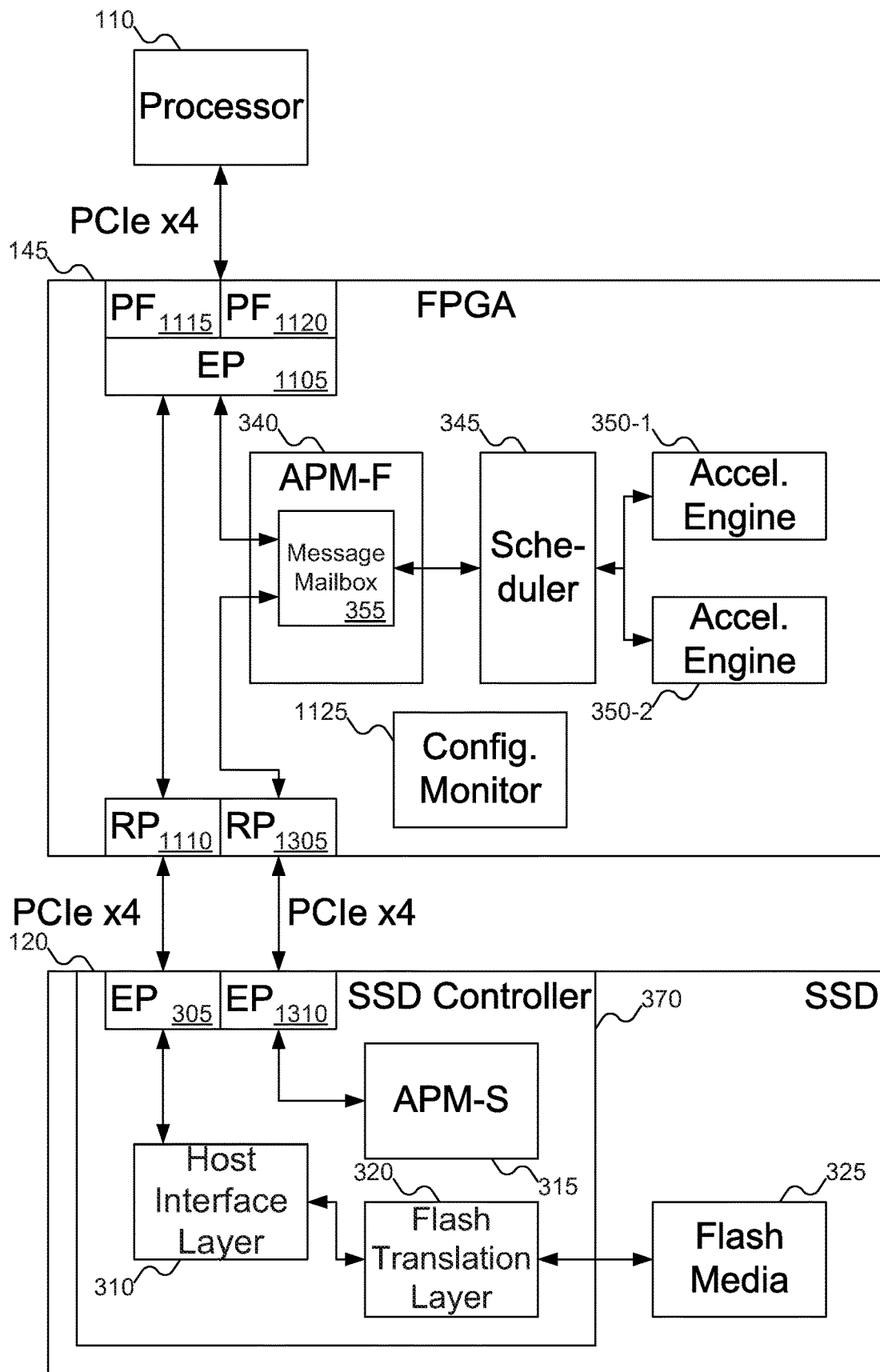
FIG. 13 shows components of the acceleration module of FIG. 1 and the storage device of FIG. 1, according to a sixth embodiment of the inventive concept.

FIG. 13 shows components of FPGA 145 of FIG. 1 and SSD 120 of FIG. 1, according to a sixth embodiment of the inventive concept. In FIG. 13, FPGA includes two root ports 1110 and 1305, rather than just the one root port 1110 shown in the embodiment of FIG. 11. Root port 1110 may be used for conventional PCIe transactions originating from processor 110; root port 1305 may be used for acceleration instructions and data exchanged between SSD 120 and FPGA 145.

Since acceleration instructions are naturally separated from conventional PCIe transactions originating from processor 110 using different root ports 1110 and 1305, there is no need for downstream filter 360 of FIGS. 3, 5, 7, 9, and 11. This fact means that SSD 120 is relieved of the burden to program downstream filter 360 in FPGA 360, just like SSD 120 was relieved of the burden to program upstream filters 505 and 715 of FIGS. 5, 7, and 9 (as FPGA 145 in FIGS. 11 and 13 may distinguish between conventional PCIe transactions and acceleration instructions based on the associated PF). The offset for this benefit is that SSD 120 includes two endpoints 305 and 1310, to communicate with root ports 1110 and 1305 of FPGA 145, respectively.

Figure 14:
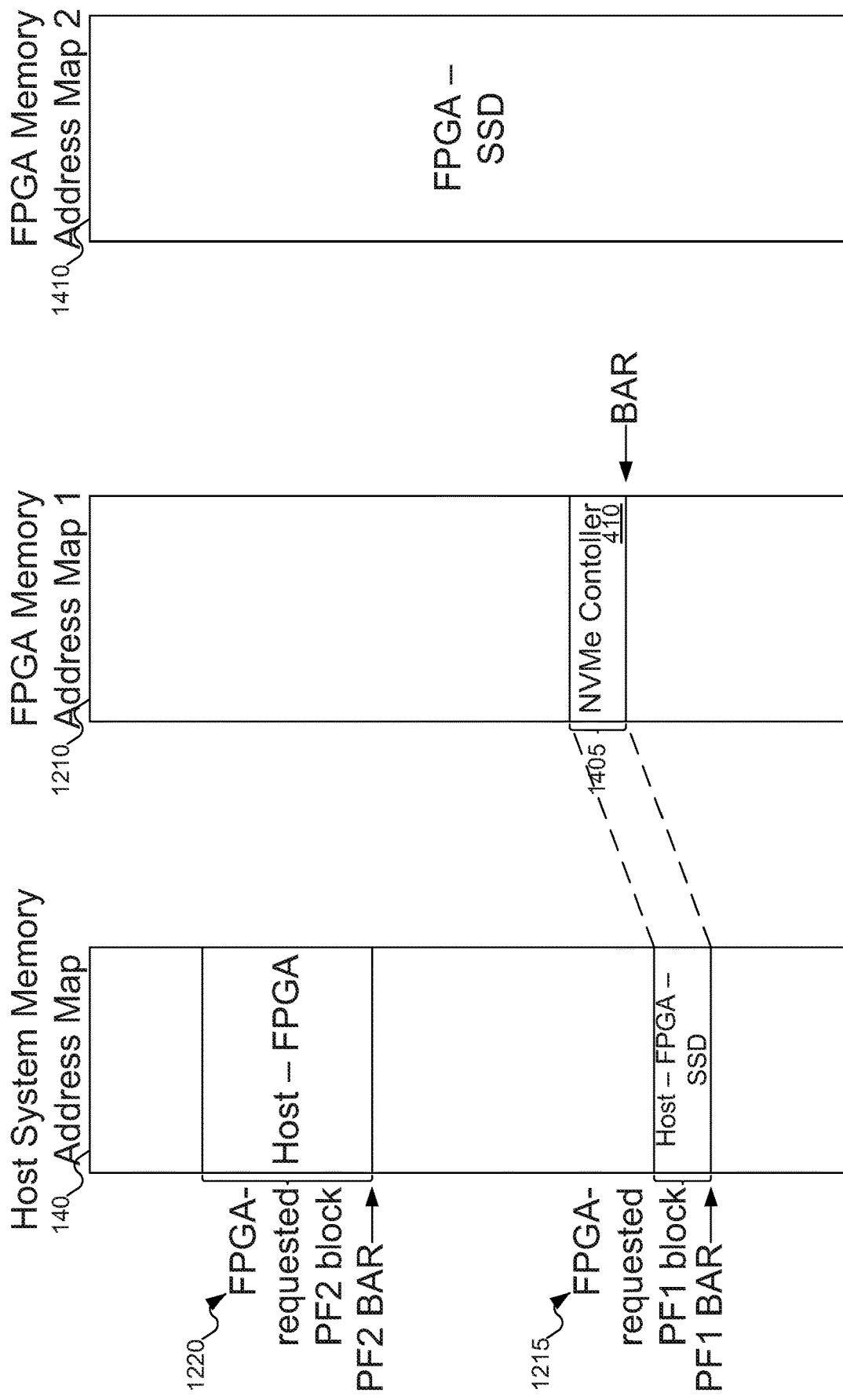
FIG. 14 shows memory usage for accelerating instructions in the system of FIG. 1, according to the sixth embodiment of the inventive concept.

Because SSD 120 includes two endpoints 305 and 1310 in the sixth embodiment of the inventive concept, each of endpoints 305 and 1310 may request its own block of memory addresses from FPGA 145. Furthermore, since each of root ports 1110 and 1305 includes its own configuration space, endpoints 305 and 1310 of SSD 120 may request a block of memory addresses from different configuration spaces. FIG. 14 illustrates this scenario.

FIG. 14 shows memory usage for accelerating instructions in the system of FIG. 1, according to the sixth embodiment of the inventive concept. In FIG. 14, endpoint 305 of SSD 120 may request block 1405 from address map 1210, which includes the configuration space for root port 1110. But since conventional PCIe transactions (between processor 110 and SSD 120) and acceleration instructions (between FPGA 145 and SSD 120) are naturally separated by the use of different root ports on FPGA 145 and different endpoints on SSD 120, SSD 120 does not need to request block 1405 to be large enough to include a downstream FAR. Thus, block 1405 only needs to be as large as it might be without FPGA 145: that is, large enough to support NVMe communications between processor 110 and SSD 120. Block 1405 may be identified by a BAR.

Endpoint 1310 of SSD 120 may request its own block of memory addresses from address map 1410. But since root port 1305 and endpoint 1310 are used just to exchange acceleration instructions in the sixth embodiment of the inventive concept, the entirety of address map 1410 may be used for such PCIe transactions: there is no need for endpoint 1310 to request merely a small block of address map 1410.

As in the fifth embodiment of the inventive concept, PF 1115 may request block 1215 of host system memory addresses, to manage PCIe transactions exchanged between processor 110 and SSD 120; block 1215 may be at least as large as block 1405. Similarly, PF 1120 may request block 1220 of host system memory addresses, to manage acceleration instructions exchanged between processor 110 and FPGA 145. Blocks 1215 and 1220 may each be identified by a BAR.

In FIG. 13, as in the earlier embodiments of the inventive concept, FPGA 145 is shown including the parts that enable communication with processor 110 and SSD 120: specifically, endpoint 1105, PFs 1115 and 1120, and root ports 1110 1305. As with the embodiments of the inventive concept shown earlier, the components relating to filtering of PCIe transactions may be removed from FPGA 145. Thus, in the sixth embodiment of the inventive concept, endpoint 1105 and PFs 1115 and 1120 may be placed in a first bridging component and root ports 1110 and 1305 may be placed in a second bridging component, each handling filtering of PCIe transactions different components of FIG. 13. Alternatively, only one of these bridging components might be used (with FPGA 145 handling its own filtering for communications from the other source), or a single bridging component may be used to handle all filtering for FPGA 145, regardless of the source of the PCIe transaction.

Seventh Example Embodiment

In the first six embodiments of the inventive concept, FPGA 145 is shown using a single upstream port 330 (in FIGS. 5, 7, and 9) or a single endpoint 1105 (in FIGS. 11 and 13). But there is no reason FPGA 145 may not include multiple endpoints just like SSD 120 in the sixth embodiment of the inventive concept. The seventh and eighth embodiments of the inventive concept illustrate how FPGA 145 may operate using multiple endpoints.

Figure 15:
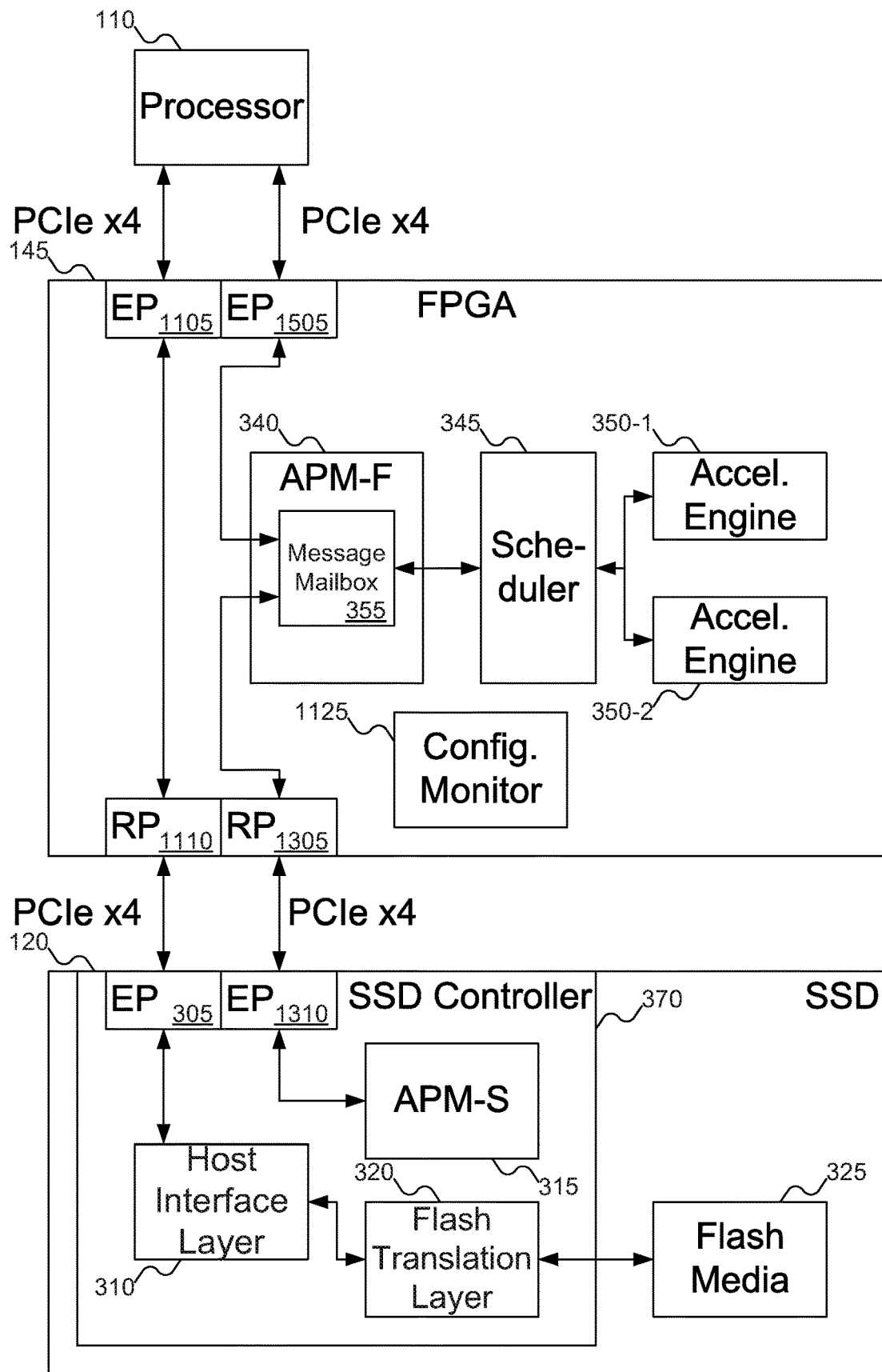
FIG. 15 shows components of the acceleration module of FIG. 1 and the storage device of FIG. 1, according to a seventh embodiment of the inventive concept.

FIG. 15 shows components of FPGA 145 of FIG. 1 and SSD 120 of FIG. 1, according to a seventh embodiment of the inventive concept. The seventh embodiment of the inventive concept is similar to the sixth embodiment of the inventive concept, except that FPGA 145 includes two endpoints 1105 and 1505. Much like endpoints 305 and 1310 of SSD 120 may be used to distinguish between conventional host-to-SSD PCIe transactions and FPGA-to-SSD acceleration instructions, endpoints 1105 and 1505 of FPGA 145 may be used to distinguish between conventional host-SSD PCIe transactions and host-to-FPGA acceleration instructions. PCIe transactions received at endpoint 1105 may be considered conventional PCIe transactions and forwarded to SSD 120 (via root port 1110), whereas PCIe transactions received at endpoint 1505 may be considered acceleration instructions and forwarded to APM-F 340 for processing.

Figure 16:
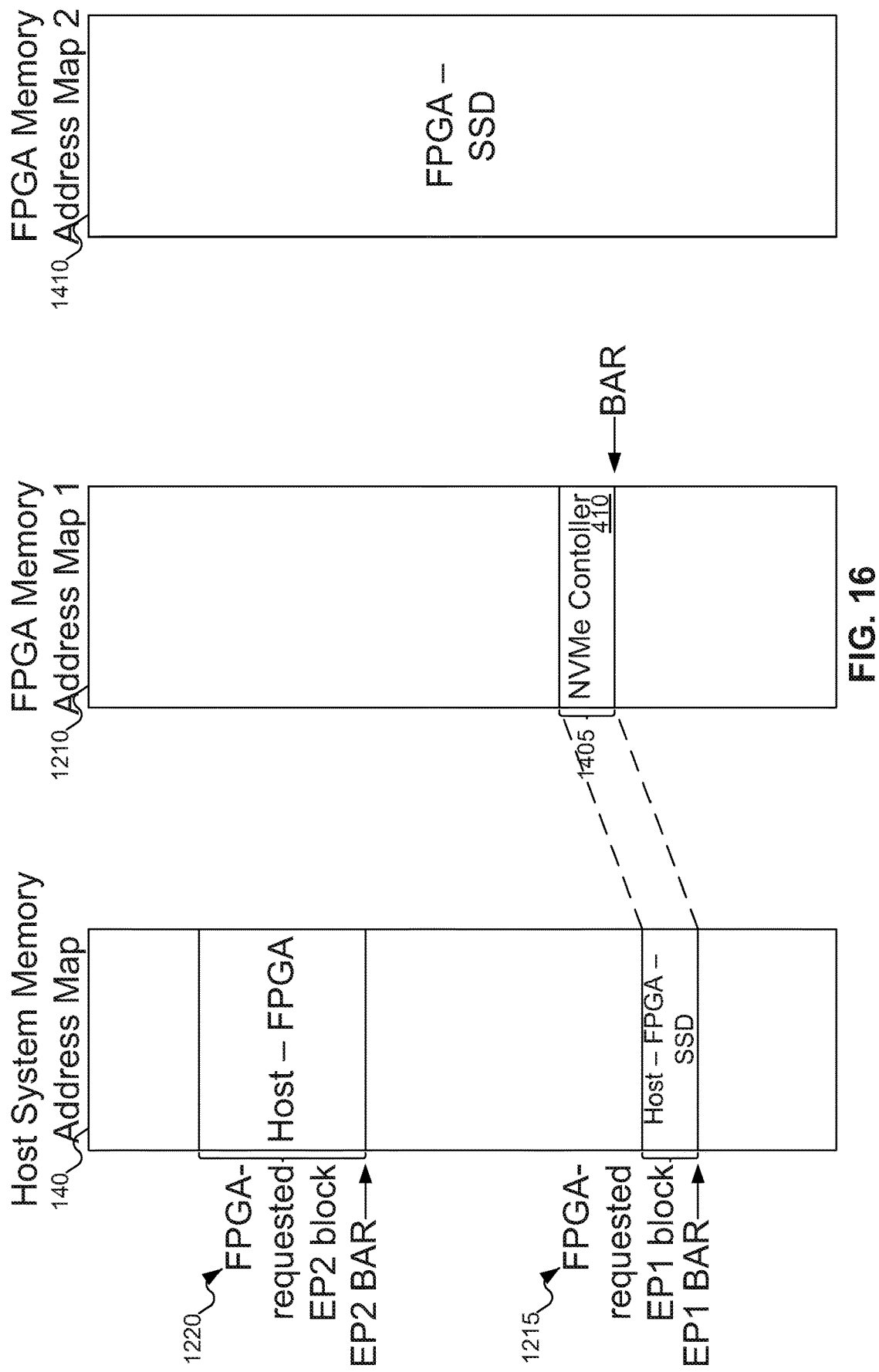
FIG. 16 shows memory usage for accelerating instructions in the system of FIG. 1, according to the seventh embodiment of the inventive concept.

FIG. 16 shows memory usage for accelerating instructions in the system of FIG. 1, according to the seventh embodiment of the inventive concept. For all intents and purposes, memory usage according to the seventh embodiment of the inventive concept is identical to memory usage according to the sixth embodiment. Root ports 1110 and 1305 of FPGA 145 each offer their own configuration space, and endpoint 305 of SSD 120 may request block 1405 from address map 1210 (as with the sixth embodiment of the inventive concept, endpoint 1310 of SSD 120 may request a block from address map 1410, or endpoint 1310 of SSD 120 may use the entirety of address map 1410 for SSD-FPGA communications), identified by a BAR. Endpoints 1105 and 1505 may request blocks 1215 and 1220 of host system memory addresses, to manage PCIe transactions exchanged between processor 110 and SSD 120; block 1215 may be at least as large as block 1405. Blocks 1215 and 1220 may each be identified by a BAR.

In FIG. 15, as in the earlier embodiments of the inventive concept, FPGA 145 is shown including the parts that enable communication with processor 110 and SSD 120: specifically, endpoints 1105 and 1505, and root ports 1110 1305. As with the embodiments of the inventive concept shown earlier, the components relating to filtering of PCIe transactions may be removed from FPGA 145. Thus, in the seventh embodiment of the inventive concept, endpoints 1105 and 1505 may be placed in a first bridging component and root ports 1110 and 1305 may be placed in a second bridging component, each handling filtering of PCIe transactions different components of FIG. 15. Alternatively, only one of these bridging components might be used (with FPGA 145 handling its own filtering for communications from the other source), or a single bridging component may be used to handle all filtering for FPGA 145, regardless of the source of the PCIe transaction.

Eighth Example Embodiment

Figure 17:
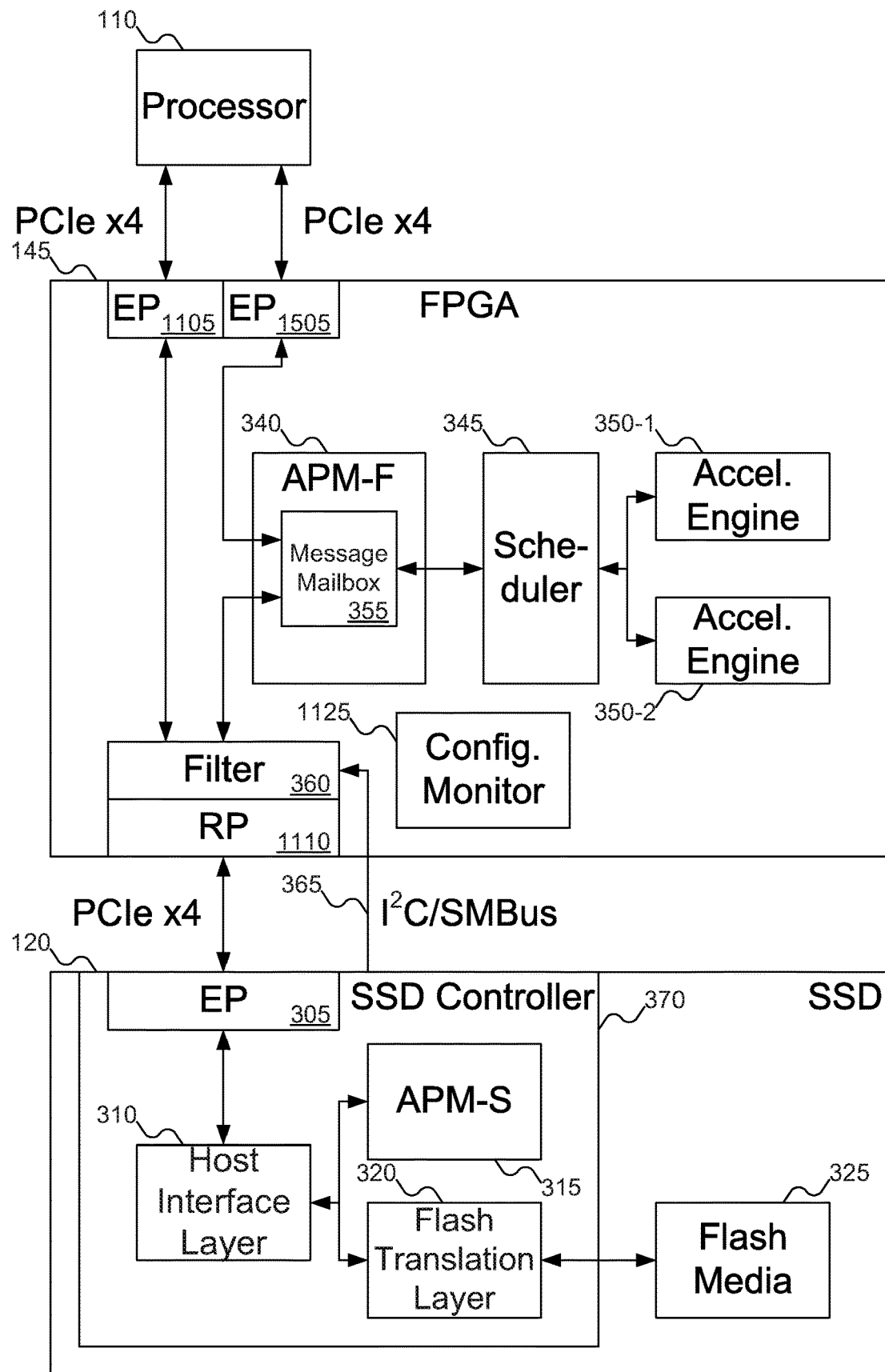
FIG. 17 shows components of the acceleration module of FIG. 1 and the storage device of FIG. 1, according to an eighth embodiment of the inventive concept.

FIG. 17 shows components of FPGA 145 of FIG. 1 and SSD 120 of FIG. 1, according to an eighth embodiment of the inventive concept. The eighth embodiment of the inventive concept is similar to the fifth embodiment of the inventive concept, except that FPGA 145 includes two endpoints 1105 and 1505. Again, endpoints 1105 and 1505 of FPGA 145 may be used to distinguish between conventional host-SSD PCIe transactions and host-to-FPGA acceleration instructions. PCIe transactions received at endpoint 1105 of FPGA 145 may be considered conventional PCIe transactions and forwarded to SSD 120 (via root port 1110), whereas PCIe transactions received at endpoint 1505 of FPGA 145 may be considered acceleration instructions and forwarded to APM-F 340 for processing.

Figure 18:
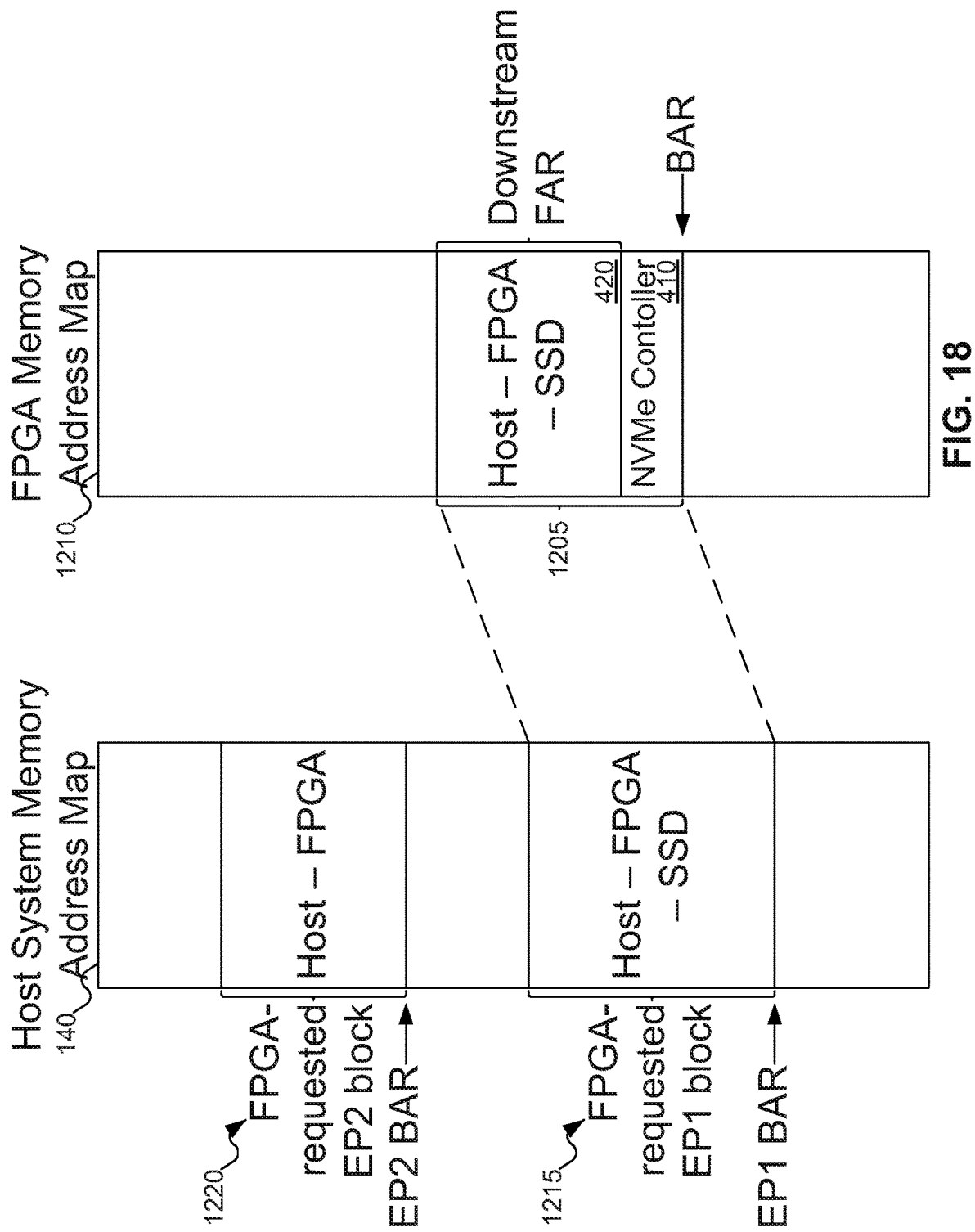
FIG. 18 shows memory usage for accelerating instructions in the system of FIG. 1, according to the eighth embodiment of the inventive concept.

FIG. 18 shows memory usage for accelerating instructions in the system of FIG. 1, according to the eighth embodiment of the inventive concept. Memory usage according to the eighth embodiment of the inventive concept is similar to memory usage according to the fifth embodiment of the inventive concept. With root port 1110 being the sole root port of FPGA 145, endpoint 305 of SSD 120 may request block 1205 from address map 1210, which may include downstream FAR 420. Endpoints 1105 and 1505 of FPGA 145 may then request blocks 1215 and 1220 from the host system memory addresses, with endpoint 1105 requesting block 1215 to be at least as large as block 1205, identified by a BAR. Endpoints 1105 and 1505 may request blocks 1215 and 1220 of host system memory addresses, to manage PCIe transactions exchanged between processor 110 and SSD 120; block 1215 may be at least as large as block 1405. Blocks 1215 and 1220 may each be identified by two separate BARs. In yet another embodiment of the inventive concept it is possible to use part of block 1220 as downstream FAR 420 to facilitate communication between FPGA 145 and SSD 120.

In FIG. 17, as in the earlier embodiments of the inventive concept, FPGA 145 is shown including the parts that enable communication with processor 110 and SSD 120: specifically, endpoints 1105 and 1505, root port 1110, and downstream filter 360. As with the embodiments of the inventive concept shown earlier, the components relating to filtering of PCIe transactions may be removed from FPGA 145. Thus, in the eighth embodiment of the inventive concept, endpoints 1105 and 1505 may be placed in a first bridging component and root port 1110 and downstream filter 360 may be placed in a second bridging component, each handling filtering of PCIe transactions different components of FIG. 17. Alternatively, only one of these bridging components might be used (with FPGA 145 handling its own filtering for communications from the other source), or a single bridging component may be used to handle all filtering for FPGA 145, regardless of the source of the PCIe transaction.

Figure 19:
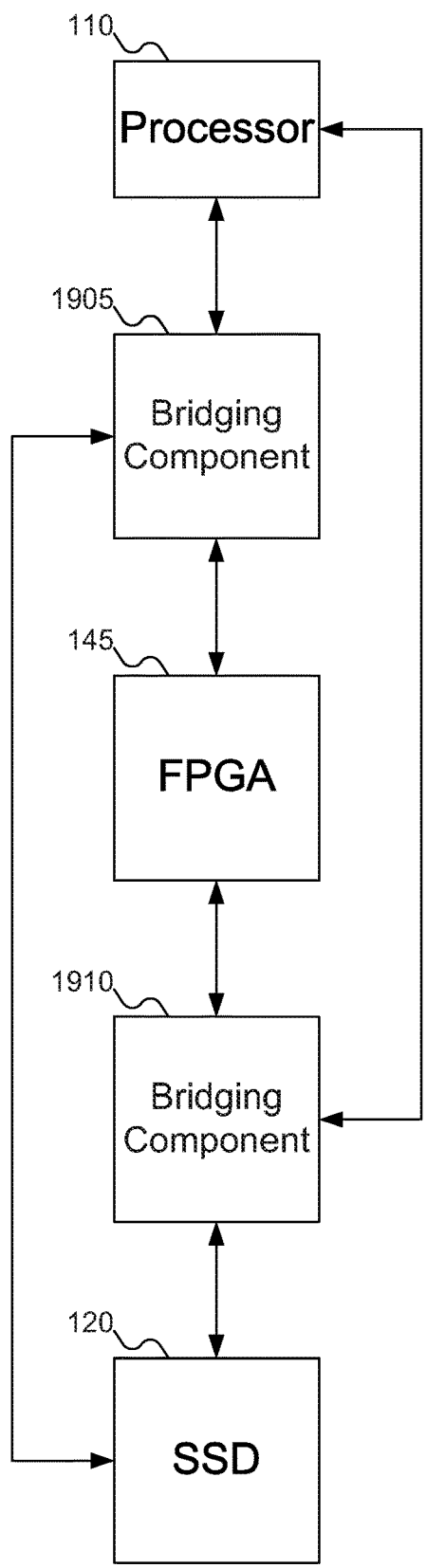
FIG. 19 shows components of the system of FIG. 1 with bridging components managing communications with the acceleration module of FIG. 1, according to embodiments of the inventive concept.

As discussed above with reference to the various embodiments of the inventive concept, the filtering functionality described as being part of the upstream interface and/or downstream interface of FPGA 145 may be separated from FPGA 145 and handled by another component. FIG. 19 shows bridging components that may handle the filtering functionality on behalf of acceleration module 145 of FIG. 1, according to embodiments of the inventive concept.

In FIG. 19, two bridging components 1905 and 1910 are shown. Bridging component 1905 may handle filtering of PCIe transactions received from processor 110, whereas bridging component 1910 may handle filtering of PCIe transactions received from SSD 120. Bridging component 1905 may send a PCIe transaction to either FPGA 145 or SSD 120, depending on whether the PCIe transaction includes an acceleration instruction. Similarly, bridging component 1910 may send a PCIe transaction to either FPGA 145 or processor 110, depending on whether the PCIe transaction includes an acceleration instruction. The specific implementations of bridging components 1905 and 1910 are not shown in FIG. 19, as the implementations are similar to those shown as part of the upstream and downstream interfaces of FPGA 145 above.

In some embodiments of the inventive concept, both bridging concepts 1905 and 1910 may be used. In other embodiments of the inventive concept, only one bridging component 1905 or 1910 is used, with the functionality of the other bridging component potentially remaining with FPGA 145. In yet other embodiments, both bridging components 1905 and 1910 may be included in a single component rather than as separate components.

Figure 20A:
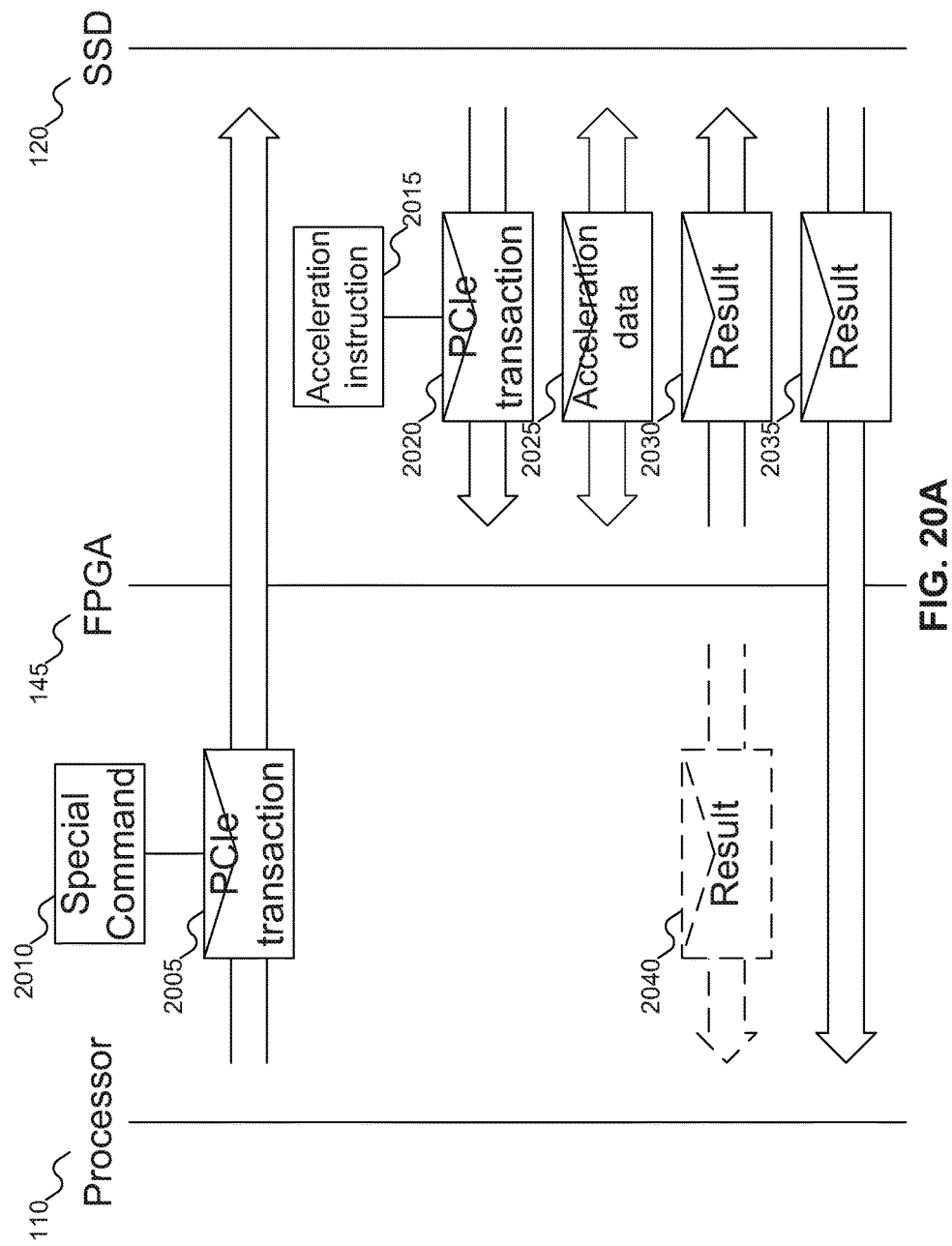

Now that various embodiments of the inventive concept have been described, data flows between processor 110, FPGA 145, and SSD 120 may be described. In the remainder of this document, all filtering functionality is attributed to FPGA 145, but it should be apparent when and how filtering may be shifted to bridging components 1905 and/or 1910 of FIG. 19. FIGS. 20A-20B show communications between the processor of FIG. 1, FPGA 145 of FIG. 1, and SSD 120 of FIG. 1, according to embodiments of the inventive concept. In FIG. 20A, data flows according to the first embodiment of the inventive concept (and possibly other embodiments of the inventive concept) are shown. Processor 110 may send PCIe transaction 2005 to SSD 120. PCIe transaction 2005 may include special command 2010. PCIe transactions 2005 may be delivered to SSD 120 (via FPGA 145). APM-S 315 may then generate acceleration instruction 2015, which may be included in PCIe transaction 2020, which SSD 120 may then send to FPGA 145. FPGA 145 and SSD 120 may also exchange acceleration data, as shown in communication 2025.

Upon completion of acceleration instruction 2015, FPGA 145 may send result 2030 back to SSD 120, which in turn may forward result 2030 to processor 110 (shown as result 2035). Alternatively, FPGA 145 may send result 2040 directly to processor 110, simulating result 2035 coming from SSD 120.

In contrast, in FIG. 20B (applicable to the second through eighth embodiments of the inventive concept), processor 110 may send acceleration instruction 2045 directly to FPGA 145 as PCIe transaction 2005. FPGA 145 and SSD 120 may exchange acceleration data, as shown in communication 2025. Finally, FPGA 145 may send result 2040 back to processor 110.

Figure 21:
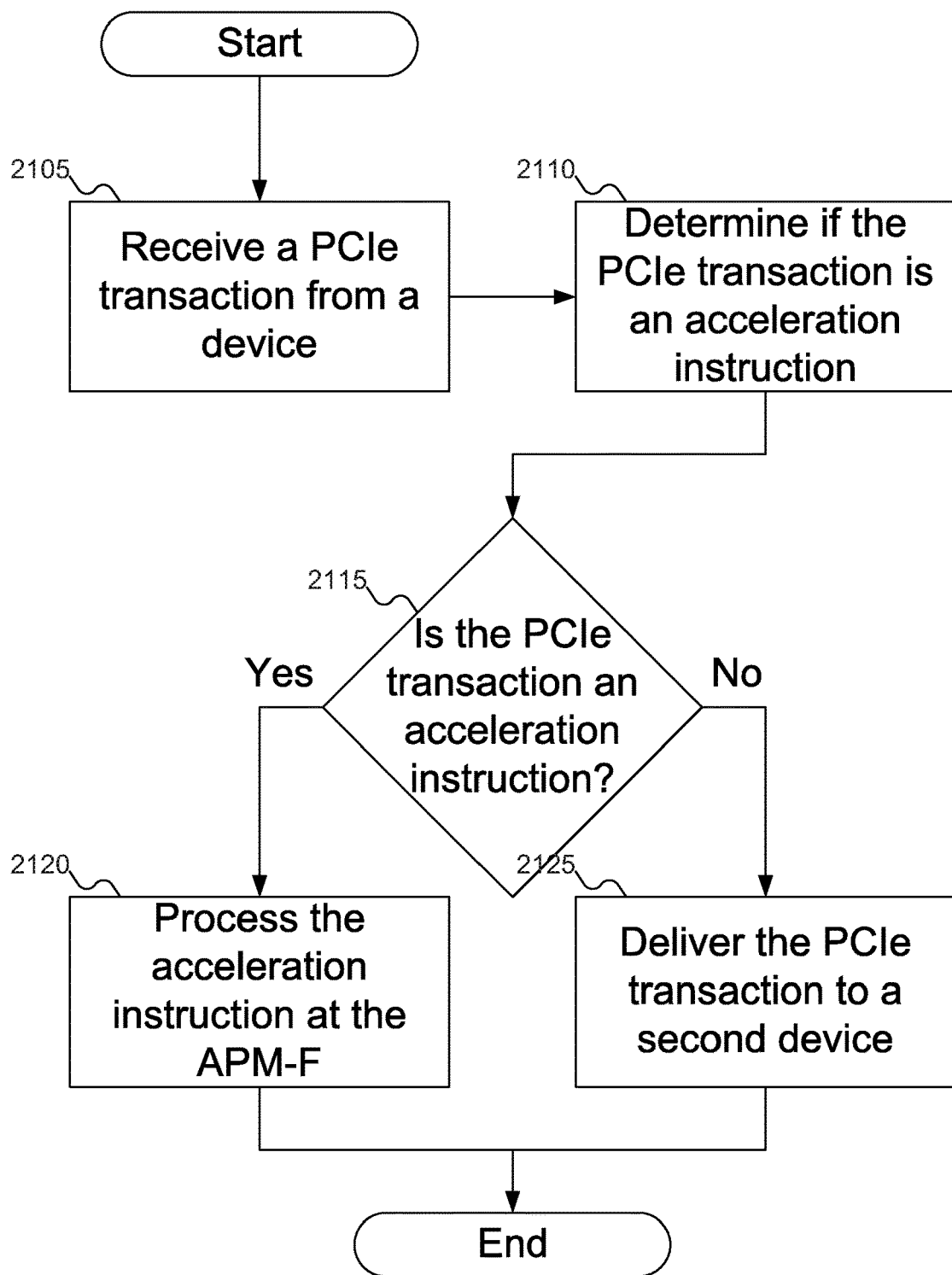
FIG. 21 shows a flowchart of an example procedure for the acceleration module of FIG. 1 to process PCIe transactions, according to embodiments of the inventive concept.

FIG. 21 shows a flowchart of an example procedure for FPGA 145 to process a PCIe transaction, according to embodiments of the inventive concept. FIG. 21 provides a high-level view; later figures provide more detailed example flowcharts of the operations of FPGA 145. In FIG. 21, at block 2105, FPGA 145 may receive a PCIe transaction from a device. This PCIe transaction may be either of PCIe transactions 2015 or 2045 of FIGS. 20A-20B, and the device may be either processor 110 or SSD 120. At block 2110, FPGA 145 may determine whether the PCIe transaction includes an acceleration instruction. At block 2115, FPGA 145 may test to see the PCIe transaction includes an acceleration instruction. If so, then at block 2120 the acceleration instruction may be processed by APM-F 340; otherwise, at block 2125, the PCIe transaction may be delivered to another device (if the PCIe transaction was received from processor 110, then the PCIe transaction may be delivered to SSD 120, and vice versa). Note that processing the acceleration instruction by APM-F 340 may involve communicating with SSD 120 to receive the application data to be processed by the acceleration instruction.

Figure 22A:
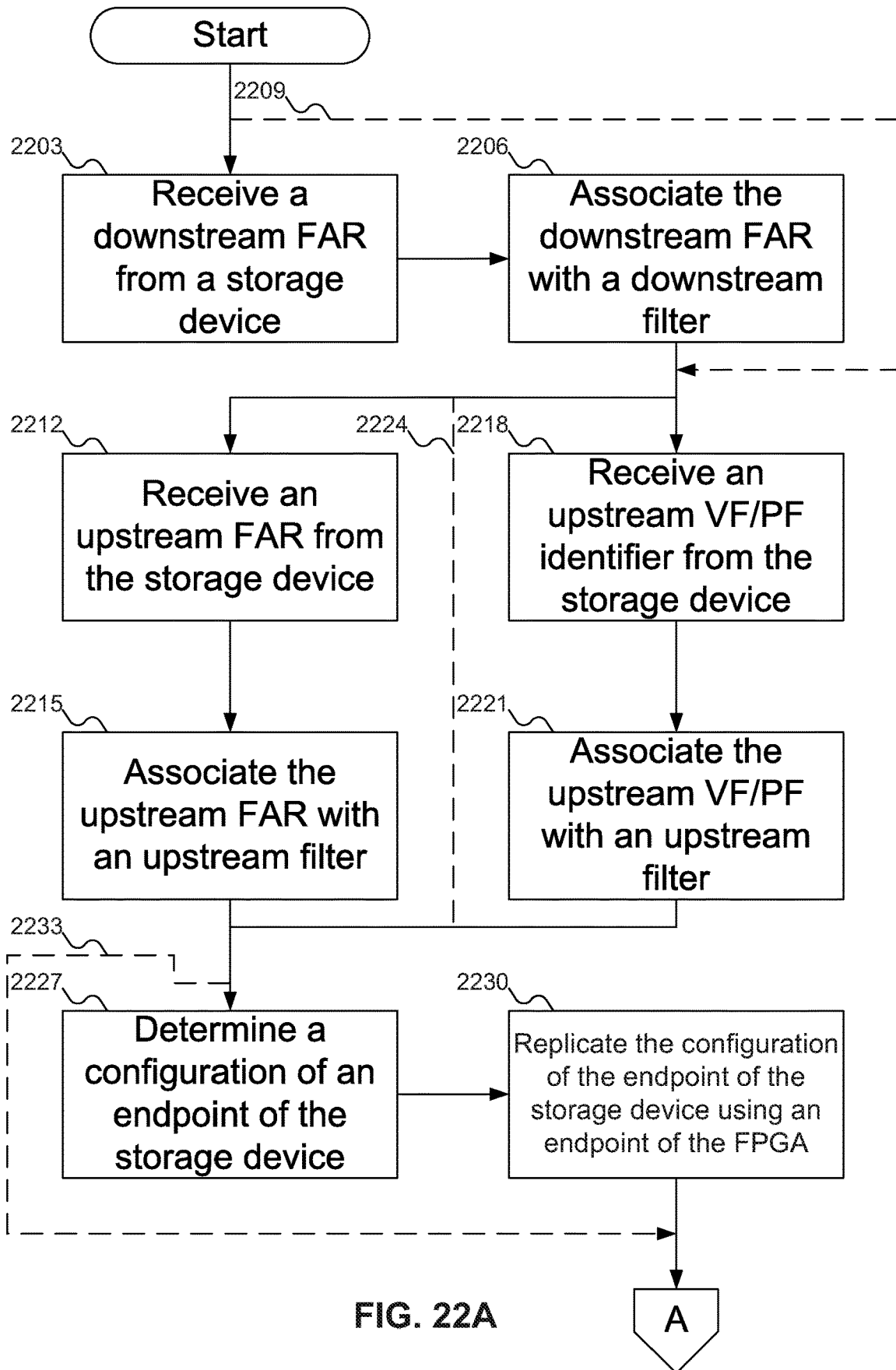
FIGS. 22A-22C show a flowchart of a more detailed example procedure for the acceleration module of FIG. 1 to process a PCIe transaction, according to embodiments of the inventive concept.
Figure 22B:
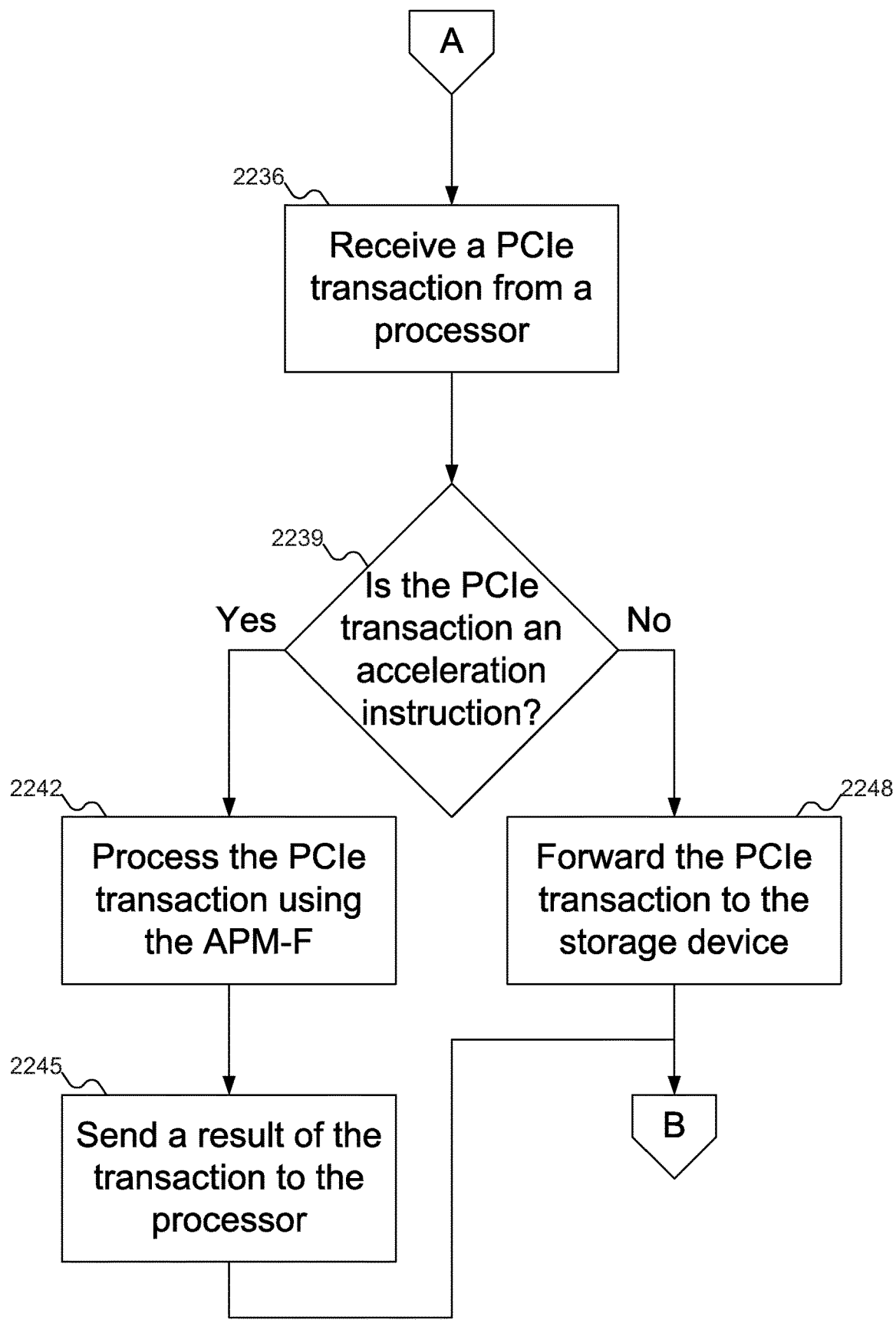
Figure 22C:
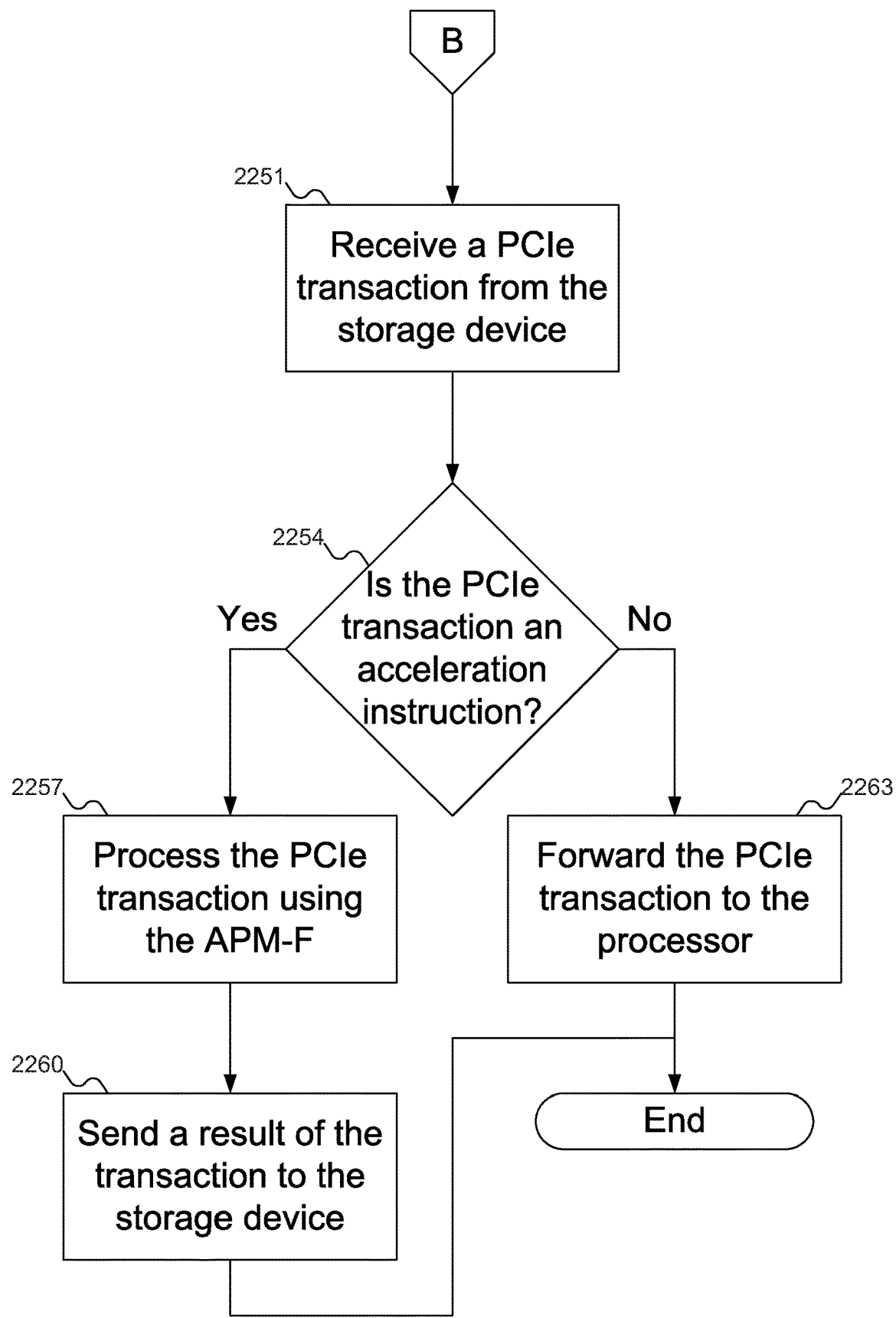

FIGS. 22A-22C show a flowchart of a more detailed example procedure for FPGA 145 to process PCIe transactions, according to embodiments of the inventive concept. In FIG. 22A, at block 2203, FPGA 145 may receive downstream FAR 420 from SSD 120. At block 2206, FPGA 145 may associate downstream FAR 420 with downstream filter 360. Note that this association may happen automatically if SSD 120 programs downstream FAR 420 into downstream filter 360 via sideband bus 365, or it may require an active step by FPGA 145 (for example, if SSD 120 sends a PCIe VDM to FPGA 145 including downstream FAR 420). Note further that in some embodiments of the inventive concept blocks 2203 and 2206 may be skipped, as shown by dashed line 2209. In some embodiments of the inventive concept, downstream FAR 420 may be provided by FPGA 145 itself.

At block 2212, FPGA 145 may receive from SSD 120 upstream FAR 605, and at block 2215 FPGA 145 may associate upstream FAR 605 with upstream port 330. Note that this association may happen automatically if SSD 120 programs upstream FAR 605 into upstream filter 505 via sideband bus 365, or it may require an active step by FPGA 145 (for example, if SSD 120 sends a PCIe VDM to FPGA 145 including upstream FAR 605). In some embodiments of the inventive concept, upstream FAR 605 may be provided by FPGA 145 itself.

Alternatively, at block 2218, FPGA 145 may receive from SSD 120 an identifier of a PF or VF used to expose FPGA 145, and at block 2221 FPGA 145 may associate the PF/VF identifier with upstream filter 330. Again, this association may happen automatically if SSD 120 programs the PF/VF identifier into upstream filter 505 via sideband bus 365, or it may require an active step by FPGA 145 (for example, if SSD 120 sends a PCIe VDM to FPGA 145 including the PF/VF identifier).

Note that in some embodiments of the inventive concept blocks 2212, 2215, 2218, and 2221 may be skipped, as shown by dashed line 2224.

At block 2227, configuration monitor 1125 may determine a configuration of endpoint 305 of SSD 120, and at block 2230 configuration module 1125 may replicate that configuration at endpoint 1105 of FPGA 145, thereby presenting the same functionality as SSD 120 to processor 110. In some embodiments of the inventive concept blocks 2212, 2215, 2218, and 2221 may be skipped, as shown by dashed line 2233.

Once FPGA 145 has been properly configured, at block 2236 (FIG. 22B) FPGA 145 may receive PCIe transaction 2005 of FIG. 20B from processor 110 (via upstream port 330 or endpoint 1105, depending on the embodiment of the inventive concept). At block 2239, FPGA 145 may determine whether PCIe transaction 2005 of FIG. 20B includes acceleration instruction 2045 of FIG. 20B. If so, then at block 2242 APM-F 340 may process acceleration instruction 2045 of FIG. 20B, and at block 2245 APM-F 340 may send result 2040 of FIG. 20B to processor 110. Otherwise, if PCIe transaction 2005 of FIG. 20B does not include acceleration instruction 2045 of FIG. 20B, at block 2248 FPGA 145 may deliver PCIe transaction 2005 of FIG. 20B to SSD 120 (via downstream port 335 or root port 1110, depending on the embodiment of the inventive concept).

At block 2251 (FIG. 22C), FPGA 145 may receive PCIe transaction 2020 of FIG. 20A (via downstream port 335 or root port 1110, depending on the embodiment of the inventive concept). At block 2254, FPGA 145 may determine if PCIe transaction 2020 of FIG. 20A includes acceleration instruction 2015 of FIG. 20A. If PCIe transaction 2020 of FIG. 20A includes acceleration instruction 2015 of FIG. 20A, then at block 2257 APM-F 340 may process acceleration instruction 2015 of FIG. 20A, and at block 2260 APM-F 340 may send result 2040 of FIG. 20A to SSD 120. Otherwise, if PCIe transaction 2020 of FIG. 20A does not include acceleration instruction 2015, then at block 2263 FPGA 145 may forward PCIe transaction 2020 of FIG. 20A to processor 110 (via upstream port 330 or endpoint 1105, depending on the embodiment of the inventive concept).

Figure 23A:
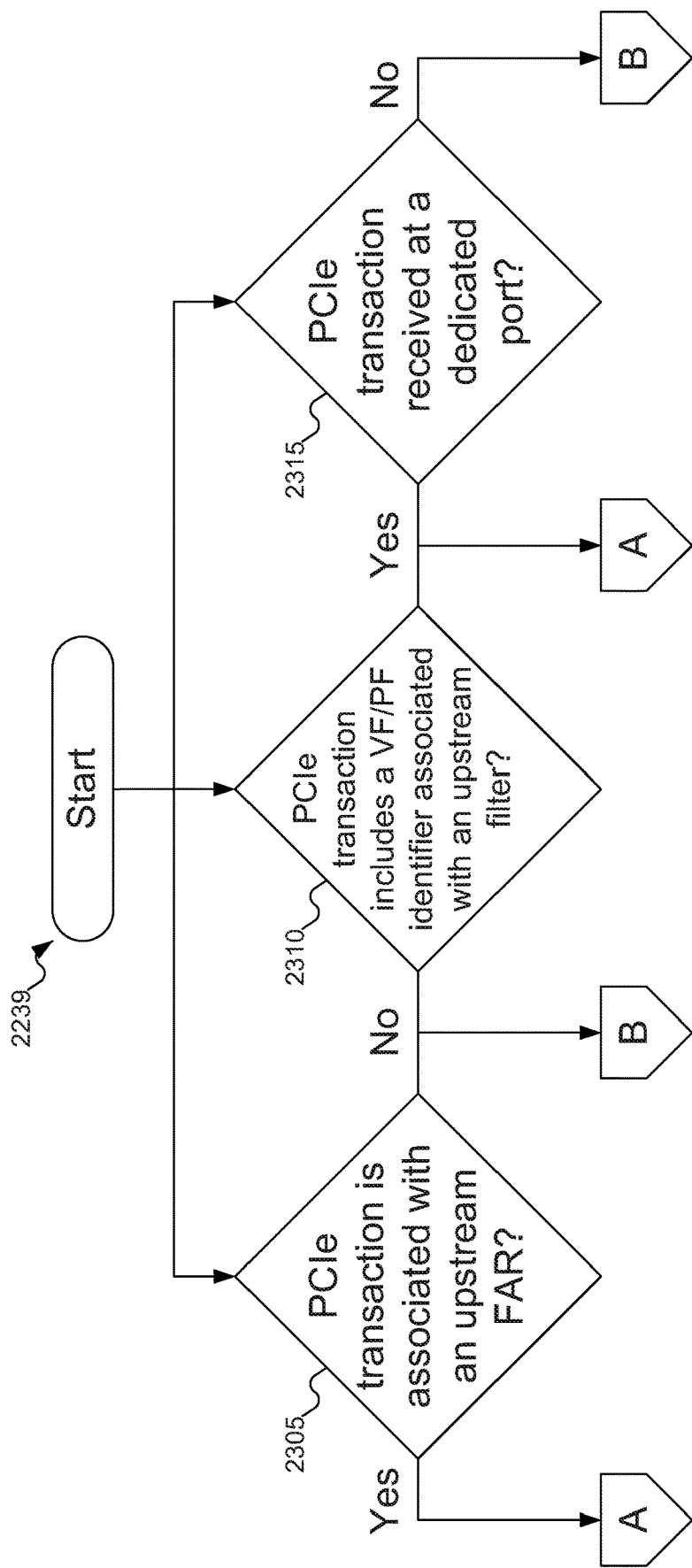
FIGS. 23A-23B show a flowchart of an example procedure for the acceleration module of FIG. 1 to determine whether a PCIe transaction coming from the processor of FIG. 1 includes an acceleration instruction, according to embodiments of the inventive concept.
Figure 23B:
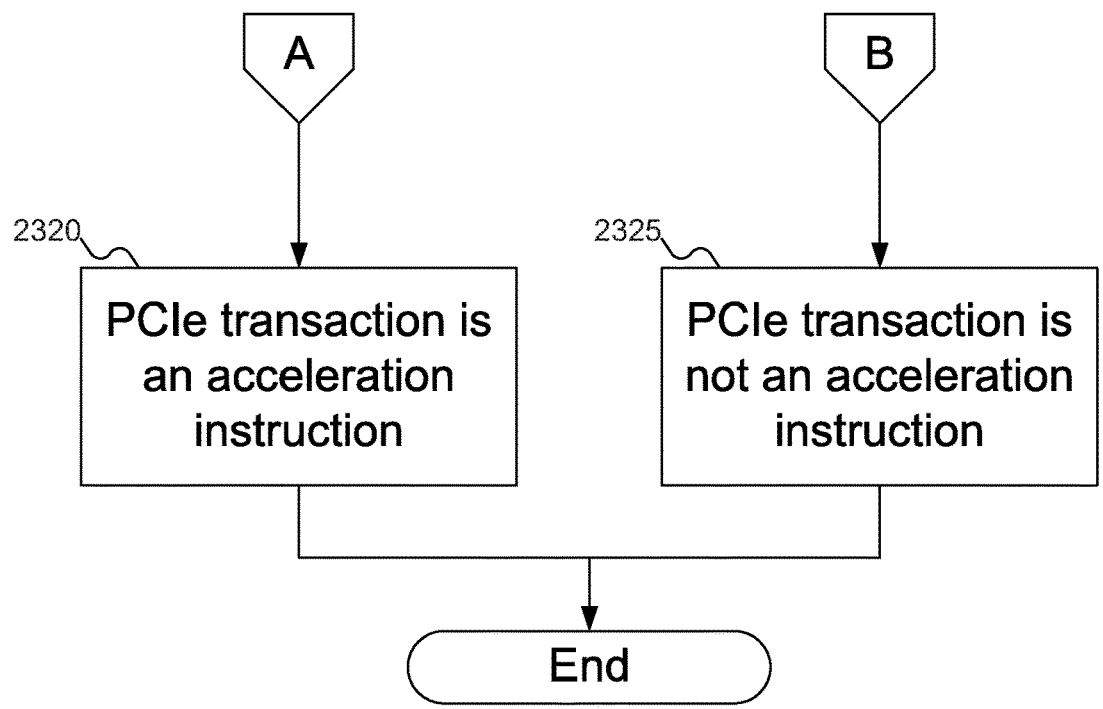

FIGS. 23A-23B show a flowchart of an example procedure for FPGA 145 to determine whether PCIe transaction 2005 of FIG. 20B, coming from processor 110 includes acceleration instruction 2045 of FIG. 20B, according to embodiments of the inventive concept. FIGS. 23A-23B show three possible tests that may be used, individually or collectively, depending on the embodiment of the inventive concept. In embodiments of the inventive concept that use more than one test, PCIe transaction 2005 of FIG. 20B may be determined to include acceleration instruction 2045 of FIG. 20B if any individual test is satisfied. In FIG. 23A, at block 2305, FPGA 145 may determine whether an address associated with PCIe transaction 2005 of FIG. 20B includes an address in upstream FAR 605. At block 2310, FPGA 145 may determine if PCIe transaction 2005 of FIG. 20B includes an identifier of a PF or VF that is associated with upstream filter 715. At block 2315, FPGA 145 may determine if PCIe transaction 2005 of FIG. 20B is received at a port dedicated for acceleration instructions, such as endpoint 1505. If any of these tests results indicates that PCIe transaction 2005 of FIG. 20B includes acceleration instruction 2045 of FIG. 20B, then at block 2320 (FIG. 23B) FPGA 145 knows that PCIe transaction 2005 of FIG. 20B includes acceleration instruction 2045 of FIG. 20B; otherwise, at block 2325 FPGA 145 knows that PCIe transaction 2005 of FIG. 20B does not include acceleration instruction 2045 of FIG. 20B.

Figure 24:
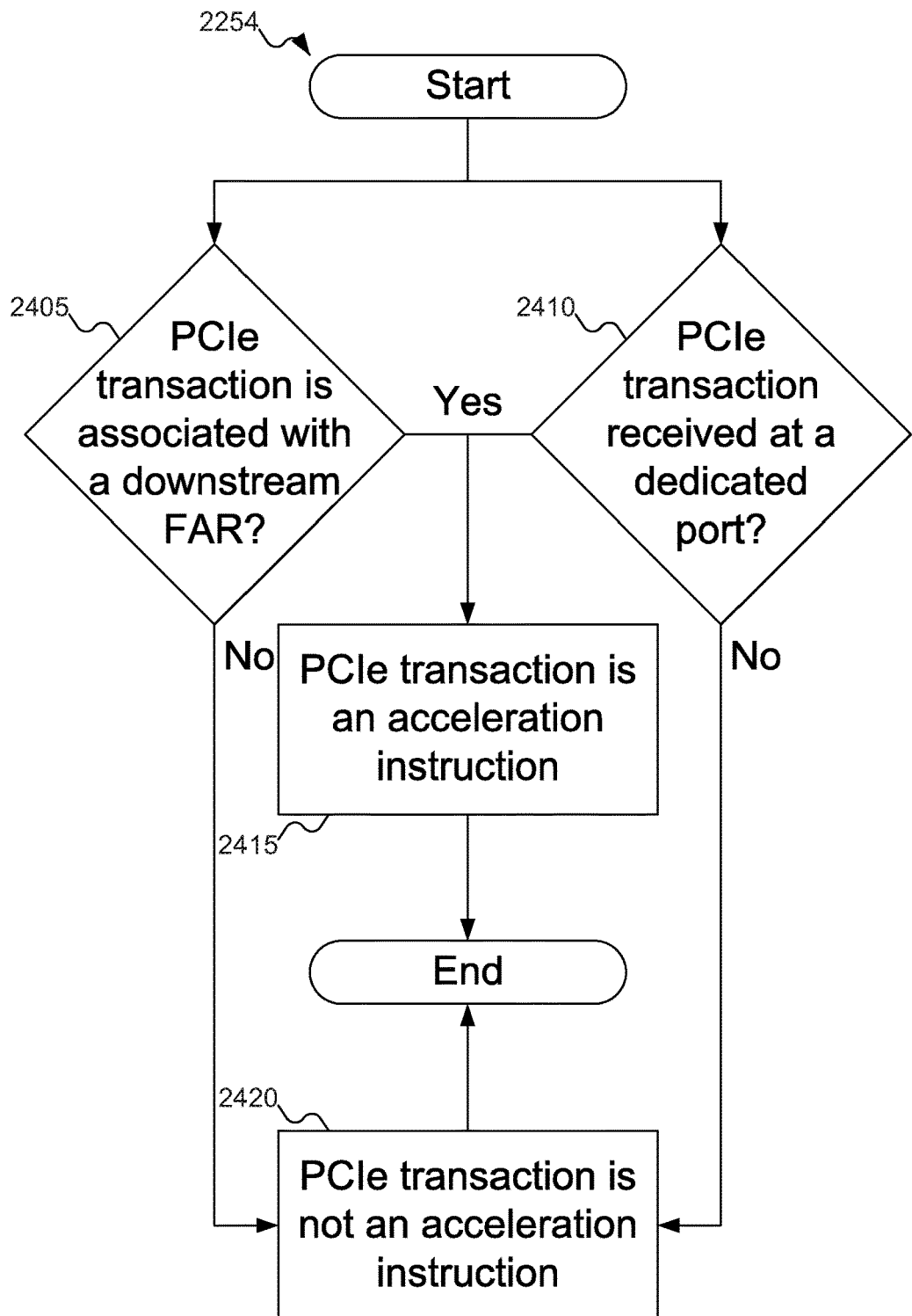
FIG. 24 shows a flowchart of an example procedure for the acceleration module of FIG. 1 to determine whether a PCIe transaction coming from the storage device of FIG. 1 includes an acceleration instruction, according to embodiments of the inventive concept.

FIG. 24 shows a flowchart of an example procedure for FPGA 145 to determine whether PCIe transaction 2020 of FIG. 20A coming from SSD 120 includes acceleration instruction 2015 of FIG. 20A, according to embodiments of the inventive concept. FIG. 24 shows two possible tests that may be used, individually or collectively, depending on the embodiment of the inventive concept. In embodiments of the inventive concept that use more than one test, PCIe transaction 2020 of FIG. 20A may be determined to include acceleration instruction 2015 of FIG. 20A if any individual test is satisfied. In FIG. 24, at block 2405, FPGA 145 may determine whether an address associated with PCIe transaction 2020 of FIG. 20A includes an address in downstream FAR 420. At block 2410, FPGA 145 may determine if PCIe transaction 2020 of FIG. 20A is received at a port dedicated for acceleration instructions, such as root port 1305. If any of these tests results indicates that PCIe transaction 2020 of FIG. 20A includes acceleration instruction 2015 of FIG. 20A, then at block 2415 FPGA 145 knows that PCIe transaction 2020 of FIG. 20A includes acceleration instruction 2015 of FIG. 20A; otherwise, at block 2420 FPGA 145 knows that PCIe transaction 2020 of FIG. 20A does not include acceleration instruction 2015 of FIG. 20A.

Figure 25:
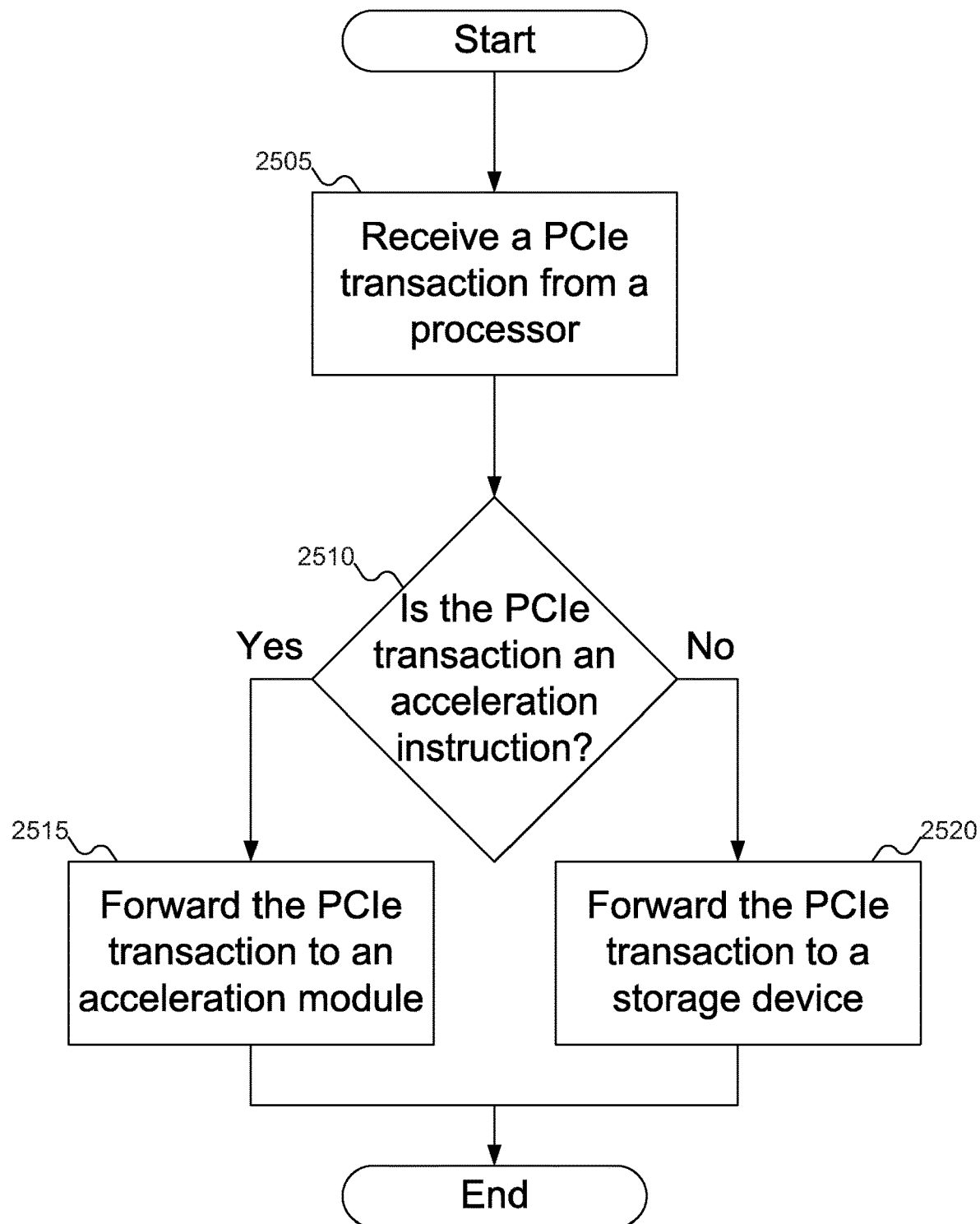
FIG. 25 shows a flowchart of an example procedure for the first bridging component of FIG. 19 to determine whether a PCIe transaction coming from the processor of FIG. 1 includes an acceleration instruction, according to embodiments of the inventive concept.

FIG. 25 shows a flowchart of an example procedure for first bridging component 1905 of FIG. 19 to determine whether a PCIe transaction coming from processor 110 of FIG. 1 includes an acceleration instruction, according to embodiments of the inventive concept. In FIG. 25, at block 2505, first bridging component 1905 may receive a PCIe transaction from processor 110 of FIG. 1. At block 2510, first bridging component 1905 may determine if the PCIe transaction is an acceleration instruction. If so, then at block 2515 first bridging component 1905 may forward the PCIe transaction/acceleration instruction to FPGA 145 of FIG. 1; otherwise, at block 2520 first bridging component 1905 may forward the PCIe transaction to SSD 120 of FIG. 1.

Figure 26:
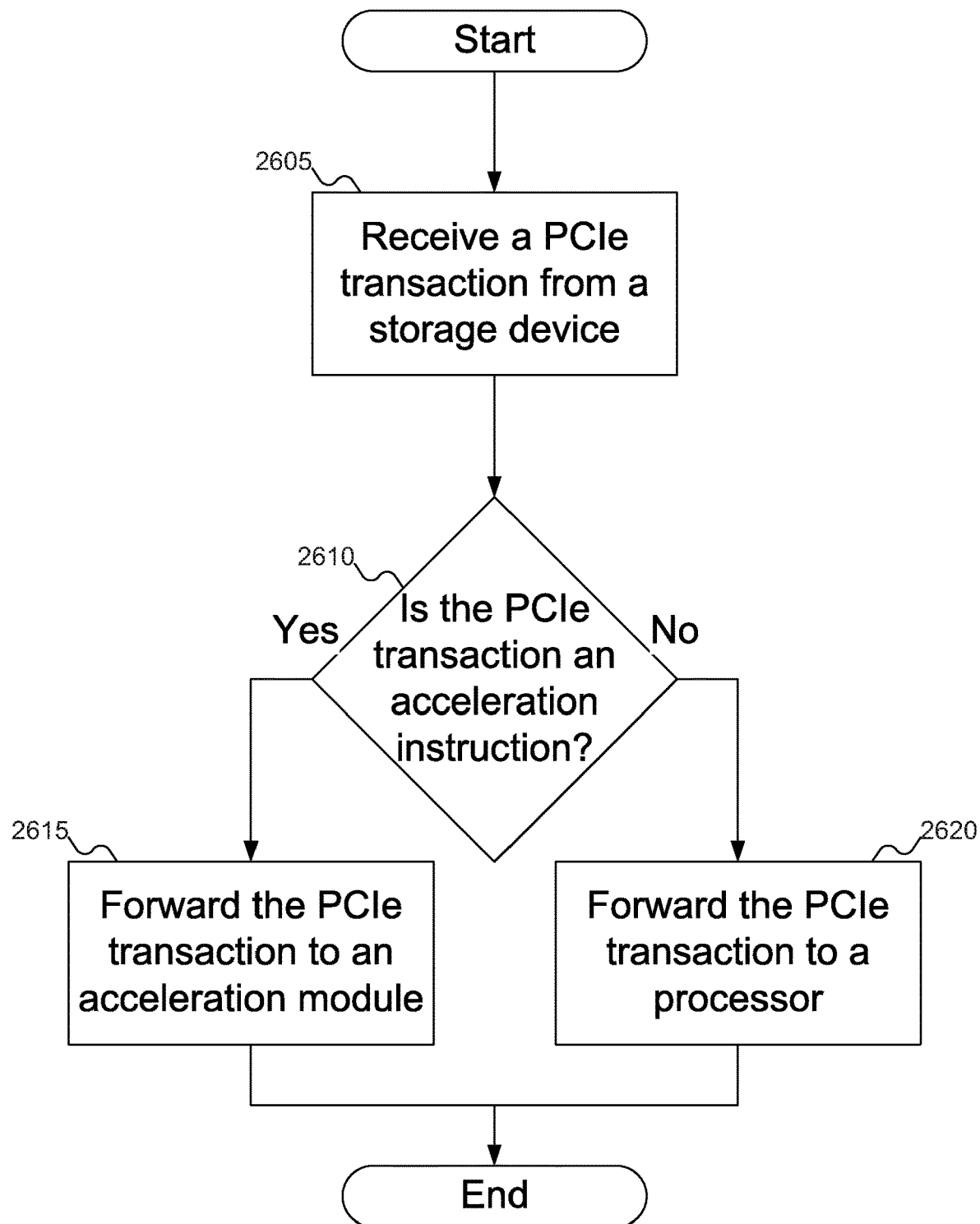
FIG. 26 shows a flowchart of an example procedure for the second bridging component of FIG. 19 to determine whether a PCIe transaction coming from the storage device of FIG. 1 includes an acceleration instruction, according to embodiments of the inventive concept.

FIG. 26 shows a flowchart of an example procedure for the second bridging component 1910 of FIG. 19 to determine whether a PCIe transaction coming from the storage device 120 of FIG. 1 includes an acceleration instruction, according to embodiments of the inventive concept. In FIG. 26, at block 2605, second bridging component 1905 may receive a PCIe transaction from SSD 120 of FIG. 1. At block 2610, second bridging component 1905 may determine if the PCIe transaction is an acceleration instruction. If so, then at block 2615 second bridging component 1905 may forward the PCIe transaction/acceleration instruction to FPGA 145 of FIG. 1; otherwise, at block 2620 second bridging component 1905 may forward the PCIe transaction to processor 110 of FIG. 1.

Figure 27A:
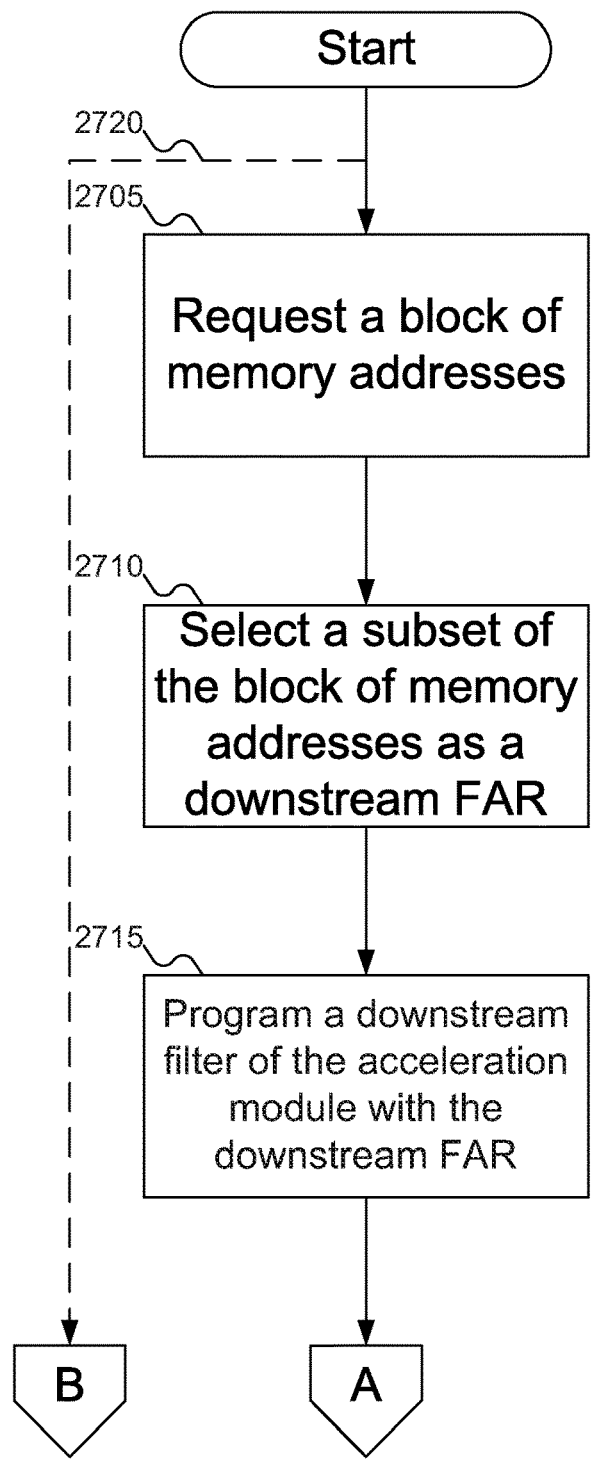
FIGS. 27A-27C show a flowchart of an example procedure for the storage device of FIG. 1 to process a PCIe transaction, according to embodiments of the inventive concept.
Figure 27B:
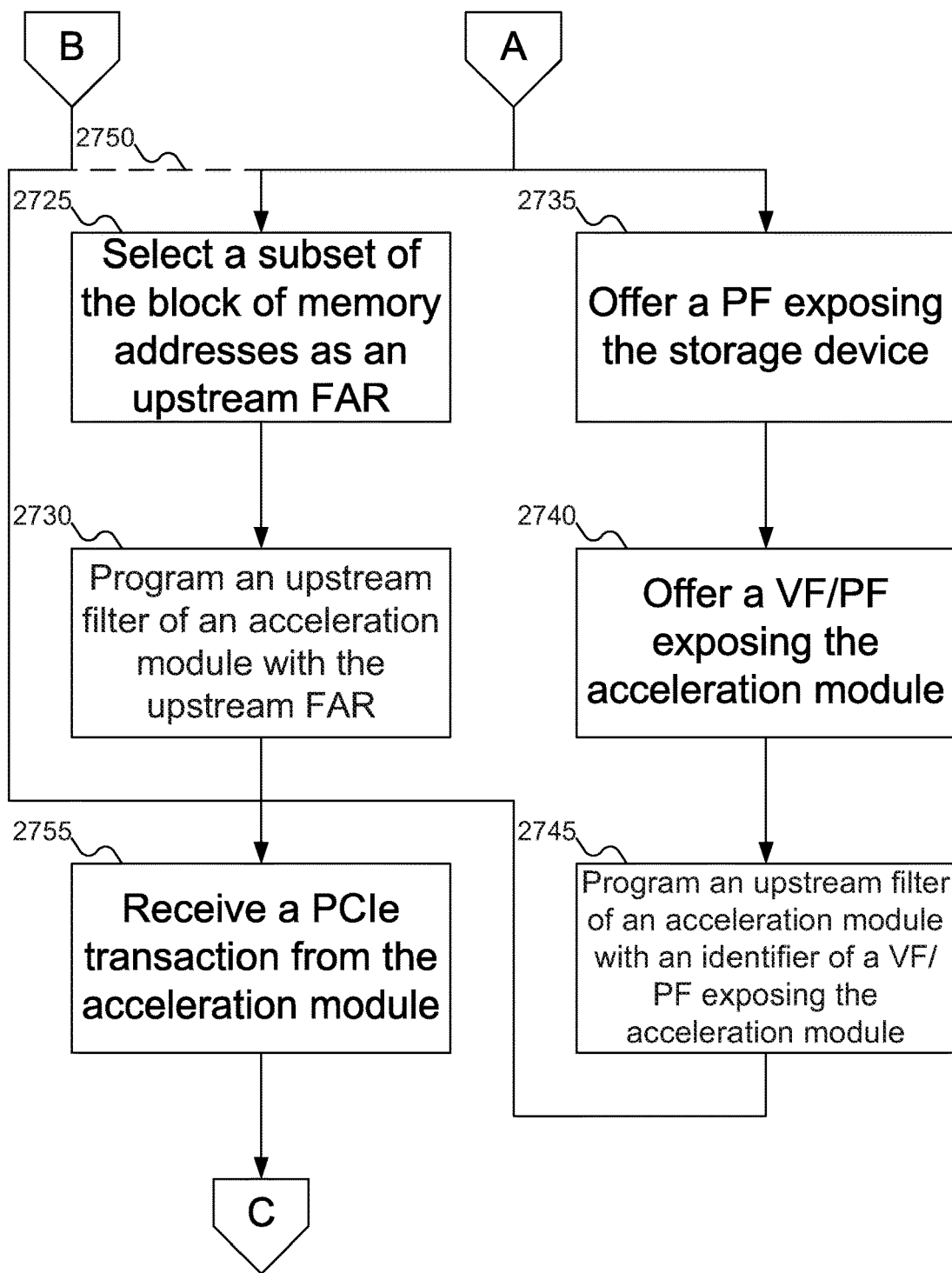
Figure 27C:
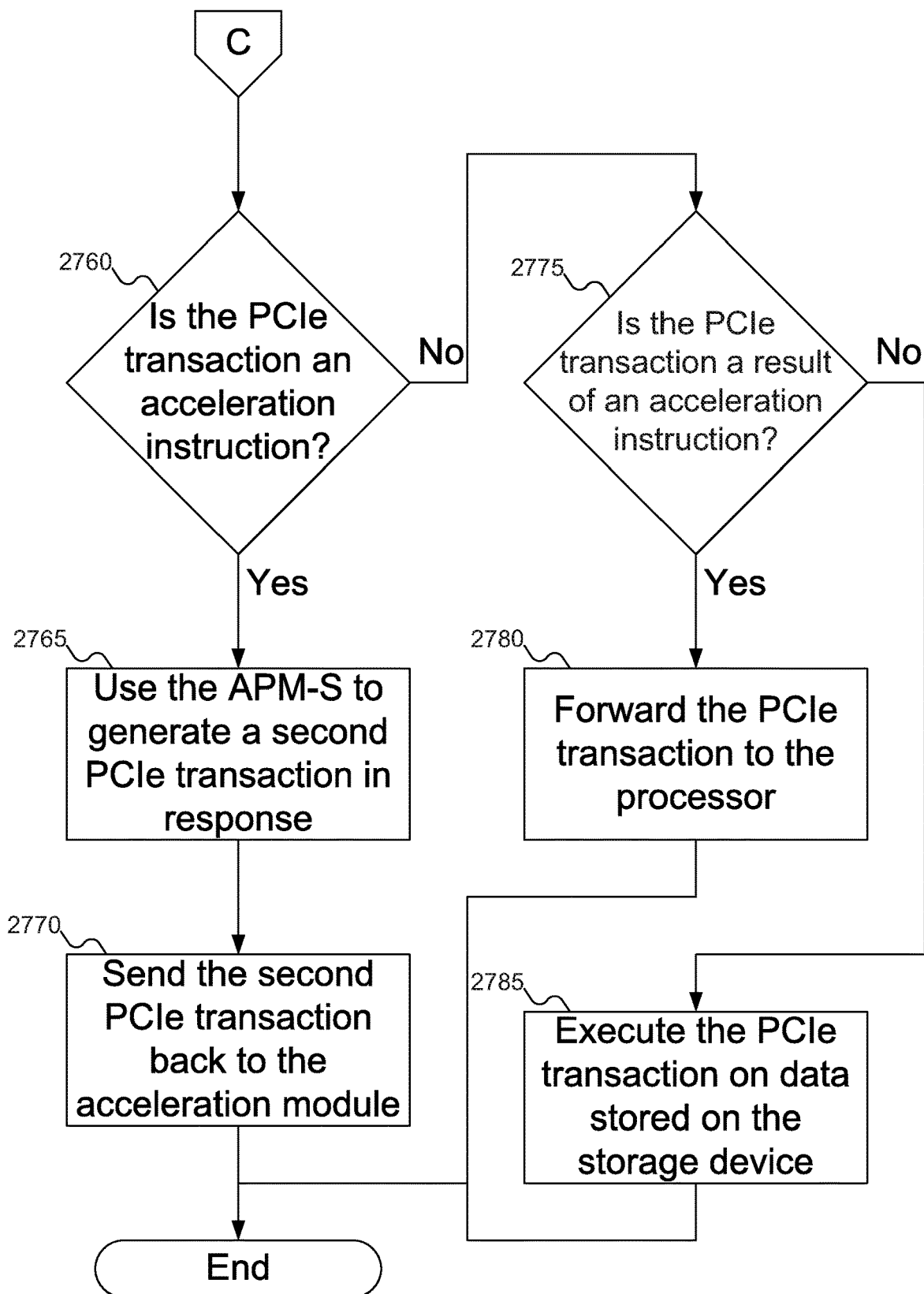

FIGS. 27A-27C show a flowchart of an example procedure for SSD 120 to process PCIe transaction, according to embodiments of the inventive concept. In FIG. 27A, at block 2705, SSD 120 may request a block of memory addresses. Note that SSD 120 may request the block of memory addresses from host system memory, as in the first through fourth embodiments of the inventive concept, or from a configuration space of a root port of FPGA 145, as in the fifth through eighth embodiments of the inventive concept. At block 2710, SSD 120 may select a subset of the block of memory addresses for use as downstream FAR 420, and at block 2715 SSD 120 may program downstream filter 360 with downstream FAR 420, using sideband bus 365, a PCIe VDM, or any other desired mechanism. Note that in some embodiments of the inventive concept blocks 2705-2715 may be skipped, as shown by dashed line 2720 (dashed line 2720 also skips some blocks shown in FIG. 27B).

At block 2725 (FIG. 27B), SSD 120 may select a subset of the block of memory addresses for use as upstream FAR 605, and at block 2730 SSD 120 may program downstream filter 360 with downstream FAR 420, using sideband bus 365, a PCIe VDM, or any other desired mechanism. Alternatively, at block 2735, SSD 120 may use PF 705 to expose its own capabilities. Then, at block 2740 SSD 120 may use PF 905 or VF 710 to expose FPGA 145, and at block 2745 SSD 120 may program downstream filter 360 with an identifier of PF 905 or VF 710, using sideband bus 365, a PCIe VDM, or any other desired mechanism. Note that in some embodiments of the inventive concept blocks 2725-2745 may be skipped, as shown by dashed line 2750.

At block 2755, SSD 120 may receive a PCIe transaction from FPGA 145. This PCIe transaction might be PCIe transaction 2005 of FIG. 20A (forwarded by FPGA 145 from processor 110), or it might PCIe transaction 2025 of FIGS. 20A-20B. Regardless of the source of the PCIe transaction, at block 2760 (FIG. 27C), HIL 310 may determine if the PCIe transaction includes an acceleration instruction. If so, then at block 2765, HIL 310 may forward the PCIe transaction (or the unpacked acceleration instruction) to APM-S 315 for processing. APM-S 315 may generate a response to the acceleration instruction, which might be acceleration instruction 2015 of FIG. 20A (if the PCIe transaction originated from processor 110), or it might be acceleration data 2025 (if the PCIe transaction originated from APM-F 340 of FPGA 145). Either way, at block 2770, APM-S 315 may send the response to FPGA 145.

On the other hand, if the PCIe transaction was not an acceleration instruction, at block 2775 SSD 120 may determine if the PCIe transaction is result 2030 of FIG. 20A. If so, then at block 2780, SSD 120 may forward result 2035 of FIG. 20A to processor 110 (via endpoint 305 of SSD 120 and FPGA 145). If the PCIe transaction was not result 2030 of FIG. 20A, then at block 2785 SSD 120 may process the PCIe transaction on data stored on SSD 120 as normal.

Figure 28A:
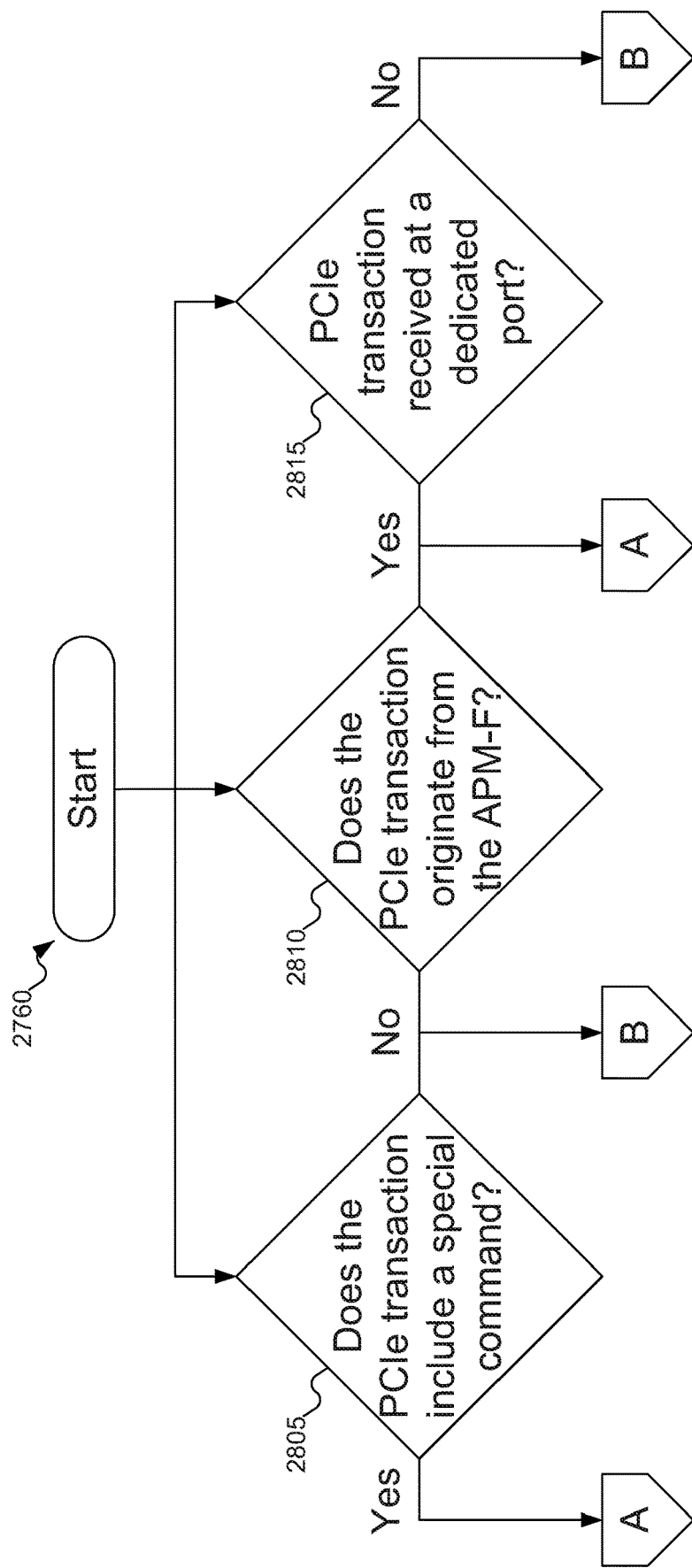
FIGS. 28A-28B show a flowchart of an example procedure for the storage device of FIG. 1 to determine whether a PCIe transaction coming from the acceleration module of FIG. 1 includes an acceleration instruction, according to embodiments of the inventive concept.
Figure 28B:
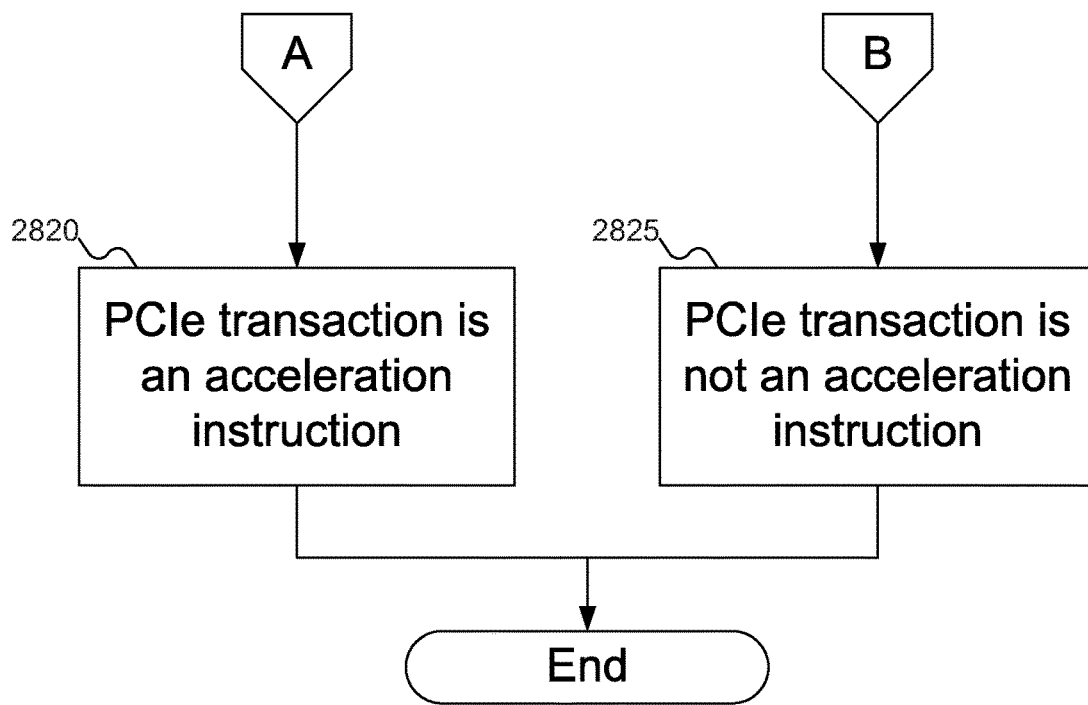

FIGS. 28A-28B show a flowchart of an example procedure for SSD 120 to determine whether a PCIe transaction coming from FPGA 145 includes an acceleration instruction, according to embodiments of the inventive concept.

FIGS. 28A-28B show three possible tests that may be used, individually or collectively, depending on the embodiment of the inventive concept. In embodiments of the inventive concept that use more than one test, the PCIe transaction may be determined to include an acceleration instruction if any individual test is satisfied. In FIG. 28A, at block 2805, SSD 120 may determine whether the PCIe transaction includes a special command from processor 110 (which indicates SSD 120 should initiate an acceleration instruction to FPGA 145). At block 2810, SSD 120 may determine if the PCIe transaction originates from APM-F 340, which may occur if APM-F 340 is requesting acceleration data 2025 of FIGS. 20A-20B, or if APM-F 340 is sending result 2030 of FIG. 20A to SSD 120. The test of block 2810 may be performed in any desired manner: for example, the PCIe transaction might include a tag to indicate the PCIe transaction is an acceleration instruction, or the PCIe transaction may be associated with an address in downstream FAR 420. At block 2815, SSD 120 may determine if the PCIe transaction is received at a port dedicated for acceleration instructions, such as endpoint 1310. If any of these tests results indicates that the PCIe transaction includes an acceleration instruction, then at block 2820 (FIG. 28B) SSD 120 knows that The PCIe transaction includes an acceleration instruction; otherwise, at block 2825 SSD 120 knows that the PCIe transaction does not include an acceleration instruction.

In FIGS. 21-28B, some embodiments of the inventive concept are shown. But a person skilled in the art will recognize that other embodiments of the inventive concept are also possible, by changing the order of the blocks, by omitting blocks, or by including links not shown in the drawings. In addition, while certain operations are described as being performed by certain components, embodiments of the inventive concept may support other components performing the described operations. All such variations of the flowcharts are considered to be embodiments of the inventive concept, whether expressly described or not.

Embodiments of the inventive concept offer technical advantages over the prior art. By introducing acceleration module 145 of FIG. 1 to machine 105 of FIG. 1, processor 110 of FIG. 1 may offload work that may be performed by acceleration module 145 of FIG. 1. Since such commands typically involve processing large amounts of data that may then be discarded, offloading the work to acceleration module 145 of FIG. 1 avoids the delay required to load the data from storage device 120 of FIG. 1 into memory 140 of FIG. 1, as well as avoiding the likely need to free up some space in memory 140 of FIG. 1.

The various embodiments of the inventive concept also support using different varieties of storage device 120 of FIG. 1. Both single port and dual port storage devices may be used, as well as storage devices that support an additional PF and/or VF to expose acceleration module 145 of FIG. 1.

The various embodiments of the inventive concept further support using processors that offer different capabilities. If the operating system of machine 105 of FIG. 1 supports VFs, then a VF may be used to expose acceleration module 145 of FIG. 1; otherwise, a PF may be used. If processor 110 of FIG. 1 is capable of communicating directly with acceleration module 145 of FIG. 1, then an embodiment of the inventive concept that supports such communication may be used; otherwise, processor 110 of FIG. 1 may send all acceleration instructions to storage device 120 of FIG. 1, leaving it to storage device 120 of FIG. 1 to request that acceleration module 145 of FIG. 1 perform the acceleration instruction.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a system, comprising:
 a processor, the processor running an application program;
 a memory, the memory storing data being used by the application program running on the processor;
 an upstream interface for communicating with the processor;
 a downstream interface for communicating with a storage device;
 an acceleration module, the acceleration module implemented using hardware and including an Acceleration Platform Manager (APM-F) to execute an acceleration instruction; and
  the storage device, including:
  an endpoint of the storage device for communicating with the acceleration module;
  a controller to manage operations of the storage device;
  storage to store application data for the application program; and
  a storage device Acceleration Platform Manager (APM-S) to assist the APM-F in executing the acceleration instruction,
 wherein the processor, the acceleration module, and the storage device communicate via a Peripheral Component Interconnect Exchange (PCIe) bus, and
 wherein the acceleration module supports performing the acceleration instruction on the application data on the storage device for the application program without loading the application data into the memory.

Statement 2. An embodiment of the inventive concept includes the system according to statement 1, further comprising:
 a first bridging component including the upstream interface, the first bridging component bridging communications between the processor and the acceleration module; and
 a second bridging component including the downstream interface, the second bridging component bridging communications between the acceleration module and storage device.

Statement 3. An embodiment of the inventive concept includes the system according to statement 1, wherein:
 the acceleration module is implemented using a Field Programmable Gate Array (FPGA);
 the acceleration module includes the upstream interface and the downstream interface; and
 the storage device includes a Solid State Drive (SSD).

Statement 4. An embodiment of the inventive concept includes the system according to statement 3, wherein the APM-F and APM-S communicate using the downstream interface and the endpoint of the SSD regarding the application data to be used with the acceleration instruction.

Statement 5. An embodiment of the inventive concept includes the system according to statement 3, wherein the APM-F and the APM-S communicate using messages.

Statement 6. An embodiment of the inventive concept includes the system according to statement 3, wherein the processor may send a PCIe transaction to the SSD, the PCIe transaction including a transaction layer packet (TLP) encoding a command using a Non-Volatile Memory Express (NVMe) protocol.

Statement 7. An embodiment of the inventive concept includes the system according to statement 3, wherein the FPGA further includes:

an acceleration engine; and a run-time scheduler to schedule the acceleration instruction with the acceleration engine.

Statement 8. An embodiment of the inventive concept includes the system according to statement 3, wherein the SSD includes the FPGA.

Statement 9. An embodiment of the inventive concept includes the system according to statement 3, wherein:

the upstream interface includes an upstream port;

the downstream interface includes a downstream port;

the FPGA is operative to forward a first PCIe transaction received from the processor at the upstream port to the SSD;

the FPGA includes a downstream filter associated with the downstream port, the downstream filter operative to intercept an acceleration instruction received from the SSD and deliver the acceleration instruction to the APM-F, the acceleration instruction being associated with a downstream Filter Address Range (FAR); and the FPGA is operative to forward a second PCIe transaction not associated with the downstream FAR received from the SSD at the downstream port to the processor.

Statement 10. An embodiment of the inventive concept includes the system according to statement 9, wherein the acceleration instruction is generated by the APM-S.

Statement 11. An embodiment of the inventive concept includes the system according to statement 10, wherein the SSD further includes a host interface logic (HIL) to intercept a special command received from the processor, the special command including the acceleration instruction, and to forward the special command to the APM-S to trigger the APM-S to generate the acceleration instruction.

Statement 12. An embodiment of the inventive concept includes the system according to statement 11, wherein the special command originates from an Acceleration Service Manager (ASM) running on the processor.

Statement 13. An embodiment of the inventive concept includes the system according to statement 9, wherein:

the SSD is operative to request a block of host system addresses from the processor; and the controller is operative to select a subset of the block of host system addresses as the downstream FAR.

Statement 14. An embodiment of the inventive concept includes the system according to statement 13, wherein the controller is operative to program the downstream filter with the downstream FAR.

Statement 15. An embodiment of the inventive concept includes the system according to statement 14, wherein the controller is operative to use a sideband bus to program the downstream filter with the downstream FAR.

Statement 16. An embodiment of the inventive concept includes the system according to statement 15, wherein the sideband bus is drawn from a set including an Inter-Integrated Circuit ($I^2C$) bus and a System Management Bus (SMBus).

Statement 17. An embodiment of the inventive concept includes the system according to statement 14, wherein the controller is operative to use a PCIe Vendor Defined Message (VDM) to program the downstream filter with the downstream FAR.

Statement 18. An embodiment of the inventive concept includes the system according to statement 9, wherein:

the APM-F is operative to send a result to the APM-S via the downstream port and the endpoint of the SSD; and the controller is operative to forward the result to the processor via the endpoint of the SSD.

Statement 19. An embodiment of the inventive concept includes the system according to statement 9, wherein the APM-F is operative to send a result to the processor via the upstream port.

Statement 20. An embodiment of the inventive concept includes the system according to statement 9, wherein:

the FPGA further includes an upstream filter associated with the upstream port, the upstream filter operative to intercept a second acceleration instruction received from the processor and deliver the second acceleration instruction to the APM-F, the second acceleration instruction being associated with an upstream FAR; and the FPGA is operative to forward a third PCIe transaction not associated with the upstream FAR received from the processor at the upstream port to the SSD.

Statement 21. An embodiment of the inventive concept includes the system according to statement 20, wherein the second acceleration instruction originates from an ASM running on the processor.

Statement 22. An embodiment of the inventive concept includes the system according to statement 20, wherein:

the SSD is operative to request a block of host system addresses from the processor; and the controller is operative to select a first subset of the block of host system addresses as the downstream FAR and a second subset of the block of host system addresses as the upstream FAR.

Statement 23. An embodiment of the inventive concept includes the system according to statement 22, wherein the block of host system addresses includes a special register accessible by an ASM running on the processor, the special register identifying the upstream FAR.

Statement 24. An embodiment of the inventive concept includes the system according to statement 22, wherein the controller is operative to program the downstream filter with the downstream FAR and the upstream filter with the upstream FAR.

Statement 25. An embodiment of the inventive concept includes the system according to statement 24, wherein the controller is operative to use a sideband bus to program the downstream filter with the downstream FAR and the upstream filter with the upstream FAR.

Statement 26. An embodiment of the inventive concept includes the system according to statement 25, wherein the sideband bus is drawn from a set including an $I^2C$ bus and an SMBus.

Statement 27. An embodiment of the inventive concept includes the system according to statement 24, wherein the controller is operative to use a PCIe VDM to program the downstream filter with the downstream FAR and the upstream filter with the upstream FAR.

Statement 28. An embodiment of the inventive concept includes the system according to statement 20, wherein:

the APM-F is operative to send a result to the APM-S via the downstream port and the endpoint of the SSD; and the controller is operative to forward the result to the processor via the endpoint of the SSD.

Statement 29. An embodiment of the inventive concept includes the system according to statement 20, wherein the APM-F is operative to send a result to the processor via the upstream port.

Statement 30. An embodiment of the inventive concept includes the system according to statement 9, wherein:

the SSD includes a physical function (PF) and a virtual function (VF), the PF operative to expose the SSD and the VF operative to expose the FPGA;

the FPGA further includes an upstream filter associated with the upstream port, the upstream filter operative to intercept a second acceleration instruction received from the processor and deliver the second acceleration instruction to the APM-F; and the FPGA is operative to forward a third PCIe transaction not intercepted by the upstream filter received from the processor at the upstream port to the SSD.

Statement 31. An embodiment of the inventive concept includes the system according to statement 30, wherein the second acceleration instruction originates from an ASM running on the processor.

Statement 32. An embodiment of the inventive concept includes the system according to statement 30, wherein:

the PF is operative to request a first block of host system addresses from the processor;

the controller is operative to select a first subset of the block of host system addresses as the downstream FAR.

Statement 33. An embodiment of the inventive concept includes the system according to statement 32, wherein the controller is operative to program the downstream filter with the downstream FAR.

Statement 34. An embodiment of the inventive concept includes the system according to statement 33, wherein the controller is operative to use a sideband bus to program the downstream filter with the downstream FAR.

Statement 35. An embodiment of the inventive concept includes the system according to statement 34, wherein the sideband bus is drawn from a set including an $I^2C$ bus and an SMBus.

Statement 36. An embodiment of the inventive concept includes the system according to statement 33, wherein the controller is operative to use a PCIe VDM to program the downstream filter with the downstream FAR.

Statement 37. An embodiment of the inventive concept includes the system according to statement 30, wherein:

the second acceleration instruction is associated with the upstream FAR; and the upstream filter is operative to intercept the second acceleration instruction associated with an upstream FAR.

Statement 38. An embodiment of the inventive concept includes the system according to statement 37, wherein the VF is operative to request a second block of host system addresses from the processor as the upstream FAR.

Statement 39. An embodiment of the inventive concept includes the system according to statement 38, wherein the controller is operative to program the upstream filter with the upstream FAR.

Statement 40. An embodiment of the inventive concept includes the system according to statement 39, wherein the controller is operative to use a sideband bus to program the upstream filter with the upstream FAR.

Statement 41. An embodiment of the inventive concept includes the system according to statement 40, wherein the sideband bus is drawn from a set including an $I^2C$ bus and an SMBus.

Statement 42. An embodiment of the inventive concept includes the system according to statement 39, wherein the controller is operative to use a PCIe VDM to program the upstream filter with the upstream FAR.

Statement 43. An embodiment of the inventive concept includes the system according to statement 30, wherein:

the second acceleration instruction includes an identifier of the VF; and the upstream filter is operative to intercept the second acceleration instruction associated with the identifier of the VF.

Statement 44. An embodiment of the inventive concept includes the system according to statement 43, wherein the controller is operative to program the upstream filter with the identifier of the VF.

Statement 45. An embodiment of the inventive concept includes the system according to statement 44, wherein the controller is operative to use a sideband bus to program the upstream filter with the identifier of the VF.

Statement 46. An embodiment of the inventive concept includes the system according to statement 45, wherein the sideband bus is drawn from a set including an $I^2C$ bus and an SMBus.

Statement 47. An embodiment of the inventive concept includes the system according to statement 44, wherein the controller is operative to use a PCIe VDM to program the upstream filter with the identifier of the VF.

Statement 48. An embodiment of the inventive concept includes the system according to statement 30, wherein:

the APM-F is operative to send a result to the APM-S via the downstream port and the endpoint of the SSD; and the controller is operative to forward the result to the processor via the endpoint of the SSD.

Statement 49. An embodiment of the inventive concept includes the system according to statement 30, wherein the APM-F is operative to send a result to the processor via the upstream port.

Statement 50. An embodiment of the inventive concept includes the system according to statement 9, wherein:

the SSD includes a first PF and a second PF, the first PF operative to expose the SSD and the second PF operative to expose the FPGA;

the FPGA further includes an upstream filter associated with the upstream port, the upstream filter operative to intercept a second acceleration instruction received from the processor and deliver the second acceleration instruction to the APM-F; and the FPGA is operative to forward a third PCIe transaction not intercepted by the upstream filter received from the processor at the upstream port to the SSD.

Statement 51. An embodiment of the inventive concept includes the system according to statement 50, wherein the second acceleration instruction originates from an ASM running on the processor.

Statement 52. An embodiment of the inventive concept includes the system according to statement 50, wherein:

the first PF is operative to request a first block of host system addresses from the processor;

the controller is operative to select a first subset of the block of host system addresses as the downstream FAR.

Statement 53. An embodiment of the inventive concept includes the system according to statement 52, wherein the controller is operative to program the downstream filter with the downstream FAR.

Statement 54. An embodiment of the inventive concept includes the system according to statement 53, wherein the controller is operative to use a sideband bus to program the downstream filter with the downstream FAR.

Statement 55. An embodiment of the inventive concept includes the system according to statement 54, wherein the sideband bus is drawn from a set including an $I^2C$ bus and an SMBus.

Statement 56. An embodiment of the inventive concept includes the system according to statement 53, wherein the controller is operative to use a PCIe VDM to program the downstream filter with the downstream FAR.

Statement 57. An embodiment of the inventive concept includes the system according to statement 50, wherein:

the second acceleration instruction is associated with the upstream FAR; and the upstream filter is operative to intercept the second acceleration instruction associated with an upstream FAR.

Statement 58. An embodiment of the inventive concept includes the system according to statement 57, wherein the second PF is operative to request a second block of host system addresses from the processor as the upstream FAR.

Statement 59. An embodiment of the inventive concept includes the system according to statement 58, wherein the controller is operative to program the upstream filter with the upstream FAR.

Statement 60. An embodiment of the inventive concept includes the system according to statement 59, wherein the controller is operative to use a sideband bus to program the upstream filter with the upstream FAR.

Statement 61. An embodiment of the inventive concept includes the system according to statement 60, wherein the sideband bus is drawn from a set including an $I^2C$ bus and an SMBus.

Statement 62. An embodiment of the inventive concept includes the system according to statement 59, wherein the controller is operative to use a PCIe VDM to program the upstream filter with the upstream FAR.

Statement 63. An embodiment of the inventive concept includes the system according to statement 50, wherein:

the second acceleration instruction includes an identifier of the second PF; and the upstream filter is operative to intercept the second acceleration instruction associated with an identifier of the second PF.

Statement 64. An embodiment of the inventive concept includes the system according to statement 63, wherein the controller is operative to program the upstream filter with the identifier of the second PF.

Statement 65. An embodiment of the inventive concept includes the system according to statement 64, wherein the controller is operative to use a sideband bus to program the upstream filter with the identifier of the second PF.

Statement 66. An embodiment of the inventive concept includes the system according to statement 65, wherein the sideband bus is drawn from a set including an $I^2C$ bus and an SMBus.

Statement 67. An embodiment of the inventive concept includes the system according to statement 64, wherein the controller is operative to use a PCIe VDM to program the upstream filter with the identifier of the second PF.

Statement 68. An embodiment of the inventive concept includes the system according to statement 50, wherein:

the APM-F is operative to send a result to the APM-S via the downstream port and the endpoint of the SSD; and the controller is operative to forward the result to the processor via the endpoint of the SSD.

Statement 69. An embodiment of the inventive concept includes the system according to statement 50, wherein the APM-F is operative to send a result to the processor via the upstream port.

Statement 70. An embodiment of the inventive concept includes the system according to statement 3, wherein:

the upstream interface includes an FPGA endpoint;

the downstream interface includes a FPGA root port, the FPGA root port supporting a configuration space;

the FPGA includes a first PF, a second PF, and a downstream filter associated with the FPGA root port, the downstream filter operative to intercept a first acceleration instruction received from the SSD and deliver the first acceleration instruction to the APM-F, the first acceleration instruction being associated with a downstream FAR;

the FPGA is operative to request a first block of host system addresses from the processor for the first PF and to request a second block of host system addresses from the processor for the second PF; and the FPGA is operative to forward a first PCIe transaction received from the processor to the SSD and to forward a second acceleration instruction received from the processor to the APM-F, the first PCIe transaction being associated with a first identifier of the first PF and the second acceleration instruction being associated with a second identifier of the second PF.

Statement 71. An embodiment of the inventive concept includes the system according to statement 70, wherein:

the SSD is operative to request a block of FPGA addresses from the FPGA, the block of FPGA addresses including the downstream FAR;

the second block of host system addresses is at least as large as the block of FPGA addresses; and the controller is operative to select a subset of the block of FPGA addresses as the downstream FAR.

Statement 72. An embodiment of the inventive concept includes the system according to statement 71, wherein the controller is operative to program the downstream filter with the downstream FAR.

Statement 73. An embodiment of the inventive concept includes the system according to statement 72, wherein the controller is operative to use a sideband bus to program the downstream filter with the downstream FAR.

Statement 74. An embodiment of the inventive concept includes the system according to statement 73, wherein the sideband bus is drawn from a set including an $I^2C$ bus and an SMBus.

Statement 75. An embodiment of the inventive concept includes the system according to statement 72, wherein the controller is operative to use a PCIe VDM to program the downstream filter with the downstream FAR.

Statement 76. An embodiment of the inventive concept includes the system according to statement 70, wherein the APM-F is operative to send a result to the processor via the FPGA endpoint.

Statement 77. An embodiment of the inventive concept includes the system according to statement 70, wherein the FPGA further includes a configuration monitor to copy a capability of the endpoint of the SSD to the FPGA endpoint.

Statement 78. An embodiment of the inventive concept includes the system according to statement 3, wherein:

the upstream interface includes an FPGA endpoint;

the downstream interface includes a first FPGA root port and a second FPGA root port, the first FPGA root port supporting a first configuration space, the second FPGA root port supporting a second configuration space;

the endpoint of the SSD is associated with the first FPGA root port;

the SSD further includes a second endpoint of the SSD associated with the second FPGA root port;

the FPGA includes a first PF and a second PF;

the FPGA is operative to request a first block of host system addresses from the processor for the first PF and to request a second block of host system addresses from the processor for the second PF; and the FPGA is operative to:

forward a first PCIe transaction received from the processor to the SSD via the first FPGA root port and the endpoint of the SSD, the first PCIe transaction being associated with a first identifier of the first PF;

forward a second acceleration instruction received from the processor to the APM-F, the second acceleration instruction being associated with a second identifier of the second PF;

forward a second PCIe transaction received from the SSD at the first FPGA root port to the processor; and forward a first acceleration instruction received from the SSD at the second FPGA root port to the APM-F.

Statement 79. An embodiment of the inventive concept includes the system according to statement 78, wherein the second acceleration instruction is generated by the APM-S.

Statement 80. An embodiment of the inventive concept includes the system according to statement 78, wherein the APM-F is operative to send a result to the processor via the FPGA endpoint.

Statement 81. An embodiment of the inventive concept includes the system according to statement 78, wherein the FPGA further includes a configuration monitor to copy a capability of the endpoint of the SSD to the FPGA endpoint.

Statement 82. An embodiment of the inventive concept includes the system according to statement 78, wherein:

the upstream interface further includes a second FPGA endpoint; and the FPGA is further operative to:

forward a first PCIe transaction received from the processor at the FPGA endpoint to the SSD via the first FPGA root port and the endpoint of the SSD; and forward a second acceleration instruction received from the processor at the second FPGA endpoint to the APM-F.

Statement 83. An embodiment of the inventive concept includes the system according to statement 82, wherein the second acceleration instruction is generated by the APM-S.

Statement 84. An embodiment of the inventive concept includes the system according to statement 82, wherein the APM-F is operative to send a result to the processor via the FPGA endpoint.

Statement 85. An embodiment of the inventive concept includes the system according to statement 82, wherein the FPGA further includes a configuration monitor to copy a capability of the endpoint of the SSD to the first FPGA endpoint.

Statement 86. An embodiment of the inventive concept includes the system according to statement 3, wherein:

the upstream interface includes a first FPGA endpoint and a second FPGA endpoint;

the downstream interface includes a FPGA root port, the FPGA root port supporting a configuration space;

the FPGA includes a downstream filter associated with the FPGA root port, the downstream filter operative to intercept a first acceleration instruction received from the SSD and deliver the first acceleration instruction to the APM-F, the first acceleration instruction being associated with a downstream FAR; and the FPGA is operative to:

forward a first PCIe transaction received from the processor at the FPGA endpoint to the SSD via the first FPGA root port and the endpoint of the SSD;

forward a second acceleration instruction received from the processor at the second FPGA endpoint to the APM-F;

forward a second PCIe transaction not associated with the downstream FAR received from the SSD at the first FPGA root port to the processor via the FPGA endpoint; and forward a first acceleration instruction received from the SSD at the second FPGA root port to the APM-F.

Statement 87. An embodiment of the inventive concept includes the system according to statement 86, wherein the second acceleration instruction is generated by the APM-S.

Statement 88. An embodiment of the inventive concept includes the system according to statement 86, wherein:

the SSD is operative to request a block of FPGA addresses from the FPGA, the block of FPGA addresses including the downstream FAR;

the FPGA is operative to request a block of host system addresses from the processor for the first FPGA endpoint, the block of host system addresses at least as large as the block of FPGA addresses; and the controller is operative to select a subset of the block of PGA addresses as the downstream FAR.

Statement 89. An embodiment of the inventive concept includes the system according to statement 88, wherein the controller is operative to program the downstream filter with the downstream FAR.

Statement 90. An embodiment of the inventive concept includes the system according to statement 89, wherein the controller is operative to use a sideband bus to program the downstream filter with the downstream FAR.

Statement 91. An embodiment of the inventive concept includes the system according to statement 90, wherein the sideband bus is drawn from a set including an $I^2C$ bus and an SMBus.

Statement 92. An embodiment of the inventive concept includes the system according to statement 89, wherein the controller is operative to use a PCIe VDM to program the downstream filter with the downstream FAR.

Statement 93. An embodiment of the inventive concept includes the system according to statement 86, wherein the APM-F is operative to send a result to the processor via the FPGA endpoint.

Statement 94. An embodiment of the inventive concept includes the system according to statement 86, wherein the FPGA further includes a configuration monitor to copy a capability of the endpoint of the SSD to the first FPGA endpoint.

Statement 95. An embodiment of the inventive concept includes an acceleration module implemented using hardware, comprising:

an Acceleration Platform Manager (APM-F) to execute an acceleration instruction;

an upstream interface for communicating with a processor, an application program running on the processor; and a downstream interface for communicating with a storage device, the storage device including a storage device Acceleration Platform Manager (APM-S) to assist the APM-F in executing the acceleration instruction, wherein the acceleration module communicates with the processor and the storage device using a Peripheral Component Interconnect Exchange (PCIe) bus, and wherein the acceleration module supports performing the acceleration instruction on application data on the storage device for the application program without loading the application data into a memory associated with the processor.

Statement 96. An embodiment of the inventive concept includes the acceleration module according to statement 95, wherein:

the acceleration module is implemented using a Field Programmable Gate Array (FPGA).

Statement 97. An embodiment of the inventive concept includes the acceleration module according to statement 96, wherein the APM-F and APM-S communicate using the downstream interface regarding the application data to be used with the acceleration instruction.

Statement 98. An embodiment of the inventive concept includes the acceleration module according to statement 96, wherein the APM-F and the APM-S communicate using messages.

Statement 99. An embodiment of the inventive concept includes the acceleration module according to statement 96, wherein the FPGA further includes:

an acceleration engine; and a run-time scheduler to schedule the acceleration instruction with the acceleration engine.

Statement 100. An embodiment of the inventive concept includes the acceleration module according to statement 96, wherein:

the upstream interface includes an upstream port;

the downstream interface includes a downstream port;

the FPGA is operative to forward a first PCIe transaction received from the processor at the upstream port to the storage device;

the FPGA includes a downstream filter associated with the downstream port, the downstream filter operative to intercept an acceleration instruction received from the storage device and deliver the acceleration instruction to the APM-F, the acceleration instruction being associated with a downstream Filter Address Range (FAR); and the FPGA is operative to forward a second PCIe transaction not associated with the downstream FAR received from the storage device at the downstream port to the processor.

Statement 101. An embodiment of the inventive concept includes the acceleration module according to statement 100, wherein the downstream FAR in the downstream filter of the FPGA may be programmed by the storage device.

Statement 102. An embodiment of the inventive concept includes the acceleration module according to statement 101, wherein the downstream FAR in the downstream filter of the FPGA may be programmed by the storage device over a sideband bus.

Statement 103. An embodiment of the inventive concept includes the acceleration module according to statement 102, wherein the sideband bus is drawn from a set including an Inter-Integrated Circuit ($I^2C$) bus and a System Management Bus (SMBus).

Statement 104. An embodiment of the inventive concept includes the acceleration module according to statement 101, wherein the downstream FAR in the downstream filter of the FPGA may be programmed by the storage device using a PCIe Vendor Defined Message (VDM).

Statement 105. An embodiment of the inventive concept includes the acceleration module according to statement 100, wherein the APM-F is operative to send a result to the APM-S of the storage device via the downstream port.

Statement 106. An embodiment of the inventive concept includes the acceleration module according to statement 100, wherein the APM-F is operative to send a result to the processor via the upstream port.

Statement 107. An embodiment of the inventive concept includes the acceleration module according to statement 100, wherein the APM-F and the APM-S communicate using messages.

Statement 108. An embodiment of the inventive concept includes the acceleration module according to statement 100, wherein:

the FPGA further includes an upstream filter associated with the upstream port, the upstream filter operative to intercept a second acceleration instruction received from the processor and deliver the second acceleration instruction to the APM-F, the second acceleration instruction being associated with an upstream FAR; and the FPGA is operative to forward a third PCIe transaction not associated with the upstream FAR received from the processor at the upstream port to the storage device.

Statement 109. An embodiment of the inventive concept includes the acceleration module according to statement 108, wherein the upstream FAR in the upstream filter of the FPGA may be programmed by the storage device.

Statement 110. An embodiment of the inventive concept includes the acceleration module according to statement 109, wherein the upstream FAR in the upstream filter of the FPGA may be programmed by the storage device using a sideband bus.

Statement 111. An embodiment of the inventive concept includes the acceleration module according to statement 110, wherein the sideband bus is drawn from a set including an $I^2C$ bus and an SMBus.

Statement 112. An embodiment of the inventive concept includes the acceleration module according to statement 109, wherein the upstream FAR in the upstream filter of the FPGA may be programmed by the storage device using a PCIe VDM.

Statement 113. An embodiment of the inventive concept includes the acceleration module according to statement 108, wherein the APM-F is operative to send a result to the APM-S of the storage device via the downstream port.

Statement 114. An embodiment of the inventive concept includes the acceleration module according to statement 108, wherein the APM-F is operative to send a result to the processor via the upstream port.

Statement 115. An embodiment of the inventive concept includes the acceleration module according to statement 108, wherein the APM-F and the APM-S communicate using messages.

Statement 116. An embodiment of the inventive concept includes the acceleration module according to statement 108, wherein the FPGA is indirectly exposed to the processor through a Non-Volatile Memory Express (NVMe) register assigned to the storage device.

Statement 117. An embodiment of the inventive concept includes the acceleration module according to statement 100, wherein:

the FPGA is exposed by a virtual function (VF) of the storage device;

the FPGA further includes an upstream filter associated with the upstream port, the upstream filter operative to intercept a second acceleration instruction received from the processor and deliver the second acceleration instruction to the APM-F; and the FPGA is operative to forward a third PCIe transaction not intercepted by the upstream filter received from the processor at the upstream port to the storage device.

Statement 118. An embodiment of the inventive concept includes the acceleration module according to statement 117, wherein:

the second acceleration instruction is associated with an upstream FAR; and the upstream filter is operative to intercept the second acceleration instruction associated with an upstream FAR.

Statement 119. An embodiment of the inventive concept includes the acceleration module according to statement 118, wherein the upstream FAR in the upstream filter of the FPGA may be programmed by the storage device.

Statement 120. An embodiment of the inventive concept includes the acceleration module according to statement 119, wherein the upstream FAR in the upstream filter of the FPGA may be programmed by the storage device using a sideband bus.

Statement 121. An embodiment of the inventive concept includes the acceleration module according to statement 120, wherein the sideband bus is drawn from a set including an I²C bus and an SMBus.

Statement 122. An embodiment of the inventive concept includes the acceleration module according to statement 119, wherein the upstream FAR in the upstream filter of the FPGA may be programmed by the storage device using a PCIe VDM.

Statement 123. An embodiment of the inventive concept includes the acceleration module according to statement 117, wherein:

the second acceleration instruction includes an identifier of the VF; and the upstream filter is operative to intercept the second acceleration instruction associated with the identifier of the VF.

Statement 124. An embodiment of the inventive concept includes the acceleration module according to statement 123, wherein the upstream filter of the FPGA may be programmed with the identifier of the VF by the storage device.

Statement 125. An embodiment of the inventive concept includes the acceleration module according to statement 124, wherein the upstream filter of the FPGA may be programmed with the identifier of the VF by the storage device using a sideband bus.

Statement 126. An embodiment of the inventive concept includes the acceleration module according to statement 125, wherein the sideband bus is drawn from a set including an I²C bus and an SMBus.

Statement 127. An embodiment of the inventive concept includes the acceleration module according to statement 124, wherein the upstream filter of the FPGA may be programmed with the identifier of the VF by the storage device using a PCIe VDM.

Statement 128. An embodiment of the inventive concept includes the acceleration module according to statement 117, wherein the APM-F is operative to send a result to the APM-S of the storage device via the downstream port.

Statement 129. An embodiment of the inventive concept includes the acceleration module according to statement 117, wherein the APM-F is operative to send a result to the processor via the upstream port.

Statement 130. An embodiment of the inventive concept includes the acceleration module according to statement 117, wherein the APM-F and the APM-S communicate using messages.

Statement 131. An embodiment of the inventive concept includes the acceleration module according to statement 100, wherein:

the FPGA is exposed by a physical function (PF) of the storage device;

the FPGA further includes an upstream filter associated with the upstream port, the upstream filter operative to intercept a second acceleration instruction received from the processor and deliver the second acceleration instruction to the APM-F; and the FPGA is operative to forward a third PCIe transaction not intercepted by the upstream filter received from the processor at the upstream port to the storage device.

Statement 132. An embodiment of the inventive concept includes the acceleration module according to statement 131, wherein:

the second acceleration instruction is associated with the upstream FAR; and the upstream filter is operative to intercept the second acceleration instruction associated with an upstream FAR.

Statement 133. An embodiment of the inventive concept includes the acceleration module according to statement 132, wherein the upstream FAR in the upstream filter of the FPGA may be programmed by the storage device.

Statement 134. An embodiment of the inventive concept includes the acceleration module according to statement 133, wherein the upstream FAR in the upstream filter of the FPGA may be programmed by the storage device using a sideband bus.

Statement 135. An embodiment of the inventive concept includes the acceleration module according to statement 134, wherein the sideband bus is drawn from a set including an I²C bus and an SMBus.

Statement 136. An embodiment of the inventive concept includes the acceleration module according to statement 133, wherein the upstream FAR in the upstream filter of the FPGA may be programmed by the storage device using a PCIe VDM.

Statement 137. An embodiment of the inventive concept includes the acceleration module according to statement 131, wherein:

the second acceleration instruction includes an identifier of the PF; and the upstream filter is operative to intercept the second acceleration instruction associated with the identifier of the PF.

Statement 138. An embodiment of the inventive concept includes the acceleration module according to statement 137, wherein the upstream filter of the FPGA may be programmed with the identifier of the PF by the storage device.

Statement 139. An embodiment of the inventive concept includes the acceleration module according to statement 138, wherein the upstream filter of the FPGA may be programmed with the identifier of the PF by the storage device using a sideband bus.

Statement 140. An embodiment of the inventive concept includes the acceleration module according to statement 139, wherein the sideband bus is drawn from a set including an I²C bus and an SMBus.

Statement 141. An embodiment of the inventive concept includes the acceleration module according to statement 138, wherein the upstream filter of the FPGA may be programmed with the identifier of the PF by the storage device using a PCIe VDM.

Statement 142. An embodiment of the inventive concept includes the acceleration module according to statement 131, wherein the APM-F is operative to send a result to the APM-S of the storage device via the downstream port.

Statement 143. An embodiment of the inventive concept includes the acceleration module according to statement 131, wherein the APM-F is operative to send a result to the processor via the upstream port.

Statement 144. An embodiment of the inventive concept includes the acceleration module according to statement 131, wherein the APM-F and the APM-S communicate using messages.

Statement 145. An embodiment of the inventive concept includes the acceleration module according to statement 96, wherein:

the upstream interface includes an FPGA endpoint;

the downstream interface includes a FPGA root port, the FPGA root port supporting a configuration space;

the FPGA includes a first PF, a second PF, and a downstream filter associated with the FPGA root port, the downstream filter operative to intercept a first acceleration instruction received from the storage device and deliver the first acceleration instruction to the APM-F, the first acceleration instruction being associated with a downstream FAR;

the FPGA is operative to request a first block of host system addresses from the processor for the first PF and to request a second block of host system addresses from the processor for the second PF; and the FPGA is operative to forward a PCIe transaction received from the processor to the storage device and to forward a second acceleration instruction received from the processor to the APM-F, the PCIe transaction being associated with a first identifier of the first PF the second acceleration instruction being associated with a second identifier of the second PF.

Statement 146. An embodiment of the inventive concept includes the acceleration module according to statement 145, wherein:

the FPGA is operative to receive from the storage device a request for a block of FPGA addresses from the FPGA, the block of FPGA addresses including the downstream FAR;

the FPGA is operative to allocate the block of FPGA addresses from the configuration space; and the first block of host system addresses is at least as large as the block of FPGA addresses.

Statement 147. An embodiment of the inventive concept includes the acceleration module according to statement 146, wherein the downstream FAR in the downstream filter of the FPGA may be programmed by the storage device.

Statement 148. An embodiment of the inventive concept includes the acceleration module according to statement 147, wherein the downstream FAR in the downstream filter of the FPGA may be programmed by the storage device using a sideband bus.

Statement 149. An embodiment of the inventive concept includes the acceleration module according to statement 148, wherein the sideband bus is drawn from a set including an I²C bus and an SMBus.

Statement 150. An embodiment of the inventive concept includes the acceleration module according to statement 147, wherein the downstream FAR in the downstream filter of the FPGA may be programmed by the storage device using a PCIe VDM.

Statement 151. An embodiment of the inventive concept includes the acceleration module according to statement 145, wherein the APM-F is operative to send a result to the processor via the FPGA endpoint.

Statement 152. An embodiment of the inventive concept includes the acceleration module according to statement 145, wherein the APM-F and the APM-S communicate using messages.

Statement 153. An embodiment of the inventive concept includes the acceleration module according to statement 145, wherein the FPGA further includes a configuration monitor to copy a capability of the storage device endpoint to the FPGA endpoint.

Statement 154. An embodiment of the inventive concept includes the acceleration module according to statement 96, wherein:

the upstream interface includes an FPGA endpoint;

the downstream interface includes a first FPGA root port and a second FPGA root port, the first FPGA root port supporting a first configuration space, the second FPGA root port supporting a second configuration space;

the FPGA includes a first PF and a second PF;

the FPGA is operative to request a first block of host system addresses from the processor for the first PF and to request a second block of host system addresses from the processor for the second PF; and the FPGA is operative to:

forward a first PCIe transaction received from the processor to the storage device via the first FPGA root port, the first PCIe transaction being associated with a first identifier of the first PF;

forward a second acceleration instruction received from the processor to the APM-F, the second acceleration instruction being associated with a second identifier of the second PF;

forward a second PCIe transaction received from the storage device at the first FPGA root port to the processor; and forward a first acceleration instruction received from the storage device at the second FPGA root port to the APM-F.

Statement 155. An embodiment of the inventive concept includes the acceleration module according to statement 154, wherein the APM-F is operative to send a result to the processor via the FPGA endpoint.

Statement 156. An embodiment of the inventive concept includes the acceleration module according to statement 154, wherein the APM-F and the APM-S communicate using messages.

Statement 157. An embodiment of the inventive concept includes the acceleration module according to statement 154, wherein the FPGA further includes a configuration monitor to copy a capability of the storage device endpoint to the FPGA endpoint.

Statement 158. An embodiment of the inventive concept includes the acceleration module according to statement 154, wherein:

the upstream interface further includes a second FPGA endpoint; and the FPGA is further operative to:

forward a first PCIe transaction received from the processor at the FPGA endpoint to the storage device via the first FPGA root port; and forward a second acceleration instruction received from the processor at the second FPGA endpoint to the APM-F.

Statement 159. An embodiment of the inventive concept includes the acceleration module according to statement 158, wherein the APM-F is operative to send a result to the processor via the FPGA endpoint.

Statement 160. An embodiment of the inventive concept includes the acceleration module according to statement 158, wherein the APM-F and the APM-S communicate using messages.

Statement 161. An embodiment of the inventive concept includes the acceleration module according to statement 158, wherein the FPGA further includes a configuration monitor to copy a capability of the storage device endpoint to the first FPGA endpoint.

Statement 162. An embodiment of the inventive concept includes the acceleration module according to statement 96, wherein:

the upstream interface includes a first FPGA endpoint and a second FPGA endpoint;

the downstream interface includes a FPGA root port, the FPGA root port supporting a configuration space;

the FPGA includes a downstream filter associated with the FPGA root port, the downstream filter operative to intercept a first acceleration instruction received from the storage device and deliver the first acceleration instruction to the APM-F, the first acceleration instruction being associated with a downstream FAR; and the FPGA is operative to:
forward a first PCIe transaction received from the processor at the FPGA endpoint to the storage device via the first FPGA root port and the storage device endpoint;
forward a second acceleration instruction received from the processor at the second FPGA endpoint to the APM-F;
forward a second PCIe transaction not associated with the downstream FAR received from the storage device at the first FPGA root port to the processor via the FPGA endpoint; and
forward a first acceleration instruction received from the storage device at the second FPGA root port to the APM-F.

Statement 163. An embodiment of the inventive concept includes the acceleration module according to statement 162, wherein:
the FPGA is operative to receive from the storage device a request for a block of FPGA addresses from the FPGA, the block of FPGA addresses including the downstream FAR;
the FPGA is operative to allocate the block of FPGA addresses from the configuration space; and
the FPGA is operative to request a block of host system addresses from the processor for the first FPGA endpoint, the block of host system addresses at least as large as the block of FPGA addresses; and Statement 164. An embodiment of the inventive concept includes the acceleration module according to statement 163, wherein the downstream FAR in the downstream filter of the FPGA may be programmed by the storage device.

Statement 165. An embodiment of the inventive concept includes the acceleration module according to statement 164, wherein the downstream FAR in the downstream filter of the FPGA may be programmed by the storage device using a sideband bus.

Statement 166. An embodiment of the inventive concept includes the acceleration module according to statement 165, wherein the sideband bus is drawn from a set including an I$^2$C bus and an SMBus.

Statement 167. An embodiment of the inventive concept includes the acceleration module according to statement 164, wherein the downstream FAR in the downstream filter of the FPGA may be programmed by the storage device using a PCIe VDM.

Statement 168. An embodiment of the inventive concept includes the acceleration module according to statement 162, wherein the APM-F is operative to send a result to the processor via the FPGA endpoint.

Statement 169. An embodiment of the inventive concept includes the acceleration module according to statement 162, wherein the APM-F and the APM-S communicate using messages.

Statement 170. An embodiment of the inventive concept includes the acceleration module according to statement 162, wherein the FPGA further includes a configuration monitor to copy a capability of the storage device endpoint to the first FPGA endpoint.

Statement 171. An embodiment of the inventive concept includes a first bridging component implemented using hardware, comprising:
an upstream interface for communicating with a processor, an application program running on the processor; and
a downstream interface for communicating with an acceleration module and a storage device,
wherein the first bridging component communicates with the processor, the acceleration module, and the storage device using a Peripheral Component Interconnect Exchange (PCIe) bus, and
the downstream interface is operative to deliver a PCIe transaction from the processor to either the acceleration module or the storage device, depending on whether the PCIe transaction includes an acceleration instruction.

Statement 172. An embodiment of the inventive concept includes the first bridging component according to statement 171, wherein:
the acceleration module is implemented using a Field Programmable Gate Array (FPGA); and
the storage device includes a Solid State Drive (SSD).

Statement 173. An embodiment of the inventive concept includes the first bridging component according to statement 171, further comprising a second bridging component, the second bridging component including:
a second upstream interface for communicating with the processor and the acceleration module; and
a second downstream interface for communicating with the storage device,
wherein the second bridging component communicates with the processor, the acceleration module, and the storage device using a Peripheral Component Interconnect Exchange (PCIe) bus, and
the second upstream interface is operative to deliver a second PCIe transaction from the storage device to either the processor or the acceleration module, depending on whether the second PCIe transaction includes a second acceleration instruction.

Statement 174. An embodiment of the inventive concept includes the first bridging component according to statement 171, wherein:
the upstream interface includes:
an upstream port; and
an upstream filter associated with the upstream port, the upstream filter operative to identify a second acceleration instruction associated with an upstream FAR received from the processor; and
the downstream interface is operative to forward the second acceleration instruction to the acceleration module and to forward a third PCIe transaction not associated with the upstream FAR received from the processor at the upstream port to the storage device.

Statement 175. An embodiment of the inventive concept includes the first bridging component according to statement 174, wherein the upstream FAR in the upstream filter of the first bridging component may be programmed by the storage device.

Statement 176. An embodiment of the inventive concept includes the first bridging component according to statement 175, wherein the upstream FAR in the upstream filter of the first bridging component may be programmed by the storage device using a sideband bus.

Statement 177. An embodiment of the inventive concept includes the first bridging component according to statement 176, wherein the sideband bus is drawn from a set including an I$^2$C bus and an SMBus.

Statement 178. An embodiment of the inventive concept includes the first bridging component according to statement 175, wherein the upstream FAR in the upstream filter of the first bridging component may be programmed by the storage device using a PCIe Vendor Defined Message (VDM).

Statement 179. An embodiment of the inventive concept includes the first bridging component according to statement 174, wherein the FPGA is indirectly exposed to the processor through a Non-Volatile Memory Express (NVMe) register assigned to the storage device.

Statement 180. An embodiment of the inventive concept includes the first bridging component according to statement 171, wherein:

the upstream interface is exposed by a virtual function (VF) of the storage device;

the upstream interface includes:

an upstream port; and an upstream filter associated with the upstream port, the upstream filter operative to identify a second acceleration instruction to the acceleration module; and the downstream interface is operative to forward the second acceleration instruction to the acceleration module and to forward a third PCIe transaction not intercepted by the upstream filter received from the processor at the upstream port to the storage device.

Statement 181. An embodiment of the inventive concept includes the first bridging component according to statement 180, wherein:

the second acceleration instruction is associated with an upstream FAR; and the upstream filter is operative to identify the second acceleration instruction associated with an upstream FAR.

Statement 182. An embodiment of the inventive concept includes the first bridging component according to statement 181, wherein the upstream FAR in the upstream filter of the first bridging component may be programmed by the storage device.

Statement 183. An embodiment of the inventive concept includes the first bridging component according to statement 182, wherein the upstream FAR in the upstream filter of the first bridging component may be programmed by the storage device using a sideband bus.

Statement 184. An embodiment of the inventive concept includes the first bridging component according to statement 183, wherein the sideband bus is drawn from a set including an I²C bus and an SMBus.

Statement 185. An embodiment of the inventive concept includes the first bridging component according to statement 182, wherein the upstream FAR in the upstream filter of the first bridging component may be programmed by the storage device using a PCIe VDM.

Statement 186. An embodiment of the inventive concept includes the first bridging component according to statement 180, wherein:

the second acceleration instruction includes an identifier of the VF; and the upstream filter is operative to identify the second acceleration instruction associated with the identifier of the VF.

Statement 187. An embodiment of the inventive concept includes the first bridging component according to statement 186, wherein the upstream filter of the first bridging component may be programmed with the identifier of the VF by the storage device.

Statement 188. An embodiment of the inventive concept includes the first bridging component according to statement 187, wherein the upstream filter of the first bridging component may be programmed with the identifier of the VF by the storage device using a sideband bus.

Statement 189. An embodiment of the inventive concept includes the first bridging component according to statement 188, wherein the sideband bus is drawn from a set including an I²C bus and an SMBus.

Statement 190. An embodiment of the inventive concept includes the first bridging component according to statement 187, wherein the upstream filter of the first bridging component may be programmed with the identifier of the VF by the storage device using a PCIe VDM.

Statement 191. An embodiment of the inventive concept includes the first bridging component according to statement 171, wherein:

the upstream interface is exposed by a physical function (PF) of the storage device;

the upstream interface includes:

an upstream port; and an upstream filter associated with the upstream port, the upstream filter operative to identify a second acceleration instruction to the acceleration module; and the downstream interface is operative to forward the second acceleration instruction to the acceleration module and to forward a third PCIe transaction not intercepted by the upstream filter received from the processor at the upstream port to the storage device.

Statement 192. An embodiment of the inventive concept includes the first bridging component according to statement 191, wherein:

the second acceleration instruction is associated with an upstream FAR; and the upstream filter is operative to identify the second acceleration instruction associated with an upstream FAR.

Statement 193. An embodiment of the inventive concept includes the first bridging component according to statement 192, wherein the upstream FAR in the upstream filter of the first bridging component may be programmed by the storage device.

Statement 194. An embodiment of the inventive concept includes the first bridging component according to statement 193, wherein the upstream FAR in the upstream filter of the first bridging component may be programmed by the storage device using a sideband bus.

Statement 195. An embodiment of the inventive concept includes the first bridging component according to statement 194, wherein the sideband bus is drawn from a set including an I²C bus and an SMBus.

Statement 196. An embodiment of the inventive concept includes the first bridging component according to statement 193, wherein the upstream FAR in the upstream filter of the first bridging component may be programmed by the storage device using a PCIe VDM.

Statement 197. An embodiment of the inventive concept includes the first bridging component according to statement 191, wherein:

the second acceleration instruction includes an identifier of the PF; and the upstream filter is operative to identify the second acceleration instruction associated with the identifier of the PF.

Statement 198. An embodiment of the inventive concept includes the first bridging component according to statement 197, wherein the upstream filter of the first bridging component may be programmed with the identifier of the PF by the storage device.

Statement 199. An embodiment of the inventive concept includes the first bridging component according to statement 198, wherein the upstream filter of the first bridging component may be programmed with the identifier of the PF by the storage device using a sideband bus.

Statement 200. An embodiment of the inventive concept includes the first bridging component according to statement 199, wherein the sideband bus is drawn from a set including an I²C bus and an SMBus.

Statement 201. An embodiment of the inventive concept includes the first bridging component according to statement 198, wherein the upstream filter of the first bridging component may be programmed with the identifier of the PF by the storage device using a PCIe VDM.

Statement 202. An embodiment of the inventive concept includes the first bridging component according to statement 171, wherein:
the upstream interface includes:
an endpoint;
a first PF; and
a second PF; and
the downstream interface is operative to forward a PCIe transaction received from the processor to the storage device and to forward a second acceleration instruction received from the processor to the acceleration module, the PCIe transaction being associated with a first identifier of the first PF, the second acceleration instruction being associated with a second identifier of the second PF.

Statement 203. An embodiment of the inventive concept includes the first bridging component according to statement 202, wherein the first bridging component further includes a configuration monitor to copy a capability of the endpoint of the storage device to the endpoint.

Statement 204. An embodiment of the inventive concept includes the first bridging component according to statement 171, wherein:
the upstream interface includes:
a first endpoint; and
a second endpoint; and
the downstream interface is operative to forward a PCIe transaction associated with the first endpoint received from the processor to the storage device and to forward a second acceleration instruction received from the processor to the acceleration module, the second acceleration instruction being associated with the second endpoint.

Statement 205. An embodiment of the inventive concept includes the first bridging component according to statement 204, wherein the first bridging component further includes a configuration monitor to copy a capability of the endpoint of the storage device to the first endpoint.

Statement 206. An embodiment of the inventive concept includes a second bridging component implemented using hardware, comprising:
an upstream interface for communicating with a processor and an acceleration module;
and a downstream interface for communicating with a storage device,
wherein the first bridging component communicates with the processor, the acceleration module, and the storage device using a Peripheral Component Interconnect Exchange (PCIe) bus, and
the upstream interface is operative to deliver a PCIe transaction from the storage device to either the processor or the acceleration module, depending on whether the PCIe transaction includes an acceleration instruction.

Statement 207. An embodiment of the inventive concept includes the second bridging component according to statement 206, wherein:

the acceleration module is implemented using a Field Programmable Gate Array (FPGA); and
the storage device includes a Solid State Drive (SSD).

Statement 208. An embodiment of the inventive concept includes the second bridging component according to statement 206, wherein:
the downstream interface includes:
a downstream port; and
a downstream filter associated with the downstream port, the downstream filter operative to identify an acceleration instruction associated with a downstream Filter Address Range (FAR) received from the storage device;
the downstream interface is operative to forward the acceleration instruction to the acceleration module and to forward a second PCIe transaction not associated with the downstream FAR received from the storage device at the downstream port to the processor.

Statement 209. An embodiment of the inventive concept includes the second bridging component according to statement 208, wherein the downstream FAR in the downstream filter of the second bridging component may be programmed by the storage device.

Statement 210. An embodiment of the inventive concept includes the second bridging component according to statement 209, wherein the downstream FAR in the downstream filter of the second bridging component may be programmed by the storage device over a sideband bus.

Statement 211. An embodiment of the inventive concept includes the second bridging component according to statement 210, wherein the sideband bus is drawn from a set including an Inter-Integrated Circuit (I²C) bus and a System Management Bus (SMBus).

Statement 212. An embodiment of the inventive concept includes the second bridging component according to statement 209, wherein the downstream FAR in the downstream filter of the second bridging component may be programmed by the storage device using a PCIe Vendor Defined Message (VDM).

Statement 213. An embodiment of the inventive concept includes the second bridging component according to statement 206, wherein:
the downstream interface includes:
a root port; and
a downstream filter associated with the root port, the downstream filter operative to identify an acceleration instruction associated with a downstream Filter Address Range (FAR) received from the storage device;
the downstream interface is operative to forward the acceleration instruction to the acceleration module and to forward a second PCIe transaction not associated with the downstream FAR received from the storage device at the downstream port to the processor.

Statement 214. An embodiment of the inventive concept includes the second bridging component according to statement 213, wherein the downstream FAR in the downstream filter of the second bridging component may be programmed by the storage device.

Statement 215. An embodiment of the inventive concept includes the second bridging component according to statement 214, wherein the downstream FAR in the downstream filter of the second bridging component may be programmed by the storage device using a sideband bus.

Statement 216. An embodiment of the inventive concept includes the second bridging component according to statement 215, wherein the sideband bus is drawn from a set including an I²C bus and an SMBus.

Statement 217. An embodiment of the inventive concept includes the second bridging component according to statement 214, wherein the downstream FAR in the downstream filter of the second bridging component may be programmed by the storage device using a PCIe VDM.

Statement 218. An embodiment of the inventive concept includes the second bridging component according to statement 206, wherein:
the downstream interface includes:
a first root port; and
a second root port,
wherein the downstream interface is operative to forward a second PCIe transaction received from the storage device at the first root port to the processor and to forward an acceleration instruction received from the storage device at the second root port to the acceleration module.

Statement 219. An embodiment of the inventive concept includes a storage device, comprising:
an endpoint of the storage device for communicating with an acceleration module, the acceleration module including an Acceleration Platform Manager (APM-F);
a controller to manage operations of the storage device;
storage to store application data for the application program; and
a storage device Acceleration Platform Manager (APM-S) to assist the APM-F in executing the acceleration instruction,
wherein the storage device and the acceleration module communicate using a Peripheral Component Interconnect Exchange (PCIe) bus, and
wherein the acceleration module supports performing the acceleration instruction on the application data on the storage device for the application program without loading the application data into a memory associated with a processor.

Statement 220. An embodiment of the inventive concept includes the storage device according to statement 219, wherein the storage device includes a Solid State Drive (SSD).

Statement 221. An embodiment of the inventive concept includes the storage device according to statement 220, wherein the APM-F and APM-S communicate using the endpoint of the SSD regarding the application data to be used with the acceleration instruction.

Statement 222. An embodiment of the inventive concept includes the storage device according to statement 220, wherein the APM-F and the APM-S communicate using messages.

Statement 223. An embodiment of the inventive concept includes the storage device according to statement 220, wherein the storage device may receive from the processor a PCIe transaction to the SSD, the PCI transaction including a transaction layer packet (TLP) encoding a command using a Non-Volatile Memory Express (NVMe) protocol.

Statement 224. An embodiment of the inventive concept includes the storage device according to statement 220, wherein the SSD includes the acceleration module.

Statement 225. An embodiment of the inventive concept includes the storage device according to statement 220, wherein:
the SSD is operative to send an acceleration instruction associated with a downstream Filter Address Range (FAR) to the acceleration module, the first PCIe transaction intended for the APM-F; and
the SSD is operative to send a first PCIe transaction not associated with the downstream FAR to the acceleration module, the first PCIe transaction intended for the processor.

Statement 226. An embodiment of the inventive concept includes the storage device according to statement 225, wherein the acceleration instruction is generated by the APM-S.

Statement 227. An embodiment of the inventive concept includes the storage device according to statement 226, wherein the SSD further includes a host interface logic (HIL) to intercept a special command, the special command including the acceleration instruction, and to forward the special command to the APM-S to trigger the APM-S to generate the acceleration instruction.

Statement 228. An embodiment of the inventive concept includes the storage device according to statement 227, wherein the special command originates from an Acceleration Service Manager (ASM) running on the processor.

Statement 229. An embodiment of the inventive concept includes the storage device according to statement 225, wherein:
the SSD is operative to request a block of host system addresses from the processor; and
the controller is operative to select a subset of the block of host system addresses as the downstream FAR.

Statement 230. An embodiment of the inventive concept includes the storage device according to statement 229, wherein the controller is operative to program a downstream filter of the acceleration module with the downstream FAR.

Statement 231. An embodiment of the inventive concept includes the storage device according to statement 230, wherein the controller is operative to use a sideband bus to program the downstream filter of the acceleration module with the downstream FAR.

Statement 232. An embodiment of the inventive concept includes the storage device according to statement 231, wherein the sideband bus is drawn from a set including an Inter-Integrated Circuit ($I^2C$) bus and a System Management Bus (SMBus).

Statement 233. An embodiment of the inventive concept includes the storage device according to statement 230, wherein the controller is operative to use a PCIe Vendor Defined Message (VDM) to program the downstream filter of the acceleration module with the downstream FAR.

Statement 234. An embodiment of the inventive concept includes the storage device according to statement 229, wherein the controller is further operative to select a second subset of the block of host system addresses as an upstream FAR.

Statement 235. An embodiment of the inventive concept includes the storage device according to statement 234, wherein the controller is operative to store information regarding the upstream FAR in a special register accessible by an ASM running on the processor.

Statement 236. An embodiment of the inventive concept includes the storage device according to statement 235, wherein the special register is within the block of host system addresses.

Statement 237. An embodiment of the inventive concept includes the storage device according to statement 229, wherein the controller is operative to program an upstream filter of the acceleration module with the upstream FAR.

Statement 238. An embodiment of the inventive concept includes the storage device according to statement 237, wherein the controller is operative to use a sideband bus to program the upstream filter of the acceleration module with the upstream FAR.

Statement 239. An embodiment of the inventive concept includes the storage device according to statement 238, wherein the sideband bus is drawn from a set including an Inter-Integrated Circuit (I²C) bus and a System Management Bus (SMBus).

Statement 240. An embodiment of the inventive concept includes the storage device according to statement 237, wherein the controller is operative to use a PCIe Vendor Defined Message (VDM) to program the upstream filter of the acceleration module with the upstream FAR.

Statement 241. An embodiment of the inventive concept includes the storage device according to statement 225, wherein the SSD is operative to receive a result from the APM-F via the endpoint of the SSD and to forward the result to the processor via the endpoint of the SSD.

Statement 242. An embodiment of the inventive concept includes the storage device according to statement 225, wherein the SSD includes a physical function (PF) and a virtual function (VF), the PF operative to expose the SSD and the VF operative to expose the acceleration module.

Statement 243. An embodiment of the inventive concept includes the storage device according to statement 242, wherein:
the PF is operative to request a first block of host system addresses from the processor;
the controller is operative to select a first subset of the block of host system addresses as the downstream FAR.

Statement 244. An embodiment of the inventive concept includes the storage device according to statement 243, wherein the controller is operative to program a downstream filter of the acceleration module with the downstream FAR.

Statement 245. An embodiment of the inventive concept includes the storage device according to statement 244, wherein the controller is operative to use a sideband bus to program the downstream filter of the acceleration module with the downstream FAR.

Statement 246. An embodiment of the inventive concept includes the storage device according to statement 245, wherein the sideband bus is drawn from a set including an I²C bus and an SMBus.

Statement 247. An embodiment of the inventive concept includes the storage device according to statement 244, wherein the controller is operative to use a PCIe VDM to program the downstream filter of the acceleration module with the downstream FAR.

Statement 248. An embodiment of the inventive concept includes the storage device according to statement 242, wherein the VF is operative to request a second block of host system addresses from the processor as an upstream FAR.

Statement 249. An embodiment of the inventive concept includes the storage device according to statement 248, wherein the controller is operative to program an upstream filter of the acceleration module with the upstream FAR.

Statement 250. An embodiment of the inventive concept includes the storage device according to statement 249, wherein the controller is operative to use a sideband bus to program the upstream filter of the acceleration module with the upstream FAR.

Statement 251. An embodiment of the inventive concept includes the storage device according to statement 250, wherein the sideband bus is drawn from a set including an I²C bus and an SMBus.

Statement 252. An embodiment of the inventive concept includes the storage device according to statement 249, wherein the controller is operative to use a PCIe VDM to program the upstream filter of the acceleration module with the upstream FAR.

Statement 253. An embodiment of the inventive concept includes the storage device according to statement 242, wherein the controller is operative to program an upstream filter of the acceleration module with an identifier of the VF.

Statement 254. An embodiment of the inventive concept includes the storage device according to statement 253, wherein the controller is operative to use a sideband bus to program the upstream filter of the acceleration module with the identifier of the VF.

Statement 255. An embodiment of the inventive concept includes the storage device according to statement 254, wherein the sideband bus is drawn from a set including an I²C bus and an SMBus.

Statement 256. An embodiment of the inventive concept includes the storage device according to statement 253, wherein the controller is operative to use a PCIe VDM to program the upstream filter of the acceleration module with the identifier of the VF.

Statement 257. An embodiment of the inventive concept includes the storage device according to statement 242, wherein the controller is operative to receive a result from the APM-F via the endpoint of the SSD and to forward the result to the processor via the endpoint of the SSD.

Statement 258. An embodiment of the inventive concept includes the storage device according to statement 225, wherein the SSD includes a first PF and a second PF, the first PF operative to expose the SSD and the second PF operative to expose the acceleration module.

Statement 259. An embodiment of the inventive concept includes the storage device according to statement 258, wherein:
the first PF is operative to request a first block of host system addresses from the processor;
the controller is operative to select a first subset of the block of host system addresses as the downstream FAR.

Statement 260. An embodiment of the inventive concept includes the storage device according to statement 259, wherein the controller is operative to program a downstream filter of the acceleration module with the downstream FAR.

Statement 261. An embodiment of the inventive concept includes the storage device according to statement 260, wherein the controller is operative to use a sideband bus to program the downstream filter of the acceleration module with the downstream FAR.

Statement 262. An embodiment of the inventive concept includes the storage device according to statement 261, wherein the sideband bus is drawn from a set including an I²C bus and an SMBus.

Statement 263. An embodiment of the inventive concept includes the storage device according to statement 260, wherein the controller is operative to use a PCIe VDM to program the downstream filter of the acceleration module with the downstream FAR.

Statement 264. An embodiment of the inventive concept includes the storage device according to statement 258, wherein the second PF is operative to request a second block of host system addresses from the processor as an upstream FAR.

Statement 265. An embodiment of the inventive concept includes the storage device according to statement 264, wherein the controller is operative to program an upstream filter of the acceleration module with the upstream FAR.

Statement 266. An embodiment of the inventive concept includes the storage device according to statement 265, wherein the controller is operative to use a sideband bus to program the upstream filter of the acceleration module with the upstream FAR.

Statement 267. An embodiment of the inventive concept includes the storage device according to statement 266, wherein the sideband bus is drawn from a set including an I²C bus and an SMBus.

Statement 268. An embodiment of the inventive concept includes the storage device according to statement 265, wherein the controller is operative to use a PCIe VDM to program the upstream filter of the acceleration module with the upstream FAR.

Statement 269. An embodiment of the inventive concept includes the storage device according to statement 258, wherein the controller is operative to program an upstream filter of the acceleration module with an identifier of the second PF.

Statement 270. An embodiment of the inventive concept includes the storage device according to statement 269, wherein the controller is operative to use a sideband bus to program the upstream filter of the acceleration module with the identifier of the second PF.

Statement 271. An embodiment of the inventive concept includes the storage device according to statement 270, wherein the sideband bus is drawn from a set including an I²C bus and an SMBus.

Statement 272. An embodiment of the inventive concept includes the storage device according to statement 269, wherein the controller is operative to use a PCIe VDM to program the upstream filter of the acceleration module with the identifier of the second PF.

Statement 273. An embodiment of the inventive concept includes the storage device according to statement 258, wherein the controller is operative to receive a result from the APM-F via the endpoint of the SSD and to forward the result to the processor via the endpoint of the SSD.

Statement 274. An embodiment of the inventive concept includes the storage device according to statement 225, wherein:

the SSD is operative to request a block of acceleration module addresses from the acceleration module; and the controller is operative to select a subset of the block of acceleration module addresses as the downstream FAR.

Statement 275. An embodiment of the inventive concept includes the storage device according to statement 274, wherein the controller is operative to program a downstream filter of the acceleration module with the downstream FAR.

Statement 276. An embodiment of the inventive concept includes the storage device according to statement 275, wherein the controller is operative to use a sideband bus to program the downstream filter of the acceleration module with the downstream FAR.

Statement 277. An embodiment of the inventive concept includes the storage device according to statement 276, wherein the sideband bus is drawn from a set including an Inter-Integrated Circuit (I²C) bus and a System Management Bus (SMBus).

Statement 278. An embodiment of the inventive concept includes the storage device according to statement 275, wherein the controller is operative to use a PCIe Vendor Defined Message (VDM) to program the downstream filter of the acceleration module with the downstream FAR.

Statement 279. An embodiment of the inventive concept includes the storage device according to statement 220, further comprising a second endpoint of the SSD for communicating with the acceleration module, wherein the endpoint of the SSD is used for exchanging communications with the processor and the second endpoint of the SSD is used for exchanging communications with the APM-F.

Statement 280. An embodiment of the inventive concept includes a method, comprising:

receiving a Peripheral Component Interconnect Exchange (PCIe) transaction from a first device at an acceleration module;

determining at the acceleration module whether the PCIe transaction is an acceleration instruction;

based at least in part on determining that the PCIe transaction is the acceleration instruction, processing the PCIe transaction at an acceleration platform manager (APM-F) of the acceleration module; and based at least in part on determining that the PCIe transaction is not the acceleration instruction, delivering the PCIe transaction to a second device, wherein the acceleration module supports performing the acceleration instruction on application data on a storage device for an application program without loading the application data into a memory associated with a processor, and wherein the processor, the acceleration module, and the storage device communicate using a PCIe bus.

Statement 281. An embodiment of the inventive concept includes the method according to statement 280, wherein the acceleration module is implemented using a Field Programmable Gate Array.

Statement 282. An embodiment of the inventive concept includes the method according to statement 281, wherein:

receiving a Peripheral Component Interconnect Exchange (PCIe) transaction from a first device at an FPGA includes receiving a second PCIe transaction from the storage device at a downstream port of the FPGA;

determining at the acceleration module whether the PCIe transaction is an acceleration instruction includes determining at the FPGA whether the second PCIe transaction is associated with an address in a downstream Filter Address Range (FAR) associated with the downstream port of the FPGA; and delivering the PCIe transaction to a second device includes delivering the second PCIe transaction to the processor using an upstream port of the FPGA.

Statement 283. An embodiment of the inventive concept includes the method according to statement 282, further comprising:

receiving a first PCIe transaction from the processor at the upstream port of the FPGA; and delivering the first PCIe transaction to the storage device using the downstream processor of the FPGA.

Statement 284. An embodiment of the inventive concept includes the method according to statement 282, further comprising:

receiving the downstream FAR at the FPGA from the storage device; and associating the downstream FAR with the downstream port of the FPGA.

Statement 285. An embodiment of the inventive concept includes the method according to statement 284, wherein receiving the downstream FAR at the FPGA from the storage device includes receiving the downstream FAR at the FPGA from the storage device over a sideband bus, the sideband bus drawn from a set including an Inter-Integrated Circuit (I²C) bus and a System Management Bus (SMBus).

Statement 286. An embodiment of the inventive concept includes the method according to statement 284, wherein receiving the downstream FAR at the FPGA from the storage device includes receiving a PCIe Vendor Defined Message (VDM) from the storage device, the PCIe VDM including the downstream FAR.

Statement 287. An embodiment of the inventive concept includes the method according to statement 282, further comprising sending a result of the second PCIe transaction to the storage device using the downstream port of the FPGA.

Statement 288. An embodiment of the inventive concept includes the method according to statement 282, further comprising sending a result of the second PCIe transaction to the processor using the upstream port of the FPGA.

Statement 289. An embodiment of the inventive concept includes the method according to statement 282, further comprising:

receiving a first PCIe transaction from the processor at the upstream port of the FPGA;

determining whether the first PCIe transaction is a second acceleration instruction by determining whether the first PCIe transaction is associated with a second address in an upstream FAR associated with the upstream port of the FPGA; and based at least in part on determining that the first PCIe transaction is the second acceleration instruction, processing the first PCIe transaction at the APM-F of the FPGA; and based at least in part on determining that the first PCIe transaction is not the second acceleration instruction, delivering the first PCIe transaction to the storage device using the downstream port of the FPGA.

Statement 290. An embodiment of the inventive concept includes the method according to statement 289, wherein the second acceleration instruction originates from an Acceleration Service Manager (ASM) running on the processor.

Statement 291. An embodiment of the inventive concept includes the method according to statement 289, further comprising:

receiving the upstream FAR at the FPGA from the storage device; and associating the upstream FAR with the upstream port of the FPGA.

Statement 292. An embodiment of the inventive concept includes the method according to statement 291, wherein receiving the upstream FAR at the FPGA from the storage device includes receiving the upstream FAR at the FPGA from the storage device over a sideband bus, the sideband bus drawn from a set including an $I^2C$ bus and an SMBus.

Statement 293. An embodiment of the inventive concept includes the method according to statement 291, wherein receiving the upstream FAR at the FPGA from the storage device includes receiving a PCIe Vendor Defined Message (VDM) from the storage device, the PCIe VDM including the upstream FAR.

Statement 294. An embodiment of the inventive concept includes the method according to statement 289, further comprising sending a result of the first PCIe transaction to the storage device using the upstream port of the FPGA.

Statement 295. An embodiment of the inventive concept includes the method according to statement 289, further comprising sending a result of the first PCIe transaction to the processor using the upstream port of the FPGA.

Statement 296. An embodiment of the inventive concept includes the method according to statement 282, further comprising:

receiving a first PCIe transaction from the processor at the upstream port of the FPGA;

determining whether the first PCIe transaction is a second acceleration instruction by determining whether the first PCIe transaction is associated with a virtual function (VF) exposed by the storage device; and based at least in part on determining that the first PCIe transaction is the second acceleration instruction, processing the first PCIe transaction at the APM-F of the FPGA; and based at least in part on determining that the first PCIe transaction is not the second acceleration instruction, delivering the first PCIe transaction to the storage device using the downstream port of the FPGA.

Statement 297. An embodiment of the inventive concept includes the method according to statement 296, wherein the second acceleration instruction originates from an Acceleration Service Manager (ASM) running on the processor.

Statement 298. An embodiment of the inventive concept includes the method according to statement 296, wherein determining whether the first PCIe transaction is a second acceleration instruction includes determining whether the first PCIe transaction includes a tag with an identifier of the VF.

Statement 299. An embodiment of the inventive concept includes the method according to statement 298, further comprising:

receiving the identifier of the VF at the FPGA from the storage device; and associating the identifier of the VF with the upstream port of the FPGA.

Statement 300. An embodiment of the inventive concept includes the method according to statement 299, wherein receiving the identifier of the VF at the FPGA from the storage device includes receiving the identifier of the VF at the FPGA from the storage device over a sideband bus, the sideband bus drawn from a set including an $I^2C$ bus and an SMBus.

Statement 301. An embodiment of the inventive concept includes the method according to statement 299, wherein receiving the identifier of the VF at the FPGA from the storage device includes receiving a PCIe Vendor Defined Message (VDM) from the storage device, the PCIe VDM including the identifier of the VF.

Statement 302. An embodiment of the inventive concept includes the method according to statement 296, further comprising sending a result of the first PCIe transaction to the processor using the upstream port of the FPGA.

Statement 303. An embodiment of the inventive concept includes the method according to statement 282, further comprising:

receiving a first PCIe transaction from the processor at the upstream port of the FPGA;

determining whether the first PCIe transaction is a second acceleration instruction by determining whether the first PCIe transaction is associated with a physical function (PF) exposed by the storage device; and based at least in part on determining that the first PCIe transaction is the second acceleration instruction, processing the first PCIe transaction at the APM-F of the FPGA; and based at least in part on determining that the first PCIe transaction is not the second acceleration instruction, delivering the first PCIe transaction to the storage device using the downstream port of the FPGA.

Statement 304. An embodiment of the inventive concept includes the method according to statement 303, wherein the second acceleration instruction originates from an Acceleration Service Manager (ASM) running on the processor.

Statement 305. An embodiment of the inventive concept includes the method according to statement 303, wherein determining whether the first PCIe transaction is a second acceleration instruction includes determining whether the first PCIe transaction includes a tag with an identifier of the PF.

Statement 306. An embodiment of the inventive concept includes the method according to statement 305, further comprising:

receiving the identifier of the PF at the FPGA from the storage device; and associating the identifier of the PF with the upstream port of the FPGA.

Statement 307. An embodiment of the inventive concept includes the method according to statement 306, wherein receiving the identifier of the PF at the FPGA from the storage device includes receiving the identifier of the PF at the FPGA from the storage device over a sideband bus, the sideband bus drawn from a set including an I$^2$C bus and an SMBus.

Statement 308. An embodiment of the inventive concept includes the method according to statement 306, wherein receiving the identifier of the PF at the FPGA from the storage device includes receiving a PCIe Vendor Defined Message (VDM) from the storage device, the PCIe VDM including the identifier of the PF.

Statement 309. An embodiment of the inventive concept includes the method according to statement 303, further comprising sending a result of the first PCIe transaction to the storage device using the downstream port of the FPGA.

Statement 310. An embodiment of the inventive concept includes the method according to statement 303, further comprising sending a result of the first PCIe transaction to the processor using the upstream port of the FPGA.

Statement 311. An embodiment of the inventive concept includes the method according to statement 281, wherein:

receiving a Peripheral Component Interconnect Exchange (PCIe) transaction from a first device at an FPGA includes receiving a first PCIe transaction from the processor at an endpoint of the FPGA;

determining at the acceleration module whether the PCIe transaction is an acceleration instruction includes determining whether the first PCIe transaction includes a tag with a first identifier of a first PF of the FPGA or a second identifier of a second PF of the FPGA; and delivering the PCIe transaction to a second device includes delivering the first PCIe transaction to the storage device using a root port of the FPGA.

Statement 312. An embodiment of the inventive concept includes the method according to statement 311, further comprising:

receiving a second PCIe transaction from the storage device at the root port of the FPGA;

determining whether the second PCIe transaction is a second acceleration instruction by determining at the FPGA whether the second PCIe transaction is associated with an address in a downstream FAR associated with the root port of the FPGA;

based at least in part on determining that the second PCIe transaction is the second acceleration instruction, processing the first PCIe transaction at the APM-F of the FPGA; and based at least in part on determining that the second PCIe transaction is not the second acceleration instruction, delivering the second PCIe transaction to the processor using the endpoint of the FPGA.

Statement 313. An embodiment of the inventive concept includes the method according to statement 312, further comprising:

receiving the downstream FAR at the FPGA from the storage device; and associating the downstream FAR with the root port of the FPGA.

Statement 314. An embodiment of the inventive concept includes the method according to statement 313, wherein receiving the downstream FAR at the FPGA from the storage device includes receiving the downstream FAR at the FPGA from the storage device over a sideband bus, the sideband bus drawn from a set including an I$^2$C bus and an SMBus.

Statement 315. An embodiment of the inventive concept includes the method according to statement 313, wherein receiving the downstream FAR at the FPGA from the storage device includes receiving a PCIe Vendor Defined Message (VDM) from the storage device, the PCIe VDM including the downstream FAR.

Statement 316. An embodiment of the inventive concept includes the method according to statement 311, wherein the second acceleration instruction originates from an Acceleration Service Manager (ASM) running on the processor.

Statement 317. An embodiment of the inventive concept includes the method according to statement 311, further comprising sending a result of the first PCIe transaction to the processor using the endpoint of the FPGA.

Statement 318. An embodiment of the inventive concept includes the method according to statement 311, further comprising:

determining a configuration of an endpoint of the storage device using a configuration monitor of the FPGA, the endpoint of the storage device in communication with the root port of the FPGA; and replicating the configuration of the endpoint on the storage device using the endpoint of the FPGA.

Statement 319. An embodiment of the inventive concept includes the method according to statement 281, wherein:

receiving a Peripheral Component Interconnect Exchange (PCIe) transaction from a first device at an FPGA includes receiving a first PCIe transaction from the processor at an endpoint of the FPGA;

determining at the acceleration module whether the PCIe transaction is an acceleration instruction includes determining whether the first PCIe transaction includes a tag with an identifier of a first PF of the FPGA or a second identifier of a second PF of the FPGA; and delivering the PCIe transaction to a second device includes delivering the first PCIe transaction to the storage device using a first root port of the FPGA.

Statement 320. An embodiment of the inventive concept includes the method according to statement 319, further comprising:

receiving a second PCIe transaction from the storage device at the FPGA;

determining whether the second PCIe transaction was received at a first root port of the FPGA or a second root port of the FPGA;

based at least in part on determining that the second PCIe transaction was received at the first root port of the FPGA, delivering the second PCIe transaction to the processor using the endpoint; and based at least in part on determining that the second PCIe transaction was received at the second root port of the FPGA, processing the second PCIe transaction at the APM-F of the FPGA.

Statement 321. An embodiment of the inventive concept includes the method according to statement 319, wherein the second acceleration instruction originates from an Acceleration Service Manager (ASM) running on the processor.

Statement 322. An embodiment of the inventive concept includes the method according to statement 319, further comprising sending a result of the first PCIe transaction to the processor using the endpoint of the FPGA.

Statement 323. An embodiment of the inventive concept includes the method according to statement 319, further comprising:

determining a configuration of an endpoint of the storage device using a configuration monitor of the FPGA, the endpoint of the storage device in communication with the first root port of the FPGA; and replicating the configuration of the endpoint on the storage device using the endpoint of the FPGA.

Statement 324. An embodiment of the inventive concept includes the method according to statement 281, wherein:

receiving a Peripheral Component Interconnect Exchange (PCIe) transaction from a first device at an FPGA includes receiving a first PCIe transaction from the processor at the FPGA;

determining at the FPGA whether the first PCIe transaction is an acceleration instruction includes determining whether the first PCIe transaction is a second acceleration instruction by determining whether the first PCIe transaction was received from the processor at a first endpoint of the FPGA, the FPGA including the first endpoint and a second endpoint; and delivering the PCIe transaction to a second device includes delivering the first PCIe transaction to the storage device using a first root port of the FPGA, the FPGA including the first root port and a second root port.

Statement 325. An embodiment of the inventive concept includes the method according to statement 324, further comprising:

receiving a second PCIe transaction from the storage device at the FPGA;

determining whether the second PCIe transaction is the acceleration instruction by determining whether the second PCIe transaction was received at the first root port of the FPGA or the second root port of the FPGA;

based at least in part on determining that the second PCIe transaction was received at the first root port of the FPGA, delivering the second PCIe transaction to the processor using the first endpoint; and based at least in part on determining that the second PCIe transaction was received at the second root port of the FPGA, processing the second PCIe transaction at the APM-F of the FPGA.

Statement 326. An embodiment of the inventive concept includes the method according to statement 324, wherein the second PCIe transaction originates from an Acceleration Service Manager (ASM) running on the processor.

Statement 327. An embodiment of the inventive concept includes the method according to statement 324, further comprising sending a result of the first PCIe transaction to the processor using the second endpoint of the FPGA.

Statement 328. An embodiment of the inventive concept includes the method according to statement 324, further comprising:

determining a configuration of an endpoint of the storage device using a configuration monitor of the FPGA, the endpoint of the storage device in communication with the first root port of the FPGA; and replicating the configuration of the endpoint on the storage device using the first endpoint of the FPGA.

Statement 329. An embodiment of the inventive concept includes the method according to statement 281, wherein:

receiving a Peripheral Component Interconnect Exchange (PCIe) transaction from a first device at an FPGA includes receiving a first PCIe transaction from the processor at the FPGA;

determining at the acceleration module whether the first PCIe transaction is an acceleration instruction includes determining whether the first PCIe transaction is a second acceleration instruction by determining whether the first PCIe transaction was received from the processor at a first endpoint of the FPGA, the FPGA including the first endpoint and a second endpoint; and delivering the PCIe transaction to a second device includes delivering the first PCIe transaction to the storage device using a root port of the FPGA.

Statement 330. An embodiment of the inventive concept includes the method according to statement 329, further comprising:

receiving a second PCIe transaction from the storage device at the root port of the FPGA;

determining whether the second PCIe transaction is the acceleration instruction by determining at the FPGA whether the second PCIe transaction is associated with an address in a downstream FAR associated with the root port of the FPGA; and based at least in part on determining that the second PCIe transaction is the acceleration instruction, processing the second PCIe transaction at the APM-F of the FPGA; and based at least in part on determining that the second PCIe transaction is not the acceleration instruction, delivering the second PCIe transaction to the processor using the first endpoint of the FPGA.

Statement 331. An embodiment of the inventive concept includes the method according to statement 330, further comprising:

receiving the downstream FAR at the FPGA from the storage device; and associating the downstream FAR with the root port of the FPGA.

Statement 332. An embodiment of the inventive concept includes the method according to statement 331, wherein receiving the downstream FAR at the FPGA from the storage device includes receiving the downstream FAR at the FPGA from the storage device over a sideband bus, the sideband bus drawn from a set including an $I^2C$ bus and an SMBus.

Statement 333. An embodiment of the inventive concept includes the method according to statement 331, wherein receiving the downstream FAR at the FPGA from the storage device includes receiving a PCIe Vendor Defined Message (VDM) from the storage device, the PCIe VDM including the downstream FAR.

Statement 334. An embodiment of the inventive concept includes the method according to statement 329, wherein the first PCIe transaction originates from an Acceleration Service Manager (ASM) running on the processor.

Statement 335. An embodiment of the inventive concept includes the method according to statement 329, further comprising sending a result of the first PCIe transaction to the processor using the second endpoint of the FPGA.

Statement 336. An embodiment of the inventive concept includes the method according to statement 329, further comprising:

determining a configuration of an endpoint of the storage device using a configuration monitor of the FPGA, the endpoint of the storage device in communication with the root port of the FPGA; and replicating the configuration of the endpoint on the storage device using the first endpoint of the FPGA.

Statement 337. An embodiment of the inventive concept includes a method, comprising:

receiving a Peripheral Component Interconnect Exchange (PCIe) transaction from a processor at a first bridging component;

determining at the first bridging component whether the PCIe transaction is an acceleration instruction;

based at least in part on determining that the PCIe transaction is the acceleration instruction, forwarding the PCIe transaction to an acceleration module; and based at least in part on determining that the PCIe transaction is not the acceleration instruction, forwarding the PCIe transaction to a storage device, wherein the processor, the first bridging component, the acceleration module, and the storage device communicate using a PCIe bus.

Statement 338. An embodiment of the inventive concept includes the method according to statement 337, wherein:

the acceleration module is implemented using a Field Programmable Gate Array; and the storage device includes a Solid State Drive (SSD).

Statement 339. An embodiment of the inventive concept includes the method according to statement 337, wherein determining at the first bridging component whether the PCIe transaction is an acceleration instruction includes determining whether the PCIe transaction is associated with an address in an upstream FAR associated with an upstream port of the first bridging component.

Statement 340. An embodiment of the inventive concept includes the method according to statement 339, further comprising:

receiving the upstream FAR at the first bridging component from the storage device; and associating the upstream FAR with the upstream port of the first bridging component.

Statement 341. An embodiment of the inventive concept includes the method according to statement 340, wherein receiving the upstream FAR at the first bridging component from the storage device includes receiving the upstream FAR at the first bridging component from the storage device over a sideband bus, the sideband bus drawn from a set including an I$^2$C bus and an SMBus.

Statement 342. An embodiment of the inventive concept includes the method according to statement 340, wherein receiving the upstream FAR at the first bridging component from the storage device includes receiving a PCIe Vendor Defined Message (VDM) from the storage device, the PCIe VDM including the upstream FAR.

Statement 343. An embodiment of the inventive concept includes the method according to statement 337, wherein determining at the first bridging component whether the PCIe transaction is an acceleration instruction includes determining whether the PCIe transaction is associated with a virtual function (VF) exposed by the storage device.

Statement 344. An embodiment of the inventive concept includes the method according to statement 343, wherein determining whether the PCIe transaction is associated with a virtual function (VF) exposed by the storage device includes determining whether the PCIe transaction includes a tag with an identifier of the VF.

Statement 345. An embodiment of the inventive concept includes the method according to statement 344, further comprising:

receiving the identifier of the VF at the first bridging component from the storage device; and associating the identifier of the VF with the upstream port of the first bridging component.

Statement 346. An embodiment of the inventive concept includes the method according to statement 345, wherein receiving the identifier of the VF at the first bridging component from the storage device includes receiving the identifier of the VF at the first bridging component from the storage device over a sideband bus, the sideband bus drawn from a set including an I$^2$C bus and an SMBus.

Statement 347. An embodiment of the inventive concept includes the method according to statement 345, wherein receiving the identifier of the VF at the first bridging component from the storage device includes receiving a PCIe Vendor Defined Message (VDM) from the storage device, the PCIe VDM including the identifier of the VF.

Statement 348. An embodiment of the inventive concept includes the method according to statement 337, wherein determining at the first bridging component whether the PCIe transaction is an acceleration instruction includes determining whether the PCIe transaction is associated with a physical function (PF) exposed by the storage device.

Statement 349. An embodiment of the inventive concept includes the method according to statement 348, wherein determining whether the PCIe transaction is associated with a physical function (PF) exposed by the storage device includes determining whether the PCIe transaction includes a tag with an identifier of the PF.

Statement 350. An embodiment of the inventive concept includes the method according to statement 349, further comprising:

receiving the identifier of the PF at the first bridging component from the storage device; and associating the identifier of the PF with the upstream port of the first bridging component.

Statement 351. An embodiment of the inventive concept includes the method according to statement 350, wherein receiving the identifier of the PF at the first bridging component from the storage device includes receiving the identifier of the PF at the first bridging component from the storage device over a sideband bus, the sideband bus drawn from a set including an I$^2$C bus and an SMBus.

Statement 352. An embodiment of the inventive concept includes the method according to statement 350, wherein receiving the identifier of the PF at the first bridging component from the storage device includes receiving a PCIe Vendor Defined Message (VDM) from the storage device, the PCIe VDM including the identifier of the PF.

Statement 353. An embodiment of the inventive concept includes the method according to statement 337, wherein determining at the first bridging component whether the PCIe transaction is an acceleration instruction includes determining whether the PCIe transaction includes a tag with an identifier of a first PF of the first bridging component or a second identifier of a second PF of the first bridging component.

Statement 354. An embodiment of the inventive concept includes the method according to statement 353, further comprising:

determining a configuration of an endpoint of the storage device using a configuration monitor of the first bridging component; and replicating the configuration of the endpoint on the storage device using an endpoint of the first bridging component.

Statement 355. An embodiment of the inventive concept includes the method according to statement 337, wherein determining at the first bridging component whether the PCIe transaction is an acceleration instruction includes determining whether the PCIe transaction was received from the processor at a first endpoint of the first bridging component, the first bridging component including the first endpoint and a second endpoint.

Statement 356. An embodiment of the inventive concept includes the method according to statement 355, further comprising:

determining a configuration of an endpoint of the storage device using a configuration monitor of the first bridging component; and replicating the configuration of the endpoint on the storage device using the first endpoint of the first bridging component.

Statement 357. An embodiment of the inventive concept includes a method, comprising:

receiving a Peripheral Component Interconnect Exchange (PCIe) transaction from a storage device at a second bridging component;

determining at the second bridging component whether the PCIe transaction is an acceleration instruction;

based at least in part on determining that the PCIe transaction is the acceleration instruction, forwarding the PCIe transaction to an acceleration module; and based at least in part on determining that the PCIe transaction is not the acceleration instruction, forwarding the PCIe transaction to a processor, wherein the processor, the second bridging component, the acceleration module, and the storage device communicate using a PCIe bus.

Statement 358. An embodiment of the inventive concept includes the method according to statement 357, wherein:

the acceleration module is implemented using a Field Programmable Gate Array; and the storage device includes a Solid State Drive (SSD).

Statement 359. An embodiment of the inventive concept includes the method according to statement 357, wherein determining at the second bridging component whether the PCIe transaction is an acceleration instruction includes determining at the second bridging component whether the second PCIe transaction is associated with an address in a downstream Filter Address Range (FAR) associated with a downstream port of the second bridging component.

Statement 360. An embodiment of the inventive concept includes the method according to statement 359, further comprising:

receiving the downstream FAR at the second bridging component from the storage device; and associating the downstream FAR with the downstream port of the second bridging component.

Statement 361. An embodiment of the inventive concept includes the method according to statement 360, wherein receiving the downstream FAR at the second bridging component from the storage device includes receiving the downstream FAR at the second bridging component from the storage device over a sideband bus, the sideband bus drawn from a set including an Inter-Integrated Circuit (I²C) bus and a System Management Bus (SMBus).

Statement 362. An embodiment of the inventive concept includes the method according to statement 360, wherein receiving the downstream FAR at the second bridging component from the storage device includes receiving a PCIe Vendor Defined Message (VDM) from the storage device, the PCIe VDM including the downstream FAR.

Statement 363. An embodiment of the inventive concept includes the method according to statement 357, wherein determining at the second bridging component whether the PCIe transaction is an acceleration instruction includes determining whether the PCIe transaction was received at a second root port of the second bridging component, the second bridging component including a first root port and the second root port.

Statement 364. An embodiment of the inventive concept includes a method, comprising:

receiving a first PCIe transaction from an acceleration module at a storage device;

determining whether the first PCIe transaction is an acceleration instruction;

based at least in part on determining that the first PCIe transaction is the acceleration instruction:

generating a second PCIe transaction using a storage device Acceleration Platform Manager (APM-S) of the storage device; and sending the second PCIe transaction from the storage device to the acceleration module; and based at least in part on determining that the first PCIe transaction is not the acceleration instruction, executing the first PCIe transaction on data stored on the storage device, wherein a processor, the acceleration module, and the storage device communicate using a Peripheral Component Interconnect Exchange (PCIe) bus, and wherein the acceleration module supports performing the acceleration instruction on the application data on the storage device for an application program running on the processor without loading the application data into a memory associated with the processor.

Statement 365. An embodiment of the inventive concept includes the method according to statement 364, wherein the storage device is a Solid State Drive (SSD).

Statement 366. An embodiment of the inventive concept includes the method according to statement 365, wherein:

receiving a first PCIe transaction from an acceleration module of a storage device includes receiving the first PCIe transaction from the acceleration module at an endpoint of the SSD;

determining whether the first PCIe transaction is an acceleration instruction includes determining whether the first PCIe transaction includes a special command from the processor or originates from the APM-F of the acceleration module;

generating a second PCIe transaction using a storage device Acceleration Platform Manager (APM-S) of the storage device includes generating the second PCIe transaction by the APM-S of the SSD responsive to the first PCIe transaction; and sending the second PCIe transaction from the storage device to the acceleration module includes sending the second PCIe transaction from the endpoint of the SSD to the acceleration module.

Statement 367. An embodiment of the inventive concept includes the method according to statement 366, wherein the first PCIe transaction originates from the processor and includes a special command.

Statement 368. An embodiment of the inventive concept includes the method according to statement 366, wherein determining whether the first PCIe transaction includes a special command from the processor includes determining whether the first PCIe transaction includes a special command from the processor by a host interface logic (HIL) of the SSD.

Statement 369. An embodiment of the inventive concept includes the method according to statement 368, wherein the special command originates from an Acceleration Service Manager (ASM) running on the processor.

Statement 370. An embodiment of the inventive concept includes the method according to statement 366, further comprising:

requesting a block of host system addresses from the processor;

selecting a subset of the block of host system addresses as a downstream Filter Address Range (FAR); and programming a downstream port of the acceleration module with the downstream FAR.

Statement 371. An embodiment of the inventive concept includes the method according to statement 370, wherein programming a downstream port of the acceleration module with the downstream FAR includes programming the downstream port of the acceleration module with the downstream FAR over a sideband bus, the sideband bus drawn from a set including an Inter-Integrated Circuit ($I^2C$) bus and a System Management Bus (SMBus).

Statement 372. An embodiment of the inventive concept includes the method according to statement 370, wherein programming a downstream port of the acceleration module with the downstream FAR includes programming the downstream port of the acceleration module with the downstream FAR using a PCIe Vendor Defined Message (VDM), the PCIe VDM including the downstream FAR.

Statement 373. An embodiment of the inventive concept includes the method according to statement 370, further comprising:

selecting a second subset of the block of host system addresses as a upstream FAR; and programming an upstream port of the acceleration module with the upstream FAR.

Statement 374. An embodiment of the inventive concept includes the method according to statement 373, wherein programming an upstream port of the acceleration module with the upstream FAR includes programming the upstream port of the acceleration module with the upstream FAR over a sideband bus, the sideband bus drawn from a set including an $I^2C$ bus and an SMBus.

Statement 375. An embodiment of the inventive concept includes the method according to statement 373, wherein programming an upstream port of the acceleration module with the upstream FAR includes programming the upstream port of the acceleration module with the upstream FAR using a PCIe Vendor Defined Message (VDM), the PCIe VDM including the upstream FAR.

Statement 376. An embodiment of the inventive concept includes the method according to statement 366, further comprising:

requesting a block of host system addresses from the processor;

selecting a subset of the block of host system addresses as a downstream FAR; and programming a root port of the acceleration module with the downstream FAR.

Statement 377. An embodiment of the inventive concept includes the method according to statement 376, wherein programming a root port of the acceleration module with the downstream FAR includes programming the root port of the acceleration module with the downstream FAR over a sideband bus, the sideband bus drawn from a set including an $I^2C$ bus and an SMBus.

Statement 378. An embodiment of the inventive concept includes the method according to statement 376, wherein programming a root port of the acceleration module with the downstream FAR includes programming the root port of the acceleration module with the downstream FAR using a PCIe Vendor Defined Message (VDM), the PCIe VDM including the downstream FAR.

Statement 379. An embodiment of the inventive concept includes the method according to statement 366, further comprising:

receiving a result of the first PCIe transaction from the acceleration module at the endpoint of the SSD; and forwarding the result of the first PCIe transaction to the processor using the endpoint of the SSD.

Statement 380. An embodiment of the inventive concept includes the method according to statement 366, further comprising:

offering a physical function (PF) exposing the SSD; and offering a virtual function (VF) exposing the acceleration module.

Statement 381. An embodiment of the inventive concept includes the method according to statement 380, further comprising programming an upstream port of the acceleration module with an identifier of the VF.

Statement 382. An embodiment of the inventive concept includes the method according to statement 366, further comprising:

offering a first PF exposing the SSD; and offering a second PF exposing the acceleration module.

Statement 383. An embodiment of the inventive concept includes the method according to statement 382, further comprising programming an upstream port of the acceleration module with an identifier of the second PF.

Statement 384. An embodiment of the inventive concept includes the method according to statement 365, wherein:

receiving a first PCIe transaction from an acceleration module of a storage device includes receiving the first PCIe transaction from the acceleration module at an endpoint of the SSD;

determining whether the first PCIe transaction is an acceleration instruction includes determining whether the first PCIe transaction was received by the SSD at a second endpoint, the SSD including the second endpoint and a first endpoint;

generating a second PCIe transaction using a storage device Acceleration Platform Manager (APM-S) of the storage device includes generating the second PCIe transaction by the APM-S of the SSD responsive to the first PCIe transaction; and sending the second PCIe transaction from the storage device to the acceleration module includes sending the second PCIe transaction from the second endpoint of the SSD to the acceleration module.

Statement 385. An embodiment of the inventive concept includes an article, comprising a non-transitory storage medium, the non-transitory storage medium having stored thereon instructions that, when executed by a machine, result in:

receiving a Peripheral Component Interconnect Exchange (PCIe) transaction from a first device at an acceleration module;

determining at the acceleration module whether the PCIe transaction is an acceleration instruction;

based at least in part on determining that the PCIe transaction is the acceleration instruction, processing the PCIe transaction at an acceleration platform manager (APM-F) of the acceleration module; and based at least in part on determining that the PCIe transaction is not the acceleration instruction, delivering the PCIe transaction to a second device, wherein the acceleration module supports performing the acceleration instruction on application data on a storage device for an application program without loading the application data into a memory associated with a processor, and wherein the processor, the acceleration module, and the storage device communicate using a PCIe bus.

Statement 386. An embodiment of the inventive concept includes the article according to statement 385, wherein the acceleration module is implemented using a Field Programmable Gate Array.

Statement 387. An embodiment of the inventive concept includes the article according to statement 386, wherein:

receiving a Peripheral Component Interconnect Exchange (PCIe) transaction from a first device at an FPGA includes receiving a second PCIe transaction from the storage device at a downstream port of the FPGA;

determining at the acceleration module whether the PCIe transaction is an acceleration instruction includes determining at the FPGA whether the second PCIe transaction is associated with an address in a downstream Filter Address Range (FAR) associated with the downstream port of the FPGA; and delivering the PCIe transaction to a second device includes delivering the second PCIe transaction to the processor using an upstream port of the FPGA.

Statement 388. An embodiment of the inventive concept includes the article according to statement 387, the non-transitory storage medium having stored thereon further instructions that, when executed by the machine, result in:

receiving a first PCIe transaction from the processor at the upstream port of the FPGA; and delivering the first PCIe transaction to the storage device using the downstream processor of the FPGA.

Statement 389. An embodiment of the inventive concept includes the article according to statement 387, the non-transitory storage medium having stored thereon further instructions that, when executed by the machine, result in:

receiving the downstream FAR at the FPGA from the storage device; and associating the downstream FAR with the downstream port of the FPGA.

Statement 390. An embodiment of the inventive concept includes the article according to statement 389, wherein receiving the downstream FAR at the FPGA from the storage device includes receiving the downstream FAR at the FPGA from the storage device over a sideband bus, the sideband bus drawn from a set including an Inter-Integrated Circuit ($I^2C$) bus and a System Management Bus (SMBus).

Statement 391. An embodiment of the inventive concept includes the article according to statement 389, wherein receiving the downstream FAR at the FPGA from the storage device includes receiving a PCIe Vendor Defined Message (VDM) from the storage device, the PCIe VDM including the downstream FAR.

Statement 392. An embodiment of the inventive concept includes the article according to statement 387, the non-transitory storage medium having stored thereon further instructions that, when executed by the machine, result in sending a result of the second PCIe transaction to the storage device using the downstream port of the FPGA.

Statement 393. An embodiment of the inventive concept includes the article according to statement 387, the non-transitory storage medium having stored thereon further instructions that, when executed by the machine, result in sending a result of the second PCIe transaction to the processor using the upstream port of the FPGA.

Statement 394. An embodiment of the inventive concept includes the article according to statement 387, the non-transitory storage medium having stored thereon further instructions that, when executed by the machine, result in:

receiving a first PCIe transaction from the processor at the upstream port of the FPGA;

determining whether the first PCIe transaction is a second acceleration instruction by determining whether the first PCIe transaction is associated with a second address in an upstream FAR associated with the upstream port of the FPGA; and based at least in part on determining that the first PCIe transaction is the second acceleration instruction, processing the first PCIe transaction at the APM-F of the FPGA; and based at least in part on determining that the first PCIe transaction is not the second acceleration instruction, delivering the first PCIe transaction to the storage device using the downstream port of the FPGA.

Statement 395. An embodiment of the inventive concept includes the article according to statement 394, wherein the second acceleration instruction originates from an Acceleration Service Manager (ASM) running on the processor.

Statement 396. An embodiment of the inventive concept includes the article according to statement 394, the non-transitory storage medium having stored thereon further instructions that, when executed by the machine, result in:

receiving the upstream FAR at the FPGA from the storage device; and associating the upstream FAR with the upstream port of the FPGA.

Statement 397. An embodiment of the inventive concept includes the article according to statement 396, wherein receiving the upstream FAR at the FPGA from the storage device includes receiving the upstream FAR at the FPGA from the storage device over a sideband bus, the sideband bus drawn from a set including an $I^2C$ bus and an SMBus.

Statement 398. An embodiment of the inventive concept includes the article according to statement 396, wherein receiving the upstream FAR at the FPGA from the storage device includes receiving a PCIe Vendor Defined Message (VDM) from the storage device, the PCIe VDM including the upstream FAR.

Statement 399. An embodiment of the inventive concept includes the article according to statement 394, the non-transitory storage medium having stored thereon further instructions that, when executed by the machine, result in sending a result of the first PCIe transaction to the storage device using the upstream port of the FPGA.

Statement 400. An embodiment of the inventive concept includes the article according to statement 394, the non-transitory storage medium having stored thereon further instructions that, when executed by the machine, result in sending a result of the first PCIe transaction to the processor using the upstream port of the FPGA.

Statement 401. An embodiment of the inventive concept includes the article according to statement 387, the non-transitory storage medium having stored thereon further instructions that, when executed by the machine, result in:

receiving a first PCIe transaction from the processor at the upstream port of the FPGA;

determining whether the first PCIe transaction is a second acceleration instruction by determining whether the first PCIe transaction is associated with a virtual function (VF) exposed by the storage device; and based at least in part on determining that the first PCIe transaction is the second acceleration instruction, processing the first PCIe transaction at the APM-F of the FPGA; and based at least in part on determining that the first PCIe transaction is not the second acceleration instruction, delivering the first PCIe transaction to the storage device using the downstream port of the FPGA.

Statement 402. An embodiment of the inventive concept includes the article according to statement 401, wherein the second acceleration instruction originates from an Acceleration Service Manager (ASM) running on the processor.

Statement 403. An embodiment of the inventive concept includes the article according to statement 401, wherein determining whether the first PCIe transaction is a second acceleration instruction includes determining whether the first PCIe transaction includes a tag with an identifier of the VF.

Statement 404. An embodiment of the inventive concept includes the article according to statement 403, the non-transitory storage medium having stored thereon further instructions that, when executed by the machine, result in:
receiving the identifier of the VF at the FPGA from the storage device; and
associating the identifier of the VF with the upstream port of the FPGA.

Statement 405. An embodiment of the inventive concept includes the article according to statement 404, wherein receiving the identifier of the VF at the FPGA from the storage device includes receiving the identifier of the VF at the FPGA from the storage device over a sideband bus, the sideband bus drawn from a set including an $I^2C$ bus and an SMBus.

Statement 406. An embodiment of the inventive concept includes the article according to statement 404, wherein receiving the identifier of the VF at the FPGA from the storage device includes receiving a PCIe Vendor Defined Message (VDM) from the storage device, the PCIe VDM including the identifier of the VF.

Statement 407. An embodiment of the inventive concept includes the article according to statement 401, the non-transitory storage medium having stored thereon further instructions that, when executed by the machine, result in sending a result of the first PCIe transaction to the processor using the upstream port of the FPGA.

Statement 408. An embodiment of the inventive concept includes the article according to statement 387, the non-transitory storage medium having stored thereon further instructions that, when executed by the machine, result in:
receiving a first PCIe transaction from the processor at the upstream port of the FPGA;
determining whether the first PCIe transaction is a second acceleration instruction by determining whether the first PCIe transaction is associated with a physical function (PF) exposed by the storage device; and
based at least in part on determining that the first PCIe transaction is the second acceleration instruction, processing the first PCIe transaction at the APM-F of the FPGA; and
based at least in part on determining that the first PCIe transaction is not the second acceleration instruction, delivering the first PCIe transaction to the storage device using the downstream port of the FPGA.

Statement 409. An embodiment of the inventive concept includes the article according to statement 408, wherein the second acceleration instruction originates from an Acceleration Service Manager (ASM) running on the processor.

Statement 410. An embodiment of the inventive concept includes the article according to statement 408, wherein determining whether the first PCIe transaction is a second acceleration instruction includes determining whether the first PCIe transaction includes a tag with an identifier of the PF.

Statement 411. An embodiment of the inventive concept includes the article according to statement 410, the non-transitory storage medium having stored thereon further instructions that, when executed by the machine, result in:
receiving the identifier of the PF at the FPGA from the storage device; and
associating the identifier of the PF with the upstream port of the FPGA.

Statement 412. An embodiment of the inventive concept includes the article according to statement 411, wherein receiving the identifier of the PF at the FPGA from the storage device includes receiving the identifier of the PF at the FPGA from the storage device over a sideband bus, the sideband bus drawn from a set including an $I^2C$ bus and an SMBus.

Statement 413. An embodiment of the inventive concept includes the article according to statement 411, wherein receiving the identifier of the PF at the FPGA from the storage device includes receiving a PCIe Vendor Defined Message (VDM) from the storage device, the PCIe VDM including the identifier of the PF.

Statement 414. An embodiment of the inventive concept includes the article according to statement 408, the non-transitory storage medium having stored thereon further instructions that, when executed by the machine, result in sending a result of the first PCIe transaction to the processor using the upstream port of the FPGA.

Statement 415. An embodiment of the inventive concept includes the article according to statement 386, wherein:
receiving a Peripheral Component Interconnect Exchange (PCIe) transaction from a first device at an FPGA includes receiving a first PCIe transaction from the processor at an endpoint of the FPGA;
determining at the acceleration module whether the PCIe transaction is an acceleration instruction includes determining whether the first PCIe transaction includes a tag with an identifier of a first PF of the FPGA or a second identifier of a second PF of the FPGA; and
delivering the PCIe transaction to a second device includes delivering the first PCIe transaction to the storage device using a root port of the FPGA.

Statement 416. An embodiment of the inventive concept includes the article according to statement 415, the non-transitory storage medium having stored thereon further instructions that, when executed by the machine, result in:
receiving a second PCIe transaction from the storage device at the root port of the FPGA;
determining whether the second PCIe transaction is a second acceleration instruction by determining at the FPGA whether the second PCIe transaction is associated with an address in a downstream FAR associated with the root port of the FPGA;
based at least in part on determining that the second PCIe transaction is the second acceleration instruction, processing the first PCIe transaction at the APM-F of the FPGA; and
based at least in part on determining that the second PCIe transaction is not the second acceleration instruction, delivering the second PCIe transaction to the processor using the endpoint of the FPGA.

Statement 417. An embodiment of the inventive concept includes the article according to statement 416, the non-transitory storage medium having stored thereon further instructions that, when executed by the machine, result in:

receiving the downstream FAR at the FPGA from the storage device; and associating the downstream FAR with the root port of the FPGA.

Statement 418. An embodiment of the inventive concept includes the article according to statement 417, wherein receiving the downstream FAR at the FPGA from the storage device includes receiving the downstream FAR at the FPGA from the storage device over a sideband bus, the sideband bus drawn from a set including an I$^2$C bus and an SMBus.

Statement 419. An embodiment of the inventive concept includes the article according to statement 417, wherein receiving the downstream FAR at the FPGA from the storage device includes receiving a PCIe Vendor Defined Message (VDM) from the storage device, the PCIe VDM including the downstream FAR.

Statement 420. An embodiment of the inventive concept includes the article according to statement 415, wherein the second acceleration instruction originates from an Acceleration Service Manager (ASM) running on the processor.

Statement 421. An embodiment of the inventive concept includes the article according to statement 415, the non-transitory storage medium having stored thereon further instructions that, when executed by the machine, result in sending a result of the first PCIe transaction to the processor using the endpoint of the FPGA.

Statement 422. An embodiment of the inventive concept includes the article according to statement 415, the non-transitory storage medium having stored thereon further instructions that, when executed by the machine, result in:

determining a configuration of an endpoint of the storage device using a configuration monitor of the FPGA, the endpoint of the storage device in communication with the root port of the FPGA; and replicating the configuration of the endpoint on the storage device using the endpoint of the FPGA.

Statement 423. An embodiment of the inventive concept includes the article according to statement 386, wherein:

receiving a Peripheral Component Interconnect Exchange (PCIe) transaction from a first device at an FPGA includes receiving a first PCIe transaction from the processor at an endpoint of the FPGA;

determining at the acceleration module whether the PCIe transaction is an acceleration instruction includes determining whether the first PCIe transaction includes a tag with an identifier of a first PF of the FPGA or a second identifier of a second PF of the FPGA; and delivering the PCIe transaction to a second device includes delivering the first PCIe transaction to the storage device using a first root port of the FPGA.

Statement 424. An embodiment of the inventive concept includes the article according to statement 423, the non-transitory storage medium having stored thereon further instructions that, when executed by the machine, result in:

receiving a second PCIe transaction from the storage device at the FPGA;

determining whether the second PCIe transaction was received at a first root port of the FPGA or a second root port of the FPGA;

based at least in part on determining that the second PCIe transaction was received at the first root port of the FPGA, delivering the second PCIe transaction to the processor using the endpoint; and based at least in part on determining that the second PCIe transaction was received at the second root port of the FPGA, processing the second PCIe transaction at the APM-F of the FPGA.

Statement 425. An embodiment of the inventive concept includes the article according to statement 423, wherein the second acceleration instruction originates from an Acceleration Service Manager (ASM) running on the processor.

Statement 426. An embodiment of the inventive concept includes the article according to statement 423, the non-transitory storage medium having stored thereon further instructions that, when executed by the machine, result in sending a result of the first PCIe transaction to the processor using the endpoint of the FPGA.

Statement 427. An embodiment of the inventive concept includes the article according to statement 423, the non-transitory storage medium having stored thereon further instructions that, when executed by the machine, result in:

determining a configuration of an endpoint of the storage device using a configuration monitor of the FPGA, the endpoint of the storage device in communication with the first root port of the FPGA; and replicating the configuration of the endpoint on the storage device using the endpoint of the FPGA.

Statement 428. An embodiment of the inventive concept includes the article according to statement 386, wherein:

receiving a Peripheral Component Interconnect Exchange (PCIe) transaction from a first device at an FPGA includes receiving a first PCIe transaction from the processor at the FPGA;

determining at the FPGA whether the first PCIe transaction is an acceleration instruction includes determining whether the first PCIe transaction is a second acceleration instruction by determining whether the first PCIe transaction was received from the processor at a first endpoint of the FPGA, the FPGA including the first endpoint and a second endpoint; and delivering the PCIe transaction to a second device includes delivering the first PCIe transaction to the storage device using a first root port of the FPGA, the FPGA including the first root port and a second root port.

Statement 429. An embodiment of the inventive concept includes the article according to statement 428, the non-transitory storage medium having stored thereon further instructions that, when executed by the machine, result in:

receiving a second PCIe transaction from the storage device at the FPGA;

determining whether the second PCIe transaction is the acceleration instruction by determining whether the second PCIe transaction was received at the first root port of the FPGA or the second root port of the FPGA;

based at least in part on determining that the second PCIe transaction was received at the first root port of the FPGA, delivering the second PCIe transaction to the processor using the first endpoint; and based at least in part on determining that the second PCIe transaction was received at the second root port of the FPGA, processing the second PCIe transaction at the APM-F of the FPGA.

Statement 430. An embodiment of the inventive concept includes the article according to statement 428, wherein the second PCIe transaction originates from an Acceleration Service Manager (ASM) running on the processor.

Statement 431. An embodiment of the inventive concept includes the article according to statement 428, the non-transitory storage medium having stored thereon further instructions that, when executed by the machine, result in sending a result of the first PCIe transaction to the processor using the second endpoint of the FPGA.

Statement 432. An embodiment of the inventive concept includes the article according to statement 428, the non-transitory storage medium having stored thereon further instructions that, when executed by the machine, result in:

determining a configuration of an endpoint of the storage device using a configuration monitor of the FPGA, the endpoint of the storage device in communication with the first root port of the FPGA; and replicating the configuration of the endpoint on the storage device using the first endpoint of the FPGA.

Statement 433. An embodiment of the inventive concept includes the article according to statement 386, wherein:

receiving a Peripheral Component Interconnect Exchange (PCIe) transaction from a first device at an FPGA includes receiving a first PCIe transaction from the processor at the FPGA;

determining at the acceleration module whether the first PCIe transaction is an acceleration instruction includes determining whether the first PCIe transaction is a second acceleration instruction by determining whether the first PCIe transaction was received from the processor at a first endpoint of the FPGA, the FPGA including the first endpoint and a second endpoint; and delivering the PCIe transaction to a second device includes delivering the first PCIe transaction to the storage device using a root port of the FPGA.

Statement 434. An embodiment of the inventive concept includes the article according to statement 433, the non-transitory storage medium having stored thereon further instructions that, when executed by the machine, result in:

receiving a second PCIe transaction from the storage device at the root port of the FPGA;

determining whether the second PCIe transaction is the acceleration instruction by determining at the FPGA whether the second PCIe transaction is associated with an address in a downstream FAR associated with the root port of the FPGA; and based at least in part on determining that the second PCIe transaction is the acceleration instruction, processing the second PCIe transaction at the APM-F of the FPGA; and based at least in part on determining that the second PCIe transaction is not the acceleration instruction, delivering the second PCIe transaction to the processor using the first endpoint of the FPGA.

Statement 435. An embodiment of the inventive concept includes the article according to statement 434, the non-transitory storage medium having stored thereon further instructions that, when executed by the machine, result in:

receiving the downstream FAR at the FPGA from the storage device; and associating the downstream FAR with the root port of the FPGA.

Statement 436. An embodiment of the inventive concept includes the article according to statement 435, wherein receiving the downstream FAR at the FPGA from the storage device includes receiving the downstream FAR at the FPGA from the storage device over a sideband bus, the sideband bus drawn from a set including an I²C bus and an SMBus.

Statement 437. An embodiment of the inventive concept includes the article according to statement 435, wherein receiving the downstream FAR at the FPGA from the storage device includes receiving a PCIe Vendor Defined Message (VDM) from the storage device, the PCIe VDM including the downstream FAR.

Statement 438. An embodiment of the inventive concept includes the article according to statement 433, wherein the first PCIe transaction originates from an Acceleration Service Manager (ASM) running on the processor.

Statement 439. An embodiment of the inventive concept includes the article according to statement 433, the non-transitory storage medium having stored thereon further instructions that, when executed by the machine, result in sending a result of the first PCIe transaction to the processor using the second endpoint of the FPGA.

Statement 440. An embodiment of the inventive concept includes the article according to statement 433, the non-transitory storage medium having stored thereon further instructions that, when executed by the machine, result in:

determining a configuration of an endpoint of the storage device using a configuration monitor of the FPGA, the endpoint of the storage device in communication with the root port of the FPGA; and replicating the configuration of the endpoint on the storage device using the first endpoint of the FPGA.

Statement 441. An embodiment of the inventive concept includes an article, comprising a non-transitory storage medium, the non-transitory storage medium having stored thereon instructions that, when executed by a machine, result in:

receiving a first PCIe transaction from an acceleration module at a storage device;

determining whether the first PCIe transaction is an acceleration instruction;

based at least in part on determining that the first PCIe transaction is the acceleration instruction:

generating a second PCIe transaction using a storage device Acceleration Platform Manager (APM-S) of the storage device; and sending the second PCIe transaction from the storage device to the acceleration module; and based at least in part on determining that the first PCIe transaction is not the acceleration instruction, executing the first PCIe transaction on data stored on the storage device, wherein a processor, the acceleration module, and the storage device communicate using a Peripheral Component Interconnect Exchange (PCIe) bus, and wherein the acceleration module supports performing the acceleration instruction on the application data on the storage device for an application program running on the processor without loading the application data into a memory associated with the processor.

Statement 442. An embodiment of the inventive concept includes the article according to statement 441, wherein the storage device is a Solid State Drive (SSD).

Statement 443. An embodiment of the inventive concept includes the article according to statement 442, wherein:

receiving a first PCIe transaction from an acceleration module of a storage device includes receiving the first PCIe transaction from the acceleration module at an endpoint of the SSD;

determining whether the first PCIe transaction is an acceleration instruction includes determining whether the first PCIe transaction includes a special command from the processor or originates from the APM-F of the acceleration module;

generating a second PCIe transaction using a storage device Acceleration Platform Manager (APM-S) of the storage device includes generating the second PCIe transaction by the APM-S of the SSD responsive to the first PCIe transaction; and sending the second PCIe transaction from the storage device to the acceleration module includes sending the second PCIe transaction from the endpoint of the SSD to the acceleration module.

Statement 444. An embodiment of the inventive concept includes the article according to statement 443, wherein the first PCIe transaction originates from the processor and includes a special command.

Statement 445. An embodiment of the inventive concept includes the article according to statement 443, wherein determining whether the first PCIe transaction includes a special command from the processor includes determining whether the first PCIe transaction includes a special command from the processor by a host interface logic (HIL) of the SSD.

Statement 446. An embodiment of the inventive concept includes the article according to statement 445, wherein the special command originates from an Acceleration Service Manager (ASM) running on the processor.

Statement 447. An embodiment of the inventive concept includes the article according to statement 443, the non-transitory storage medium having stored thereon further instructions that, when executed by the machine, result in:
requesting a block of host system addresses from the processor;
selecting a subset of the block of host system addresses as a downstream Filter Address Range (FAR); and
programming a downstream port of the acceleration module with the downstream FAR.

Statement 448. An embodiment of the inventive concept includes the article according to statement 447, wherein programming a downstream port of the acceleration module with the downstream FAR includes programming the downstream port of the acceleration module with the downstream FAR over a sideband bus, the sideband bus drawn from a set including an Inter-Integrated Circuit ($I^2C$) bus and a System Management Bus (SMBus).

Statement 449. An embodiment of the inventive concept includes the article according to statement 447, wherein programming a downstream port of the acceleration module with the downstream FAR includes programming the downstream port of the acceleration module with the downstream FAR using a PCIe Vendor Defined Message (VDM), the PCIe VDM including the downstream FAR.

Statement 450. An embodiment of the inventive concept includes the article according to statement 447, the non-transitory storage medium having stored thereon further instructions that, when executed by the machine, result in:
selecting a second subset of the block of host system addresses as a upstream FAR; and
programming an upstream port of the acceleration module with the upstream FAR.

Statement 451. An embodiment of the inventive concept includes the article according to statement 450, wherein programming an upstream port of the acceleration module with the upstream FAR includes programming the upstream port of the acceleration module with the upstream FAR over a sideband bus, the sideband bus drawn from a set including an $I^2C$ bus and an SMBus.

Statement 452. An embodiment of the inventive concept includes the article according to statement 450, wherein programming an upstream port of the acceleration module with the upstream FAR includes programming the upstream port of the acceleration module with the upstream FAR using a PCIe Vendor Defined Message (VDM), the PCIe VDM including the upstream FAR.

Statement 453. An embodiment of the inventive concept includes the article according to statement 443, the non-transitory storage medium having stored thereon further instructions that, when executed by the machine, result in:
requesting a block of host system addresses from the processor;
selecting a subset of the block of host system addresses as a downstream FAR; and
programming a root port of the acceleration module with the downstream FAR.

Statement 454. An embodiment of the inventive concept includes the article according to statement 453, wherein programming a root port of the acceleration module with the downstream FAR includes programming the root port of the acceleration module with the downstream FAR over a sideband bus, the sideband bus drawn from a set including an $I^2C$ bus and an SMBus.

Statement 455. An embodiment of the inventive concept includes the article according to statement 453, wherein programming a root port of the acceleration module with the downstream FAR includes programming the root port of the acceleration module with the downstream FAR using a PCIe Vendor Defined Message (VDM), the PCIe VDM including the downstream FAR.

Statement 456. An embodiment of the inventive concept includes the article according to statement 443, the non-transitory storage medium having stored thereon further instructions that, when executed by the machine, result in:
receiving a result of the first PCIe transaction from the acceleration module at the endpoint of the SSD; and
forwarding the result of the first PCIe transaction to the processor using the endpoint of the SSD.

Statement 457. An embodiment of the inventive concept includes the article according to statement 443, the non-transitory storage medium having stored thereon further instructions that, when executed by the machine, result in:
offering a physical function (PF) exposing the SSD; and
offering a virtual function (VF) exposing the acceleration module.

Statement 458. An embodiment of the inventive concept includes the article according to statement 457, the non-transitory storage medium having stored thereon further instructions that, when executed by the machine, result in programming an upstream port of the acceleration module with an identifier of the VF.

Statement 459. An embodiment of the inventive concept includes the article according to statement 443, the non-transitory storage medium having stored thereon further instructions that, when executed by the machine, result in:
offering a first PF exposing the SSD; and
offering a second PF exposing the acceleration module.

Statement 460. An embodiment of the inventive concept includes the article according to statement 459, the non-transitory storage medium having stored thereon further instructions that, when executed by the machine, result in programming an upstream port of the acceleration module with an identifier of the second PF.

Statement 461. An embodiment of the inventive concept includes the article according to statement 442, wherein:
receiving a first PCIe transaction from an acceleration module of a storage device includes receiving the first PCIe transaction from the acceleration module at an endpoint of the SSD;
determining whether the first PCIe transaction is an acceleration instruction includes determining whether the first PCIe transaction was received by the SSD at a second endpoint, the SSD including the second endpoint and a first endpoint;
generating a second PCIe transaction using a storage device Acceleration Platform Manager (APM-S) of the storage device includes generating the second PCIe transaction by the APM-S of the SSD responsive to the first PCIe transaction; and sending the second PCIe transaction from the storage device to the acceleration module includes sending the second PCIe transaction from the second endpoint of the SSD to the acceleration module.

Statement 462. An embodiment of the inventive concept includes an article, comprising a non-transitory storage medium, the non-transitory storage medium having stored thereon instructions that, when executed by a machine, result in:

receiving a Peripheral Component Interconnect Exchange (PCIe) transaction from a processor at a first bridging component;

determining at the first bridging component whether the PCIe transaction is an acceleration instruction;

based at least in part on determining that the PCIe transaction is the acceleration instruction, forwarding the PCIe transaction to an acceleration module; and based at least in part on determining that the PCIe transaction is not the acceleration instruction, forwarding the PCIe transaction to a storage device, wherein the processor, the first bridging component, the acceleration module, and the storage device communicate using a PCIe bus.

Statement 463. An embodiment of the inventive concept includes the article according to statement 462, wherein:

the acceleration module is implemented using a Field Programmable Gate Array; and the storage device includes a Solid State Drive (SSD).

Statement 464. An embodiment of the inventive concept includes the article according to statement 462, wherein determining at the first bridging component whether the PCIe transaction is an acceleration instruction includes determining whether the PCIe transaction is associated with an address in an upstream FAR associated with an upstream port of the first bridging component.

Statement 465. An embodiment of the inventive concept includes the article according to statement 464, the non-transitory storage medium having stored thereon further instructions that, when executed by the machine, result in:

receiving the upstream FAR at the first bridging component from the storage device; and associating the upstream FAR with the upstream port of the first bridging component.

Statement 466. An embodiment of the inventive concept includes the article according to statement 465, wherein receiving the upstream FAR at the first bridging component from the storage device includes receiving the upstream FAR at the first bridging component from the storage device over a sideband bus, the sideband bus drawn from a set including an I²C bus and an SMBus.

Statement 467. An embodiment of the inventive concept includes the article according to statement 465, wherein receiving the upstream FAR at the first bridging component from the storage device includes receiving a PCIe Vendor Defined Message (VDM) from the storage device, the PCIe VDM including the upstream FAR.

Statement 468. An embodiment of the inventive concept includes the article according to statement 462, wherein determining at the first bridging component whether the PCIe transaction is an acceleration instruction includes determining whether the PCIe transaction is associated with a virtual function (VF) exposed by the storage device.

Statement 469. An embodiment of the inventive concept includes the article according to statement 468, wherein determining whether the PCIe transaction is associated with a virtual function (VF) exposed by the storage device includes determining whether the PCIe transaction includes a tag with an identifier of the VF.

Statement 470. An embodiment of the inventive concept includes the article according to statement 469, the non-transitory storage medium having stored thereon further instructions that, when executed by the machine, result in:

receiving the identifier of the VF at the first bridging component from the storage device; and associating the identifier of the VF with the upstream port of the first bridging component.

Statement 471. An embodiment of the inventive concept includes the article according to statement 470, wherein receiving the identifier of the VF at the first bridging component from the storage device includes receiving the identifier of the VF at the first bridging component from the storage device over a sideband bus, the sideband bus drawn from a set including an I²C bus and an SMBus.

Statement 472. An embodiment of the inventive concept includes the article according to statement 470, wherein receiving the identifier of the VF at the first bridging component from the storage device includes receiving a PCIe Vendor Defined Message (VDM) from the storage device, the PCIe VDM including the identifier of the VF.

Statement 473. An embodiment of the inventive concept includes the article according to statement 462, wherein determining at the first bridging component whether the PCIe transaction is an acceleration instruction includes determining whether the PCIe transaction is associated with a physical function (PF) exposed by the storage device.

Statement 474. An embodiment of the inventive concept includes the article according to statement 473, wherein determining whether the PCIe transaction is associated with a physical function (PF) exposed by the storage device includes determining whether the PCIe transaction includes a tag with an identifier of the PF.

Statement 475. An embodiment of the inventive concept includes the article according to statement 474, the non-transitory storage medium having stored thereon further instructions that, when executed by the machine, result in:

receiving the identifier of the PF at the first bridging component from the storage device; and associating the identifier of the PF with the upstream port of the first bridging component.

Statement 476. An embodiment of the inventive concept includes the article according to statement 475, wherein receiving the identifier of the PF at the first bridging component from the storage device includes receiving the identifier of the PF at the first bridging component from the storage device over a sideband bus, the sideband bus drawn from a set including an I²C bus and an SMBus.

Statement 477. An embodiment of the inventive concept includes the article according to statement 475, wherein receiving the identifier of the PF at the first bridging component from the storage device includes receiving a PCIe Vendor Defined Message (VDM) from the storage device, the PCIe VDM including the identifier of the PF.

Statement 478. An embodiment of the inventive concept includes the article according to statement 462, wherein determining at the first bridging component whether the PCIe transaction is an acceleration instruction includes determining whether the PCIe transaction includes a tag with an identifier of a first PF of the first bridging component or a second identifier of a second PF of the first bridging component.

Statement 479. An embodiment of the inventive concept includes the article according to statement 478, the non-transitory storage medium having stored thereon further instructions that, when executed by the machine, result in:

determining a configuration of an endpoint of the storage device using a configuration monitor of the first bridging component; and replicating the configuration of the endpoint on the storage device using an endpoint of the first bridging component.

Statement 480. An embodiment of the inventive concept includes the article according to statement 462, wherein determining at the first bridging component whether the PCIe transaction is an acceleration instruction includes determining whether the PCIe transaction was received from the processor at a first endpoint of the first bridging component, the first bridging component including the first endpoint and a second endpoint.

Statement 481. An embodiment of the inventive concept includes the article according to statement 480, the non-transitory storage medium having stored thereon further instructions that, when executed by the machine, result in:

determining a configuration of an endpoint of the storage device using a configuration monitor of the first bridging component; and replicating the configuration of the endpoint on the storage device using the first endpoint of the first bridging component.

Statement 482. An embodiment of the inventive concept includes an article, comprising a non-transitory storage medium, the non-transitory storage medium having stored thereon instructions that, when executed by a machine, result in:

receiving a Peripheral Component Interconnect Exchange (PCIe) transaction from a storage device at a second bridging component;

determining at the second bridging component whether the PCIe transaction is an acceleration instruction;

based at least in part on determining that the PCIe transaction is the acceleration instruction, forwarding the PCIe transaction to an acceleration module; and based at least in part on determining that the PCIe transaction is not the acceleration instruction, forwarding the PCIe transaction to a processor, wherein the processor, the second bridging component, the acceleration module, and the storage device communicate using a PCIe bus.

Statement 483. An embodiment of the inventive concept includes the article according to statement 482, wherein:

the acceleration module is implemented using a Field Programmable Gate Array; and the storage device includes a Solid State Drive (SSD).

Statement 484. An embodiment of the inventive concept includes the article according to statement 482, wherein determining at the second bridging component whether the PCIe transaction is an acceleration instruction includes determining at the second bridging component whether the second PCIe transaction is associated with an address in a downstream Filter Address Range (FAR) associated with a downstream port of the second bridging component.

Statement 485. An embodiment of the inventive concept includes the article according to statement 484, the non-transitory storage medium having stored thereon further instructions that, when executed by the machine, result in:

receiving the downstream FAR at the second bridging component from the storage device; and associating the downstream FAR with the downstream port of the second bridging component.

Statement 486. An embodiment of the inventive concept includes the article according to statement 485, wherein receiving the downstream FAR at the second bridging component from the storage device includes receiving the downstream FAR at the second bridging component from the storage device over a sideband bus, the sideband bus drawn from a set including an Inter-Integrated Circuit ($I^2C$) bus and a System Management Bus (SMBus).

Statement 487. An embodiment of the inventive concept includes the article according to statement 485, wherein receiving the downstream FAR at the second bridging component from the storage device includes receiving a PCIe Vendor Defined Message (VDM) from the storage device, the PCIe VDM including the downstream FAR.

Statement 488. An embodiment of the inventive concept includes the article according to statement 482, wherein determining at the second bridging component whether the PCIe transaction is an acceleration instruction includes determining whether the PCIe transaction was received at a second root port of the second bridging component, the second bridging component including a first root port and the second root port.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A system, comprising:
   a processor, the processor running an application program;
   a memory, the memory storing data associated with the application program running on the processor;
   a first interface for communicating with the processor;
   a second interface for communicating with a storage device;
   an acceleration module, the acceleration module implemented using hardware and including a first acceleration manager to execute an acceleration instruction; and
   the storage device, including:
      a third interface of the storage device for communicating with the acceleration module;
      a controller to manage operations of the storage device;
      storage to store application data for the application program; and
      a second acceleration manager to assist the first acceleration manager in executing the acceleration instruction,
   wherein the processor, the acceleration module, and the storage device communicate via at least one bus, and
   wherein the acceleration module supports performing the acceleration instruction on the application data on the storage device for the application program.

2. The system according to claim 1, further comprising:
   a first bridging component including the first interface, the first bridging component bridging communications between the processor and the acceleration module; and
   a second bridging component including the second interface, the second bridging component bridging communications between the acceleration module and storage device.

3. The system according to claim 1, wherein:
the acceleration module is implemented using a Field Programmable Gate Array (FPGA);
the acceleration module includes the first interface and the second interface; and
the storage device includes a Solid State Drive (SSD).

4. The system according to claim 3, wherein:
the second interface supports a configuration space;
the FPGA includes a fourth interface, a fifth interface, and a downstream filter associated with the second interface, the downstream filter operative to intercept a first acceleration instruction received from the SSD and deliver the first acceleration instruction to the first acceleration manager, the first acceleration instruction being associated with a downstream Filter Address Range (FAR);
the FPGA is operative to request a first block of host system addresses from the processor for the fourth interface and to request a second block of host system addresses from the processor for the fifth interface; and
the FPGA is operative to forward a first transaction received from the processor to the SSD and to forward a second acceleration instruction received from the processor to the first acceleration manager, the first transaction being associated with a first identifier of the fourth interface and the second acceleration instruction being associated with a second identifier of the fifth interface.

5. The system according to claim 4, wherein:
the SSD is operative to request a block of FPGA addresses from the FPGA, the block of FPGA addresses including the downstream FAR;
the second block of host system addresses is at least as large as the block of FPGA addresses; and
the controller is operative to select a subset of the block of FPGA addresses as the downstream FAR.

6. The system according to claim 5, wherein the controller is operative to program the downstream filter with the downstream FAR.

7. The system according to claim 4, wherein the first acceleration manager is operative to send a result to the processor via the first interface.

8. An acceleration module implemented using hardware, comprising:
a first acceleration manager to execute an acceleration instruction;
a first interface for communicating with a processor, an application program running on the processor; and
a second interface for communicating with a storage device, the storage device including a second acceleration manager to assist the first acceleration manager in executing the acceleration instruction,
wherein the acceleration module communicates with the processor and the storage device using at least one bus, and
wherein the acceleration module supports performing the acceleration instruction on application data on the storage device for the application program.

9. The acceleration module according to claim 8, wherein:
the acceleration module is implemented using a Field Programmable Gate Array (FPGA).

10. The acceleration module according to claim 9, wherein:
the second interface supports a configuration space;
the FPGA includes a fourth interface, a fifth interface, and a downstream filter associated with the second interface, the downstream filter operative to intercept a first acceleration instruction received from the storage device and deliver the first acceleration instruction to the first acceleration manager, the first acceleration instruction being associated with a downstream Filter Address Range (FAR);
the FPGA is operative to request a first block of host system addresses from the processor for the fourth interface and to request a second block of host system addresses from the processor for the fifth interface; and
the FPGA is operative to forward a transaction received from the processor to the storage device and to forward a second acceleration instruction received from the processor to the first acceleration manager, the transaction being associated with a first identifier of the fourth interface the second acceleration instruction being associated with a second identifier of the fifth interface.

11. The acceleration module according to claim 10, wherein:
the FPGA is operative to receive from the storage device a request for a block of FPGA addresses from the FPGA, the block of FPGA addresses including the downstream FAR;
the FPGA is operative to allocate the block of FPGA addresses from the configuration space; and
the first block of host system addresses is at least as large as the block of FPGA addresses.

12. The acceleration module according to claim 11, wherein the downstream FAR in the downstream filter of the FPGA may be programmed by the storage device.

13. The acceleration module according to claim 10, wherein the first acceleration manager is operative to send a result to the processor via the first interface.

14. The acceleration module according to claim 10, wherein the FPGA further includes a configuration monitor to copy a capability of a third interface of the storage device to the first interface.

15. A method, comprising:
receiving a transaction from a first device at an acceleration module;
determining at the acceleration module whether the transaction is an acceleration instruction;
based at least in part on determining that the transaction is the acceleration instruction, processing the transaction at an acceleration manager of the acceleration module; and
based at least in part on determining that the transaction is not the acceleration instruction, delivering the transaction to a second device,
wherein the acceleration module supports performing the acceleration instruction on application data on a storage device for an application program, and
wherein the processor, the acceleration module, and the storage device communicate using at least one bus.

16. The method according to claim 15, wherein the acceleration module is implemented using a Field Programmable Gate Array (FPGA).

17. The method according to claim 16, wherein:
receiving a transaction from a first device at an FPGA includes receiving a first transaction from the processor at a third interface of the FPGA;
determining at the acceleration module whether the transaction is an acceleration instruction includes determining whether the first transaction includes a tag with an identifier of a fourth interface of the FPGA; and delivering the transaction to a second device includes delivering the first transaction to the storage device using a root port of the FPGA.

18. The method according to claim 17, further comprising:

receiving a second transaction from the storage device at the root port of the FPGA;

determining whether the second transaction is a second acceleration instruction by determining at the FPGA whether the second transaction is associated with an address in a downstream Filter Address Range (FAR) associated with the root port of the FPGA;

based at least in part on determining that the second transaction is the second acceleration instruction, processing the first transaction at the acceleration manager of the FPGA; and based at least in part on determining that the second transaction is not the second acceleration instruction, delivering the second transaction to the processor using the third interface of the FPGA.

19. The method according to claim 18, further comprising:

receiving the downstream FAR at the FPGA from the storage device; and associating the downstream FAR with the root port of the FPGA.

20. The method according to claim 17, further comprising sending a result of the first transaction to the processor using the third interface of the FPGA.

\* \* \* \* \*